US006453288B1

(12) United States Patent
Yasunaga et al.

(10) Patent No.: US 6,453,288 B1
(45) Date of Patent: Sep. 17, 2002

(54) METHOD AND APPARATUS FOR PRODUCING COMPONENT OF EXCITATION VECTOR

(75) Inventors: Kazutoshi Yasunaga; Toshiyuki Morii, both of Kawasaki; Taisuke Watanabe, Sagamihara; Hiroyuki Ehara, Yokohama, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/101,186

(22) PCT Filed: Nov. 6, 1997

(86) PCT No.: PCT/JP97/04033

§ 371 (c)(1),
(2), (4) Date: Jul. 6, 1998

(87) PCT Pub. No.: WO98/20483

PCT Pub. Date: May 14, 1998

(30) Foreign Application Priority Data

| | | |
|---|---|---|
| Nov. 7, 1996 | (JP) | 8-294738 |
| Nov. 21, 1996 | (JP) | 8-310324 |
| Feb. 19, 1997 | (JP) | 9-34582 |
| Feb. 19, 1997 | (JP) | 9-34583 |

(51) Int. Cl.[7] ........ G01L 19/08
(52) U.S. Cl. ........ 704/223; 704/221
(58) Field of Search ........ 704/223, 201, 704/221, 222

(56) References Cited

U.S. PATENT DOCUMENTS

| | | | | |
|---|---|---|---|---|
| 4,797,925 A | | 1/1989 | Lin | |
| 5,060,269 A | | 10/1991 | Zinzer | |
| 5,293,449 A | * | 3/1994 | Tzeng | 704/223 |
| 5,371,853 A | * | 12/1994 | Kao et al. | 704/223 |
| 5,396,576 A | * | 3/1995 | Miki et al. | 704/222 |
| 5,428,561 A | | 6/1995 | Bryant et al. | |

FOREIGN PATENT DOCUMENTS

| | | |
|---|---|---|
| EP | 0488751 | 6/1992 |
| EP | 488751 | 6/1992 |
| EP | 0680032 | 11/1995 |
| EP | 680032 | 11/1995 |
| JP | 2-12300 | 1/1990 |
| JP | 5281999 | 10/1993 |
| JP | 6175695 | 6/1994 |
| JP | 6202697 | 7/1994 |
| JP | 7295598 | 11/1995 |
| JP | 8006600 | 1/1996 |
| JP | 8016196 | 1/1996 |
| JP | 8444400 | 2/1996 |
| JP | 8279757 | 10/1996 |
| JP | 9-6396 | 1/1997 |
| JP | 10-63300 | 3/1998 |
| WO | 99/12156 | 3/1999 |

OTHER PUBLICATIONS

Laflamme et al, "On Reducing Computational Complexity of Codeboook Search in CELP Coder Through the Use of Algebraic Codes", IEEE ICASSP–90, Apr. 3, 1990.*

(List continued on next page.)

*Primary Examiner*—Fan Tsang
*Assistant Examiner*—Michael N. Opsasnick
(74) *Attorney, Agent, or Firm*—Greenblum & Bernstein, P.L.C.

(57) ABSTRACT

A random code vector reading section and a random codebook of a conventional CELP type speech coder/decoder are respectively replaced with an oscillator for outputting different vector streams in accordance with values of input seeds, and a seed storage section for storing a plurality of seeds. This makes it unnecessary to store fixed vectors as they are in a fixed codebook (ROM), thereby considerably reducing the memory capacity.

17 Claims, 23 Drawing Sheets

OTHER PUBLICATIONS

Article entitled "A Multi–Mode Variable Rate Speech Coder for CDMA Cellular Systems" by N. Tanaka et al., 1996 IEEE 46th Vehicular Technology Conference, Mobile Technology for the Human Race (Cat. No. 96CH 35894), Apr. 28 to May 1, 1996, pp. 198–202, vol. 1.

Article entitled "Analysis and Improvements of the Vector Quantization in Selp", by W.B. Kleijin et al., 1988 Proceedings of the European Signal Processing Conference, pp. 1043 to 1046.

Article entitled "A Complexity Reduction Method for VSELP Coding Using Overlapped Sparse Basis Vectors" by S. J. Kim et al., 1994 Proceedings of the International Conference of Signal Processing Applications and Technology, Oct. 18, 1994.

An English Language abstract of JP 9–6396.

An English Language abstract of JP 5–281999.

International Communication Union, Series G: Transmission Systems and Media, Digital systems and Networks–Coding of speech at 8kbit/s using Conjuate Structure Algebraic Code Excited Linear–Prediction (CS–ACELP); Annex D: 64 kbit/s S–ACELP speech coding algorithm, published Sep. 1998.

Salami et al., "Real–Time Implementation of a 9.6Kbit/s ACELP Wideband Speech Coder." Proceedings of the Global Telecommunications Conference, U.S. New York, IEEE, vol.–, 1992, pp. 447–451.

Kim et al., "A Complexity Reduction Method for VSELP Coding Using Overlapped Sparse Basis Vectors." Proceedings of the International Conference on Sigal Processing Application and Technology, Oct. 18, 1994.

Millar et al., "A Multipulse Speech Codec for Digital Cellular Mobile Phone Use." Proceedings on the Workshop on Speech Coding for Telecommunications, U.S., Boston, Kluwer, vol.–, 1989, pp. 87–96.

M.R. Schroeder et al., "Code–Excited Linear Prediction (CELP): High–Quality Speech at Very Low Bit Rates", Proc. ICASSP, pp. 937–940 (1985).

R. Salami et al., "8KBIT/SACELP Coding of Speech With 10 MS Speech–Frame: A Candidate for CCITT Standardization", ICASSP, pp. II–97 to II–100 (1994).

Linde et al., "An Algorithm For Vector Quantizer Design", IEEE Transactions On Communications, vol. Com–28, No. 1, pp. 84–95 (1980).

Miki et al., "A Pitch Synchronous Innovation CELP (PSI–CELP) Coder for 2–4 KBIT/S", 1994, IEEE, pp. II–13 to II–116 (1994).

An English Language abstract of JP 7–295598.

An English Language abstract of JP 6–202697.

An English Language abstract of JP 2–12300.

An English Language abstract of JP 8–044400.

An English Language abstract of JP 8–016196.

An English Language abstract of JP 6–175695.

An English Language abstract of JP 8–006600.

An English Language abstract of JP 8–279757.

* cited by examiner

METHOD AND APPARATUS FOR PRODUCING COMPONENT OF EXCITATION VECTOR

TECHNICAL FIELD

The present invention relates to an excitation vector generator capable of obtaining a high-quality synthesized speech, and a speech coder and a speech decoder which can code and decode a high-quality speech signal at a low bit rate.

BACKGROUND ART

A CELP (Code Excited Linear Prediction) type speech coder executes linear prediction for each of frames obtained by segmenting a speech at a given time, and codes predictive residuals (excitation signals) resulting from the frame-by-frame linear prediction, using an adaptive codebook having old excitation vectors stored therein and a random codebook which has a plurality of random code vectors stored therein. For instance, "Code-Excited Linear Prediction(CELP) :High-Quality Speech at Very Low Bit Rate," M. R. Schroeder, Proc. ICASSP '85, pp. 937–940 discloses a CELP type speech coder.

FIG. 1 illustrates the schematic structure of a CELP type speech coder. The CELP type speech coder separates vocal information into excitation information and vocal tract information and codes them. With regard to the vocal tract information, an input speech signal 10 is input to a filter coefficients analysis section 11 for linear prediction and linear predictive coefficients (LPCs) are coded by a filter coefficients quantization section 12. Supplying the linear predictive coefficients to a synthesis filter 13 allows vocal tract information to be added to excitation information in the synthesis filter 13. With regard to the excitation information, excitation vector search in an adaptive codebook 14 and a random codebook 15 is carried out for each segment obtained by further segmenting a frame (called subframe). The search in the adaptive codebook 14 and the search in the random codebook 15 are processes of determining the code number and gain (pitch gain) of an adaptive code vector, which minimizes coding distortion in an equation 1, and the code number and gain (random code gain) of a random code vector.

$$\|v-(gaHp+gcHc)\|^2 \tag{1}$$

v: speech signal (vector)

H: impulse response convolution matrix of the $$H=\begin{bmatrix} h(0) & 0 & \dots & \dots & 0 & 0 \\ h(1) & h(0) & 0 & \dots & 0 & 0 \\ h(2) & h(1) & h(0) & 0 & 0 & 0 \\ \vdots & \vdots & \vdots & \ddots & 0 & 0 \\ \vdots & \vdots & \vdots & \ddots & h(0) & 0 \\ h(L-1) & \dots & \dots & \dots & h(1) & h(0) \end{bmatrix}$$

synthesis filter.

where h: impulse response (vector) of the synthesis filter

L: frame length p: adaptive code vector c: random code vector ga: adaptive code gain (pitch gain)

gc: random code gain

Because a closed loop search of the code that minimizes the equation 1 involves a vast amount of computation for the code search, however, an ordinary CELP type speech coder first performs adaptive codebook search to specify the code number of an adaptive code vector, and then executes random codebook search based on the searching result to specify the code number of a random code vector.

The speech coder search by the CELP type speech coder will now be explained with reference to FIGS. 2A through 2C. In the figures, a code x is a target vector for the random codebook search obtained by an equation 2. It is assumed that the adaptive codebook search has already been accomplished.

$$x=v-gaHp \tag{2}$$

where x: target (vector) for the random codebook search v: speech signal (vector)

H: impulse response convolution matrix H of the synthesis filter p: adaptive code vector ga: adaptive code gain (pitch gain)

The random codebook search is a process of specifying a random code vector c which minimizes coding distortion that is defined by an equation 3 in a distortion calculator 16 as shown in FIG. 2A.

$$\|x-gcHc\|^2 \tag{3}$$

where x: target (vector) for the random codebook search

H: impulse response convolution matrix of the synthesis filter c: random code vector gc: random code gain.

The distortion calculator 16 controls a control switch 21 to switch a random code vector to be read from the random codebook 15 until the random code vector c is specified.

An actual CELP type speech coder has a structure in FIG. 2B to reduce the computational complexities, and a distortion calculator 16' carries out a process of specifying a code number which maximizes a distortion measure in an equation 4.

$$\frac{(x^tHc)^2}{\|Hc\|^2}=\frac{((x^tH)c)^2}{\|Hc\|^2}=\frac{(x'^tc)^2}{\|Hc\|^2}=\frac{(x'^tc)^2}{c^tH^tHc} \tag{4}$$

where x: target (vector) for the random codebook search

H: impulse response convolution matrix of the synthesis filter $H^t$: transposed matrix of H $X^t$: time reverse synthesis of x using H ($x'^t=X^tH$)

c: random code vector.

Specifically, the random codebook control switch 21 is connected to one terminal of the random codebook 15 and the random code vector c is read from an address corresponding to that terminal. The read random code vector c is synthesized with vocal tract information by the synthesis filter 13, producing a synthesized vector Hc. Then, the distortion calculator 16' computes a distortion measure in the equation 4 using a vector x' obtained by a time reverse process of a target x, the vector Hc resulting from synthesis of the random code vector in the synthesis filter and the random code vector c. As the random codebook control switch 21 is switched, computation of the distortion measure is performed for every random code vector in the random codebook.

Finally, the number of the random codebook control switch 21 that had been connected when the distortion measure in the equation 4 became maximum is sent to a code output section 17 as the code number of the random code vector.

FIG. 2C shows a partial structure of a speech decoder. The switching of the random codebook control switch 21 is controlled in such a way as to read out the random code vector that has a transmitted code number. After a transmitted random code gain gc and filter coefficient are set in an amplifier 23 and a synthesis filter 24, a random code vector is read out to restore a synthesized speech.

In the above-described speech coder/speech decoder, the greater the number of random code vectors stored as excitation information in the random codebook 15 is, the more possible it is to search a random code vector close to the excitation vector of an actual speech. As the capacity of the random codebook (ROM) is limited, however, it is not possible to store countless random code vectors corresponding to all the excitation vectors in the random codebook. This restricts improvement on the quality of speeches.

Also has proposed an algebraic excitation which can significantly reduce the computational complexities of coding distortion in a distortion calculator and can eliminate a random codebook (ROM) (described in "8 KBIT/S ACELP CODING OF SPEECH WITH 10 MS SPEECH-FRAME: A CANDIDATE FOR CCITT STANDARDIZATION": R. Salami, C. Laflamme, J-P. Adoul, ICASSP '94, pp. II-97 to II-100, 1994).

The algebraic excitation considerably reduces the complexities of computation of coding distortion by previously computing the results of convolution of the impulse response of a synthesis filter and a time-reversed target and the autocorrelation of the synthesis filter and developing them in a memory. Further, a ROM in which random code vectors have been stored is eliminated by algebraically generating random code vectors. A CS-ACELP and ACELP which use the algebraic excitation have been recommended respectively as G. 729 and G. 723.1 from the ITU-T.

In the CELP type speech coder/speech decoder equipped with the above-described algebraic excitation in a random codebook section, however, a target for a random codebook search is always coded with a pulse sequence vector, which puts a limit to improvement on speech quality.

DISCLOSURE OF INVENTION

It is therefore a primary object of the present invention to provide an excitation vector generator, a speech coder and a speech decoder, which can significantly suppress the memory capacity as compared with a case where random code vectors are stored directly in a random codebook, and can improve the speech quality.

It is a secondary object of this invention to provide an excitation vector generator, a speech coder and a speech decoder, which can generate complicated random code vectors as compared with a case where an algebraic excitation is provided in a random codebook section and a target for a random codebook search is coded with a pulse sequence vector, and can improve the speech quality.

In this invention, the fixed code vector reading section and fixed codebook of a conventional CELP type speech coder/decoder are respectively replaced with an oscillator, which outputs different vector sequences in accordance with the values of input seeds, and a seed storage section which stores a plurality of seeds (seeds of the oscillator). This eliminates the need for fixed code vectors to be stored directly in a fixed codebook (ROM) and can thus reduce the memory capacity significantly.

Further, according to this invention, the random code vector reading section and random codebook of the conventional CELP type speech coder/decoder are respectively replaced with an oscillator and a seed storage section. This eliminates the need for random code vectors to be stored directly in a random codebook (ROM) and can thus reduce the memory capacity significantly.

The invention is an excitation vector generator which is so designed as to store a plurality of fixed waveforms, arrange the individual fixed waveforms at respective start positions based on start position candidate information and add those fixed waveforms to generate an excitation vector. This can permit an excitation vector close to an actual speech to be generated.

Further, the invention is a CELP type speech coder/decoder constructed by using the above excitation vector generator as a random codebook. A fixed waveform arranging section may algebraically generate start position candidate information of fixed waveforms.

Furthermore, the invention is a CELP type speech coder/decoder, which stores a plurality of fixed waveforms, generates an impulse with respect to start position candidate information of each fixed waveform, convolutes the impulse response of a synthesis filter and each fixed waveform to generate an impulse response for each fixed waveform, computes the autocorrelations and correlations of impulse responses of the individual fixed waveforms and develop them in a correlation matrix. This can provide a speech coder/decoder which improves the quality of a synthesized speech at about the same computation cost as needed in a case of using an algebraic excitation as a random codebook.

Moreover, this invention is a CELP type speech coder/decoder equipped with a plurality of random codebooks and switch means for selecting one of the random codebooks. At least one random codebook may be the aforementioned excitation vector generator, or at least one random codebook may be a vector storage section having a plurality of random number sequences stored therein or a pulse sequences storage section having a plurality of random number sequences stored therein, or at least two random codebooks each having the aforementioned excitation vector generator may be provided with the number of fixed waveforms to be stored differing from one random codebook to another, and the switch means selects one of the random codebooks so as to minimize coding distortion at the time of searching a random codebook or adaptively selects one random codebook according to the result of analysis of speech segments.

BEST MODES FOR CARRYING OUT THE INVENTION

Preferred modes of the present invention will now be described specifically with reference to the accompanying drawings.

(First Mode)

Figure 3:
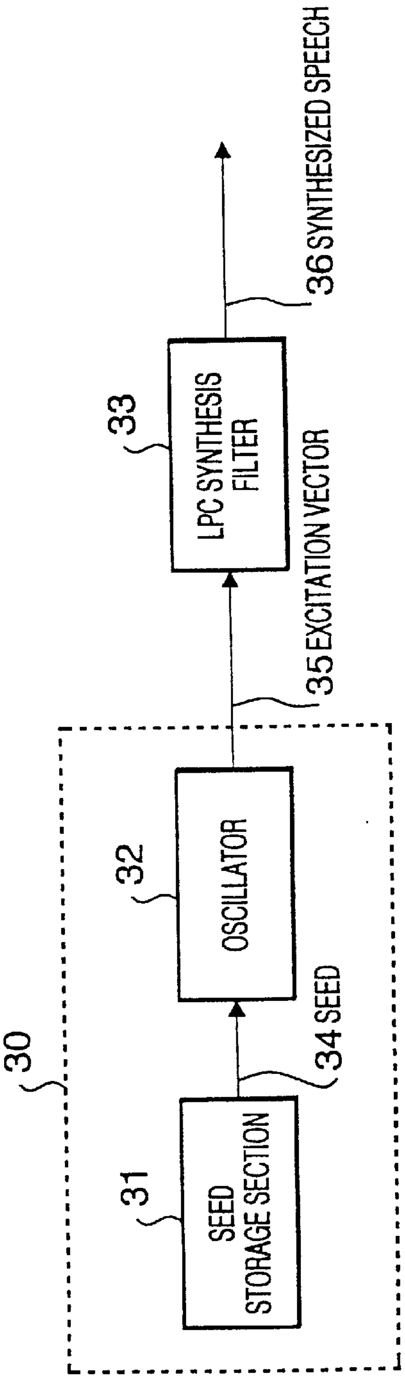
FIG. 3 is a block diagram of the essential portions of a speech coder according to a first mode.

FIG. 3 is a block diagram of the essential portions of a speech coder according to this mode. This speech coder comprises an excitation vector generator 30, which has a seed storage section 31 and an oscillator 32, and an LPC synthesis filter 33.

Seeds (oscillation seeds) 34 output from the seed storage section 31 are input to the oscillator 32. The oscillator 32 outputs different vector sequences according to the values of the input seeds. The oscillator 32 oscillates with the content according to the value of the seed (oscillation seed) 34 and outputs an excitation vector 35 as a vector sequence. The LPC synthesis filter 33 is supplied with vocal tract information in the form of the impulse response convolution matrix of the synthesis filter, and performs convolution on the excitation vector 35 with the impulse response, yielding a synthesized speech 36. The impulse response convolution of the excitation vector 35 is called LPC synthesis.

Figure 4:
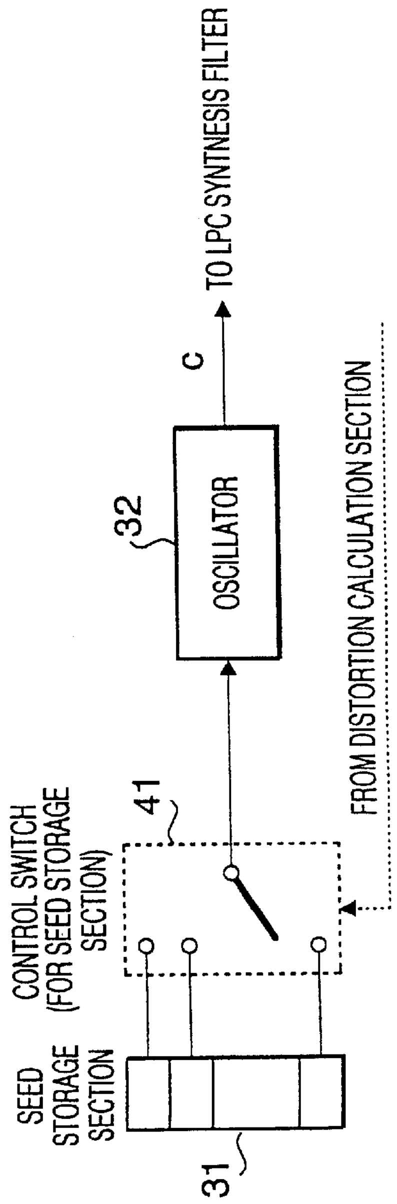
FIG. 4 is a block diagram of an excitation vector generator equipped in the speech coder of the first mode.

FIG. 4 shows the specific structure the excitation vector generator 30. A seed to be read from the seed storage section 31 is switched by a control switch 41 for the seed storage section in accordance with a control signal given from a distortion calculator.

Simple storing of a plurality of seeds for outputting different vector sequences from the oscillator 32 in the seed storage section 31 can allow more random code vectors to be generated with less capacity as compared with a case where complicated random code vectors are directly stored in a random codebook.

Although this mode has been described as a speech coder, the excitation vector generator 30 can be adapted to a speech decoder. In this case, the speech decoder has a seed storage section with the same contents as those of the seed storage section 31 of the speech coder and the control switch 41 for the seed storage section is supplied with a seed number selected at the time of coding.

(Second Mode)

Figure 5:
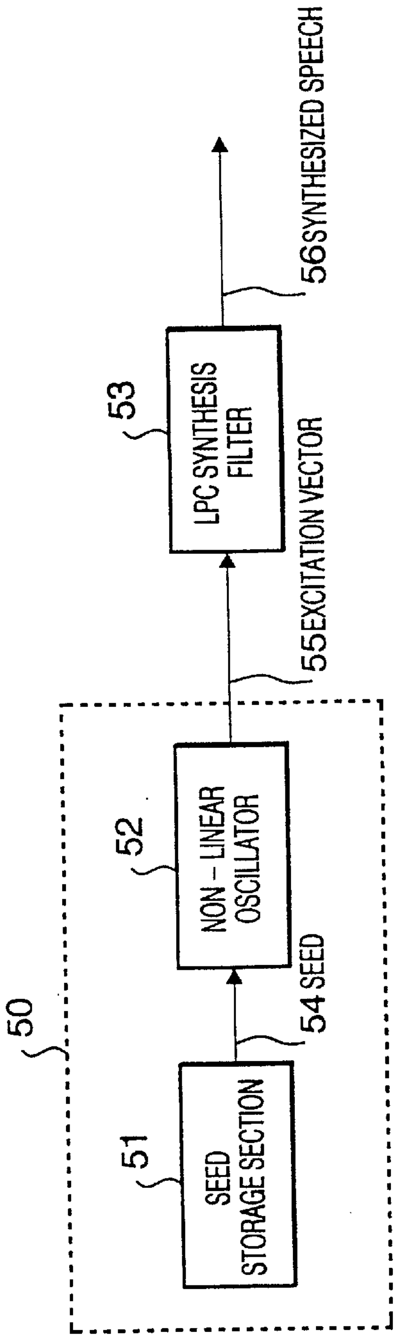
FIG. 5 is a block diagram of the essential portions of a speech coder according to a second mode.

FIG. 5 is a block diagram of the essential portions of a speech coder according to this mode. This speech coder comprises an excitation vector generator 50, which has a seed storage section 51 and a non-linear oscillator 52, and an LPC synthesis filter 53.

Seeds (oscillation seeds) 54 output from the seed storage section 51 are input to the non-linear oscillator 52. An excitation vector 55 as a vector sequence output from the non-linear oscillator 52 is input to the LPC synthesis filter 53. The output of the LPC synthesis filter 53 is a synthesized speech 56.

The non-linear oscillator 52 outputs different vector sequences according to the values of the input seeds 54, and the LPC synthesis filter 53 performs LPC synthesis on the input excitation vector 55 to output the synthesized speech 56.

Figure 6:
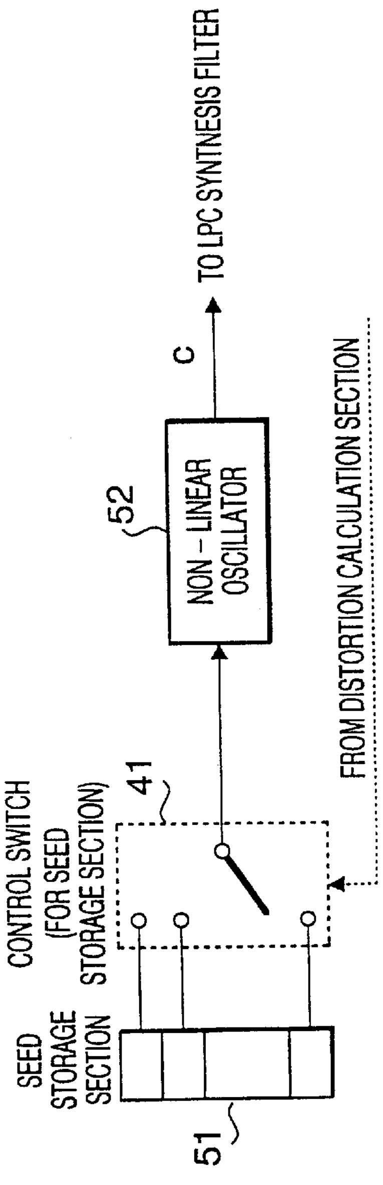
FIG. 6 is a block diagram of an excitation vector generator equipped in the speech coder of the second mode.

FIG. 6 shows the functional blocks of the excitation vector generator 50. A seed to be read from the seed storage section 51 is switched by a control switch 41 for the seed storage section in accordance with a control signal given from a distortion calculator.

The use of the non-linear oscillator 52 as an oscillator in the excitation vector 50 can suppress divergence with oscillation according to the non-linear characteristic, and can provide practical excitation vectors.

Although this mode has been described as a speech coder, the excitation vector generator 50 can be adapted to a speech decoder. In this case, the speech decoder has a seed storage section with the same contents as those of the seed storage section 51 of the speech coder and the control switch 41 for the seed storage section is supplied with a seed number selected at the time of coding.

(Third Mode)

Figure 7:
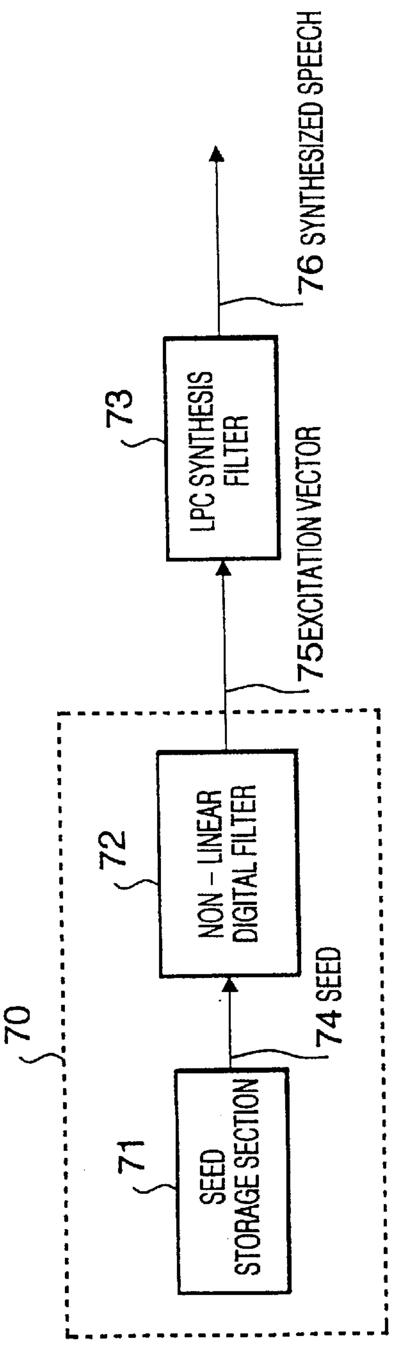
FIG. 7 is a block diagram of the essential portions of a speech coder according to third and fourth modes.

FIG. 7 is a block diagram of the essential portions of a speech coder according to this mode. This speech coder comprises an excitation vector generator 70, which has a seed storage section 71 and a non-linear digital filter 72, and an LPC synthesis filter 73. In the diagram, numeral "74" denotes a seed (oscillation seed) which is output from the seed storage section 71 and input to the non-linear digital filter 72, numeral "75" is an excitation vector as a vector sequence output from the non-linear digital filter 72, and numeral "76" is a synthesized speech output from the LPC synthesis filter 73.

Figure 8:
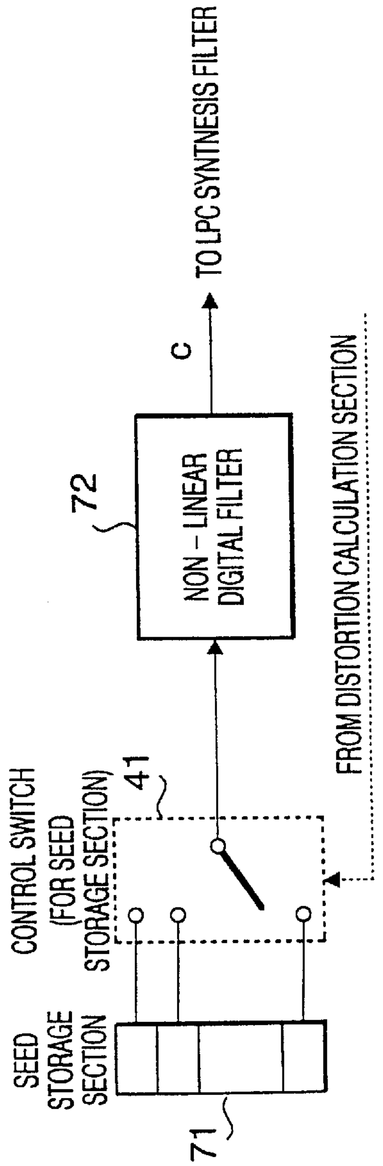
FIG. 8 is a block diagram of an excitation vector generator equipped in the speech coder of the third mode.

The excitation vector generator 70 has a control switch 41 for the seed storage section which switches a seed to be read from the seed storage section 71 in accordance with a control signal given from a distortion calculator, as shown in FIG. 8.

The non-linear digital filter 72 outputs different vector sequences according to the values of the input seeds, and the LPC synthesis filter 73 performs LPC synthesis on the input excitation vector 75 to output the synthesized speech 76.

The use of the non-linear digital filter 72 as an oscillator in the excitation vector 70 can suppress divergence with oscillation according to the non-linear characteristic, and can provide practical excitation vectors. Although this mode has been described as a speech coder, the excitation vector generator 70 can be adapted to a speech decoder. In this case, the speech decoder has a seed storage section with the same contents as those of the seed storage section 71 of the speech coder and the control switch 41 for the seed storage section is supplied with a seed number selected at the time of coding.

(Fourth Mode)

A speech coder according to this mode comprises an excitation vector generator 70, which has a seed storage section 71 and a non-linear digital filter 72, and an LPC synthesis filter 73, as shown in FIG. 7.

Figure 9:
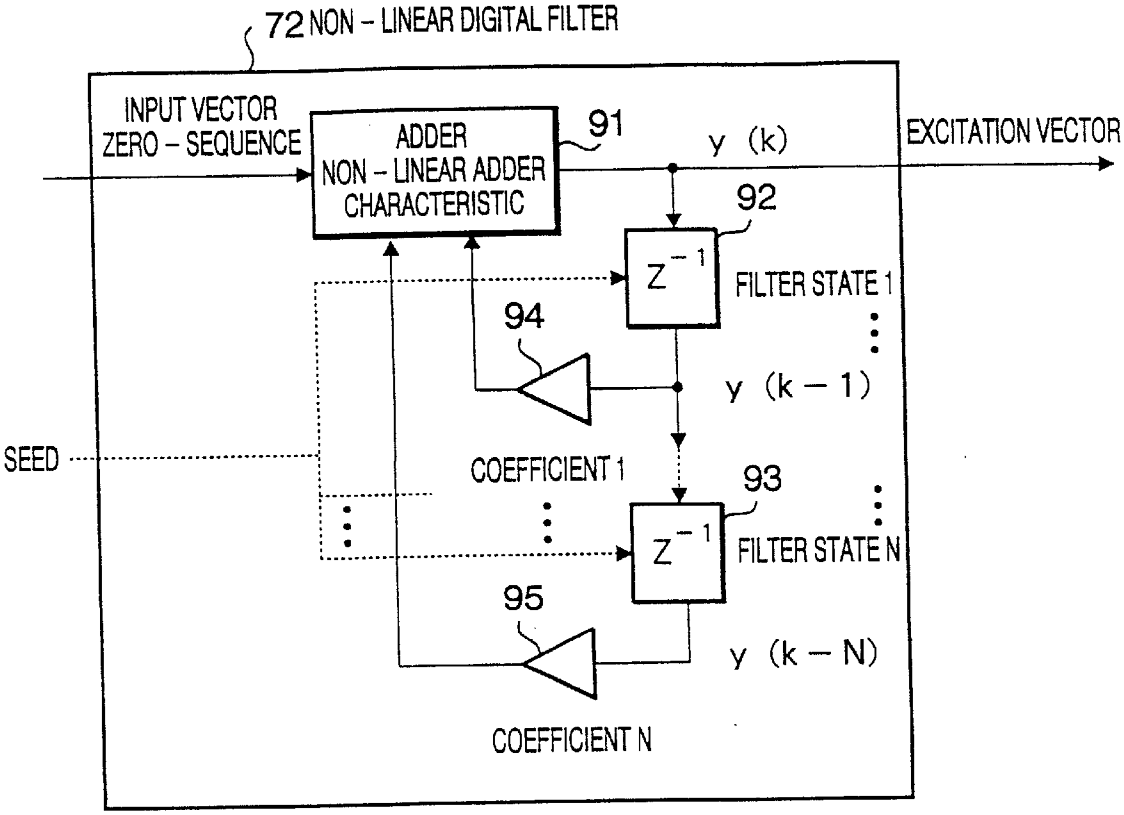
FIG. 9 is a block diagram of a non-linear digital filter equipped in the speech coder of the fourth mode.
Figure 10:
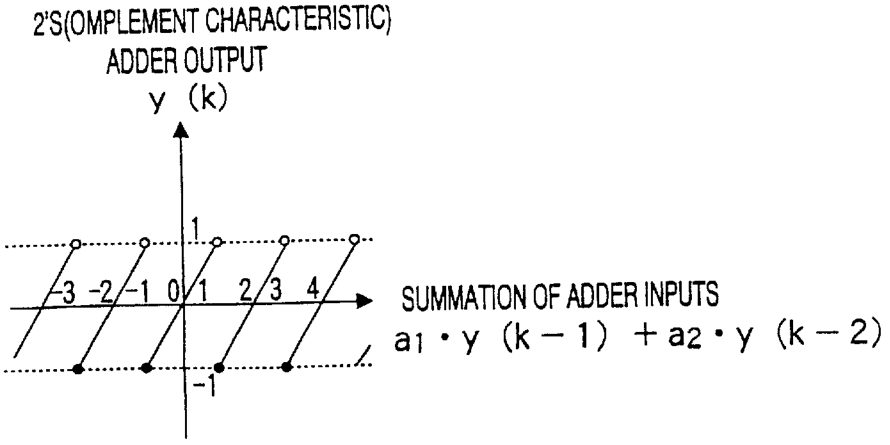
FIG. 10 is a diagram of the adder characteristic of the non-linear digital filter shown in FIG. 9.

Particularly, the non-linear digital filter 72 has a structure as depicted in FIG. 9. This non-linear digital filter 72 includes an adder 91 having a non-linear adder characteristic as shown in FIG. 10, filter state holding sections 92 to 93 capable of retaining the states (the values of y(k−1) to y(k−N)) of the digital filter, and multipliers 94 to 95, which are connected in parallel to the outputs of the respective filter state holding sections 92–93, multiply filter states by gains and output the results to the adder 91. The initial values of the filter states are set in the filter state holding sections 92–93 by seeds read from the seed storage section 71. The values of the gains of the multipliers 94–95 are so fixed that the polarity of the digital filter lies outside a unit circle on a Z plane.

FIG. 10 is a conceptual diagram of the non-linear adder characteristic of the adder 91 equipped in the non-linear digital filter 72, and shows the input/output relation of the adder 91 which has a 2's complement characteristic. The adder 91 first acquires the sum of adder inputs or the sum of the input values to the adder 91, and then uses the non-linear characteristic illustrated in FIG. 10 to compute an adder output corresponding to the input sum.

In particular, the non-linear digital filter 72 is a second-order all-pole model so that the two filter state holding sections 92 and 93 are connected in series, and the multipliers 94 and 95 are connected to the outputs of the filter state holding sections 92 and 93. Further, the digital filter in which the non-linear adder characteristic of the adder 91 is a 2's complement characteristic is used. Furthermore, the seed storage section 71 retains seed vectors of 32 words as particularly described in Table 1.

TABLE 1

Seed vectors for generating random code vectors

| i | Sy(n-1)[i] | Sy(n-2)[i] |
|---|---|---|
| 1 | 0.250000 | 0.250000 |
| 2 | −0.564643 | −0.104927 |
| 3 | 0.173879 | −0.978792 |
| 4 | 0.632652 | 0.951133 |
| 5 | 0.920360 | −0.113881 |
| 6 | 0.864873 | −0.860368 |
| 7 | 0.732227 | 0.497037 |
| 8 | 0.917543 | −0.035103 |
| 9 | 0.109521 | −0.761210 |
| 10 | −0.202115 | 0.198718 |
| 11 | −0.095041 | 0.863849 |
| 12 | −0.634213 | 0.424549 |
| 13 | 0.948225 | −0.184861 |
| 14 | −0.958269 | 0.969458 |
| 15 | 0.233709 | −0.057248 |
| 16 | −0.852085 | −0.564948 |

In the thus constituted speech coder, seed vectors read from the seed storage section 71 are given as initial values to the filter state holding sections 92 and 93 of the non-linear digital filter 72. Every time zero is input to the adder 91 from an input vector (zero sequences), the non-linear digital filter 72 outputs one sample (y(k)) at a time which is sequentially transferred as a filter state to the filter state holding sections 92 and 93. At this time, the multipliers 94 and 95 multiply the filter states output from the filter state holding sections 92 and 93 by gains a1 and a2 respectively. The adder 91 adds the outputs of the multipliers 94 and 95 to acquire the sum of the adder inputs, and generates an adder output which is suppressed between +1 to −1 based on the characteristic in FIG. 10. This adder output (y(k+1)) is output as an excitation vector and is sequentially transferred to the filter state holding sections 92 and 93 to produce a new sample (y(k+2)).

Since the coefficients 1 to N of the multipliers 94–95 are fixed so that particularly the poles of the non-linear digital filter lies outside a unit circle on the Z plane according to this mode, thereby providing the adder 91 with a non-linear adder characteristic, the divergence of the output can be suppressed even when the input to the non-linear digital filter 72 becomes large, and excitation vectors good for practical use can be kept generated. Further, the randomness of excitation vectors to be generated can be secured.

Although this mode has been described as a speech coder, the excitation vector generator 70 can be adapted to a speech decoder. In this case, the speech decoder has a seed storage section with the same contents as those of the seed storage section 71 of the speech coder and the control switch 41 for the seed storage section is supplied with a seed number selected at the time of coding.

(Fifth Mode)

Figure 11:
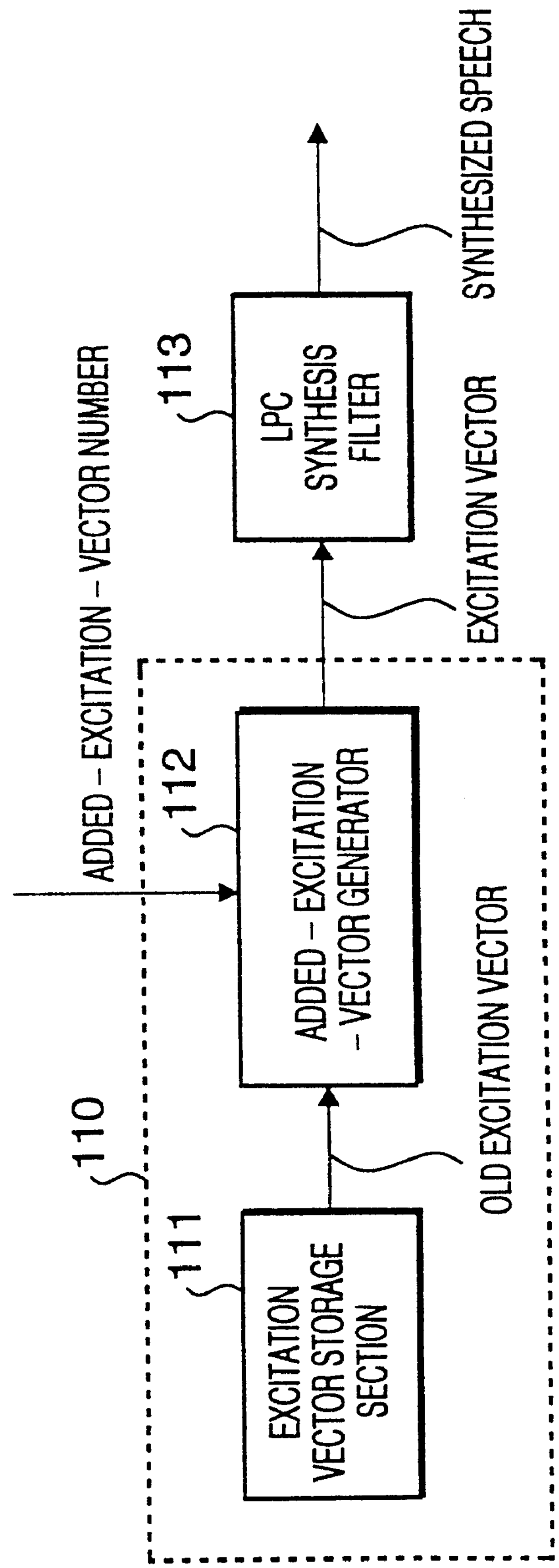
FIG. 11 is a block diagram of the essential portions of a speech coder according to a fifth mode.

FIG. 11 is a block diagram of the essential portions of a speech coder according to this mode. This speech coder comprises an excitation vector generator 110, which has an excitation vector storage section 111 and an added-excitation-vector generator 112, and an LPC synthesis filter 113.

The excitation vector storage section 111 retains old excitation vectors which are read by a control switch upon reception of a control signal from an unillustrated distortion calculator.

The added-excitation-vector generator 112 performs a predetermined process, indicated by an added-excitation-vector number excitation vector, on an old excitation vector read from the storage section 111 to produce a new excitation vector. The added-excitation-vector generator 112 has a function of switching the process content for an old excitation vector in accordance with the added-excitation-vector number.

According to the thus constituted speech coder, an added-excitation-vector number is given from the distortion calculator which is executing, for example, an excitation vector search. The added-excitation-vector generator 112 executes different processes on old excitation vectors depending on the value of the input added-excitation-vector number to generate different added excitation vectors, and the LPC synthesis filter 113 performs LPC synthesis on the input excitation vector to output a synthesized speech.

According to this mode, random excitation vectors can be generated simply by storing fewer old excitation vectors in the excitation vector storage section 111 and switching the process contents by means of the added-excitation-vector generator 112, and it is unnecessary to store random code vectors directly in a random codebook (ROM). This can significantly reduce the memory capacity.

Although this mode has been described as a speech coder, the excitation vector generator 110 can be adapted to a speech decoder. In this case, the speech decoder has an excitation vector storage section with the same contents as those of the excitation vector storage section 111 of the speech coder and an added-excitation-vector number selected at the time of coding is given to the added-excitation-vector generator 112.

(Sixth Mode)

Figure 12:
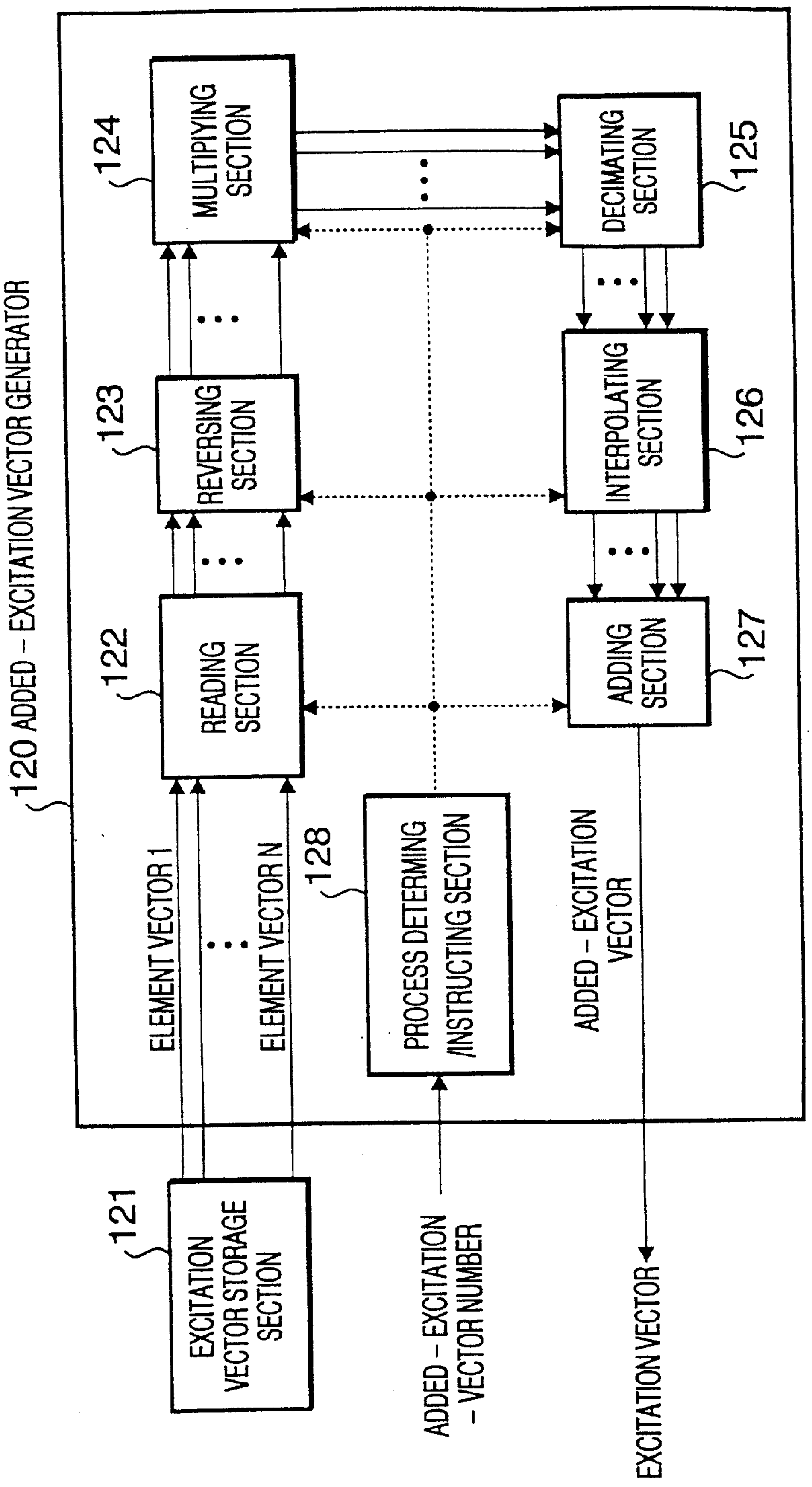
FIG. 12 is a block diagram of the essential portions of a speech coder according to a sixth mode.

FIG. 12 shows the functional blocks of an excitation vector generator according to this mode. This excitation vector generator comprises an added-excitation-vector generator 120 and an excitation vector storage section 121 where a plurality of element vectors 1 to N are stored.

The added-excitation-vectot generator 120 includes a reading section 122 which performs a process of reading a plurality of element vectors of different lengths from different positions in the excitation vector storage section 121, a reversing section 123 which performs a process of sorting the read element vectors in the reverse order, a multiplying section 124 which performs a process of multiplying a plurality of vectors after the reverse process by different gains respectively, a decimating section 125 which performs a process of shortening the vector lengths of a plurality of vectors after the multiplication, an interpolating section 126 which performs a process of lengthening the vector lengths of the thinned vectors, an adding section 127 which performs a process of adding the interpolated vectors, and a process determining/instructing section 128 which has a function of determining a specific processing scheme according to the value of the input added-excitation-vector number and instructing the individual sections and a function of holding a conversion map (Table 2) between numbers and processes which is referred to at the time of determining the specific process contents.

TABLE 2

Conversion map between numbers and processes

| Bit stream (MS . . . LSB) | 6 | 5 | 4 | 3 | 2 | 1 | 0 |
|---|---|---|---|---|---|---|---|
| V1 reading position (16 kinds) | | | | 3 | 2 | 1 | 0 |
| V2 reading position (32 kinds) | 2 | 1 | 0 | | | 4 | 3 |
| V3 reading position (32 kinds) | 4 | 3 | 2 | 1 | 0 | | |
| Reverse process (2 kinds) | | | | | | | 0 |
| Multiplication (4 kinds) | 1 | 0 | | | | | |
| decimating process (4 kinds) | | | | 1 | 0 | | |
| interpolation (2 kinds) | | | 0 | | | | |

The added-excitation-vector generator 120 will now be described more specifically. The added-excitation-vector generator 120 determines specific processing schemes for the reading section 122, the reversing section 123, the multiplying section 124, the decimating section 125, the interpolating section 126 and the adding section 127 by comparing the input added-excitation-vector number (which is a sequence of 7 bits taking any integer value from 0 to 127) with the conversion map between numbers and processes (Table 2), and reports the specific processing schemes to the respective sections.

The reading section 122 first extracts an element vector 1 (V1) of a length of 100 from one end of the excitation vector storage section 121 to the position of n1, paying attention to a sequence of the lower four bits of the input added-excitation-vector number (n1: an integer value from 0 to 15). Then, the reading section 122 extracts an element vector 2 (V2) of a length of 78 from the end of the excitation vector storage section 121 to the position of n2+14 (an integer value from 14 to 45), paying attention to a sequence of five bits (n2: an integer value from 14 to 45) having the lower two bits and the upper three bits of the input added-excitation-vector number linked together. Further, the reading section 122 performs a process of extracting an element vector 3 (V3 ) of a length of Ns (=52) from one end of the excitation vector storage section 121 to the position of n3+46 (an integer value from 46 to 77), paying attention to a sequence of the upper five bits of the input added-excitation-vector number (n3: an integer value from 0 to 31), and sending V1, V2 and V3 to the reversing section 123.

The reversing section 123 performs a process of sending a vector having V1, V2 and V3 rearranged in the reverse order to the multiplying section 124 as new V1, V2 and V3 when the least significant bit of the added-excitation-vector number is "0" and sending V1, V2 and V3 as they are to the multiplying section 124 when the least significant bit is "1."

Paying attention to a sequence of two bits having the upper seventh and sixth bits of the added-excitation-vector number linked, the multiplying section 124 multiplies the amplitude of V2 by −2 when the bit sequence is "00," multiplies the amplitude of V3 by −2 when the bit sequence is "01," multiplies the amplitude of V1 by −2 when the bit sequence is "10" or multiplies the amplitude of V2 by 2 when the bit sequence is "11," and sends the result as new V1, V2 and V3 to the decimating section 125.

Paying attention to a sequence of two bits having the upper fourth and third bits of the added-excitation-vector number linked, the decimating section 125 (a) sends vectors of 26 samples extracted every other sample from V1, V2 and V3 as new V1, V2 and V3 to the interpolating section 126 when the bit sequence is "00," (b) sends vectors of 26 samples extracted every other sample from V1 and V3 and every third sample from V2 as new V1, V3 and V2 to the interpolating section 126 when the bit sequence is "01," (c) sends vectors of 26 samples extracted every fourth sample from V1 and every other sample from V2 and V3 as new V1, V2 and V3 to the interpolating section 126 when the bit sequence is "10," and (d) sends vectors of 26 samples extracted every fourth sample from V1, every third sample from V2 and every other sample from V3 as new V1, V2 and V3 to the interpolating section 126 when the bit sequence is "11."

Paying attention to the upper third bit of the added-excitation-vector number, the interpolating section 126 (a) sends vectors which have V1, V2 and V3 respectively substituted in even samples of zero vectors of a length Ns (=52) as new V1, V2 and V3 to the adding section 127 when the value of the third bit is "0" and (b) sends vectors which have V1, V2 and V3 respectively substituted in odd samples of zero vectors of a length Ns (=52) as new V1, V2 and V3 to the adding section 127 when the value of the third bit is "1."

The adding section 127 adds the three vectors (V1, V2 and V3 ) produced by the interpolating section 126 to generate an added excitation vector.

According to this mode, as apparent from the above, a plurality of processes are combined at random in accordance with the added-excitation-vector number to produce random excitation vectors, so that it is unnecessary to store random code vectors as they are in a random codebook (ROM), ensuring a significant reduction in memory capacity.

Note that the use of the excitation vector generator of this mode in the speech coder of the fifth mode can allow complicated and random excitation vectors to be generated without using a large-capacity random codebook.

(Seventh Mode)

A description will now be given of a seventh mode in which the excitation vector generator of any one of the above-described first to sixth modes is used in a CELP type speech coder that is based on the PSI-CELP, the standard speech coding/decoding system for PDC digital portable telephones in Japan.

Figure 13A:
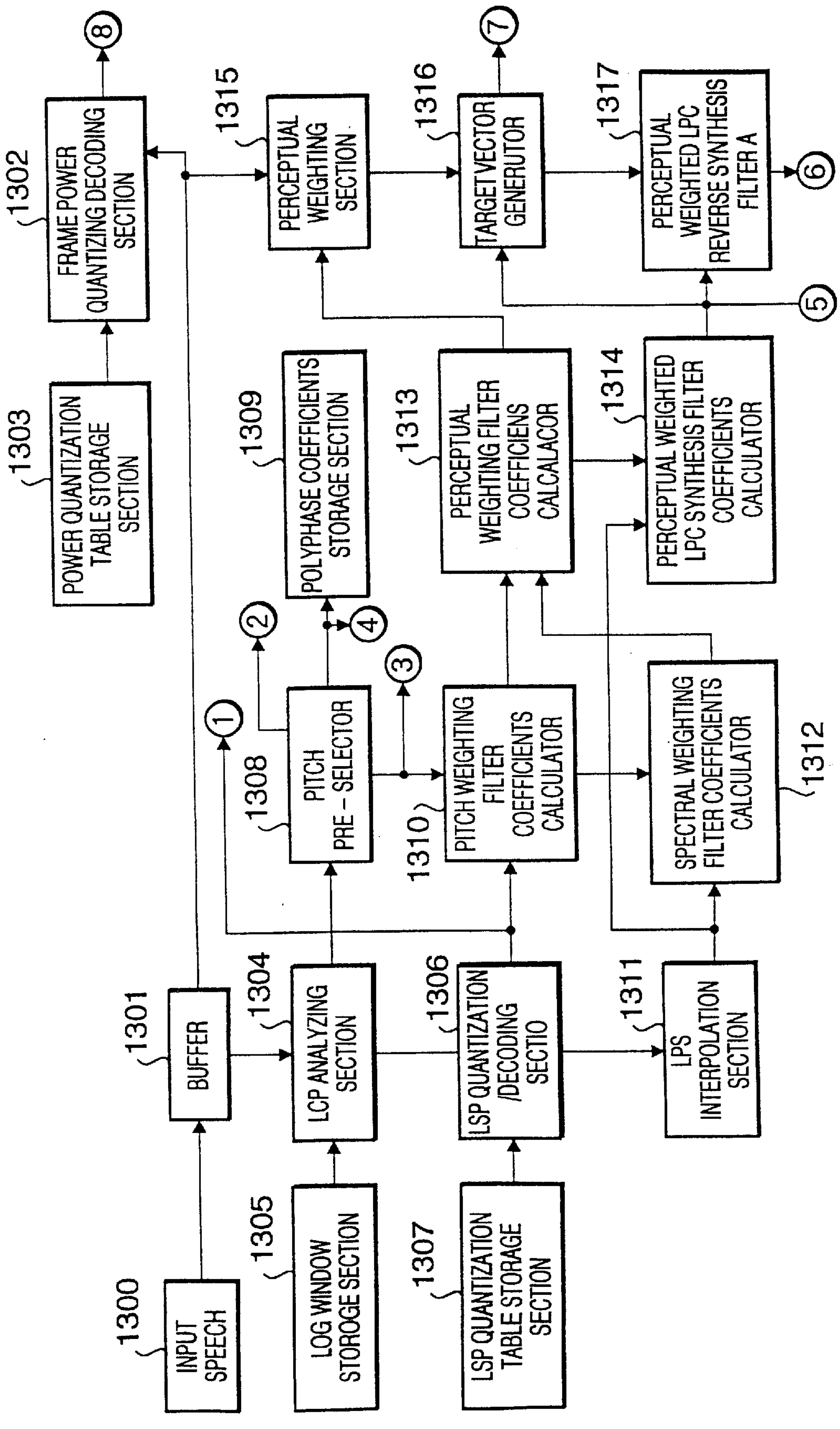
FIG. 13A is a block diagram of the essential portions of a speech coder according to a seventh mode.

FIG. 13A is presents a block diagram of a speech coder according to the seventh mode. In this speech coder, digital input speech data 1300 is supplied to a buffer 1301 frame by frame (frame length Nf=104). At this time, old data in the buffer 1301 is updated with new data supplied. A frame power quantizing/decoding section 1302 first reads a processing frame s(i) ($0 \leqq i \leqq Nf-1$) of a length Nf (=104) from the buffer 1301 and acquires mean power amp of samples in that processing frame from an equation 5.

$$\text{amp} = \sqrt{\frac{\sum_{i=0}^{Nf} s^2(i)}{Nf}} \tag{5}$$

where amp: mean power of samples in a processing frame i: element number ($0 \leqq i \leqq Nf-1$) in the processing frame s(i): samples in the processing frame Nf: processing frame length (=52).

The acquired mean power amp of samples in the processing frame is converted to a logarithmically converted value amplog from an equation 6.

$$\text{amp log} = \frac{\log_{10}(255 \times \text{amp} + 1)}{\log_{10}(255 + 1)} \tag{6}$$

where amplog: logarithmically converted value of the mean power of samples in the processing frame amp: mean power of samples in the processing frame.

The acquired amplog is subjected to scalar quantization using a scalar-quantization table Cpow of 10 words as shown in Table 3 stored in a power quantization table storage section 1303 to acquire an index of power Ipow of four bits, decoded frame power spow is obtained from the acquired index of power Ipow, and the index of power Ipow and decoded frame power spow are supplied to a parameter coding section 1331. The power quantization table storage section 1303 is holding a power scalar-quantization table (Table 3) of 16 words, which is referred to when the frame power quantizing/decoding section 1302 carries out scalar quantization of the logarithmically converted value of the mean power of the samples in the processing frame.

TABLE 3

Power scalar-quantization table

| i | Cpow(i) |
|---|---|
| 1 | 0.00675 |
| 2 | 0.06217 |
| 3 | 0.10877 |
| 4 | 0.16637 |
| 5 | 0.21876 |
| 6 | 0.26123 |
| 7 | 0.30799 |
| 8 | 0.35228 |
| 9 | 0.39247 |
| 10 | 0.42920 |
| 11 | 0.46252 |
| 12 | 0.49503 |
| 13 | 0.52784 |
| 14 | 0.56484 |
| 15 | 0.61125 |
| 16 | 0.67498 |

An LPC analyzing section 1304 first reads analysis segment data of an analysis segment length Nw (=256) from the buffer 1301, multiplies the read analysis segment data by a Hamming window of a window length Nw (=256) to yield a Hamming windowed analysis data and acquires the autocorrelation function of the obtained Hamming windowed analysis data to a prediction order Np (=10). The obtained autocorrelation function is multiplied by a lag window table (Table 4) of 10 words stored in a lag window storage section 1305 to acquire a Hamming windowed autocorrelation function, performs linear predictive analysis on the obtained Hamming windowed autocorrelation function to compute an LPC parameter $\alpha(i)$ ($1 \leqq i \leqq Np$) and outputs the parameter to a pitch pre-selector 1308.

TABLE 4

Lag window table

| i | Wlag(i) |
|---|---|
| 0 | 0.9994438 |
| 1 | 0.9977772 |
| 2 | 0.9950056 |
| 3 | 0.9911382 |

TABLE 4-continued

| Lag window table | |
|---|---|
| i | Wlag(i) |
| 4 | 0.9861880 |
| 5 | 0.9801714 |
| 6 | 0.9731081 |
| 7 | 0.9650213 |
| 8 | 0.9559375 |
| 9 | 0.9458861 |

Next, the obtained LPC parameter α(i) is converted to an LSP (Linear Spectrum Pair) ω(i) (1≦i≦Np) which is in turn output to an LSP quantizing/decoding section 1306. The lag window storage section 1305 is holding a lag window table to which the LPC analyzing section refers.

The LSP quantizing/decoding section 1306 first refers to a vector quantization table of an LSP stored in a LSP quantization table storage section 1307 to perform vector quantization on the LSP received from the LPC analyzing section 1304, thereby selecting an optimal index, and sends the selected index as an LSP code Ilsp to the parameter coding section 1331. Then, a centroid corresponding to the LSP code is read as a decoded LSP ωq(i) (1≦i≦Np) from the LSP quantization table storage section 1307, and the read decoded LSP is sent to an LSP interpolation section 1311. Further, the decoded LSP is converted to an LPC to acquire a decoded LSP αq(i) (1≦i≦Np), which is in turn sent to a spectral weighting filter coefficients calculator 1312 and a perceptual weighted LPC synthesis filter coefficients calculator 1314. The LSP quantization table storage section 1307 is holding an LSP vector quantization table to which the LSP quantizing/decoding section 1306 refers when performing vector quantization on an LSP.

The pitch pre-selector 1308 first subjects the processing frame data s(i) (0≦i≦Nf−1) read from the buffer 1301 to inverse filtering using the LPC a (i) (1≦i≦Np) received from the LPC analyzing section 1304 to obtain a linear predictive residual signal res(i) (0≦i≦Nf−1), computes the power of the obtained linear predictive residual signal res(i), acquires a normalized predictive residual power resid resulting from normalization of the power of the computed residual signal with the power of speech samples of a processing subframe, and sends the normalized predictive residual power to the parameter coding section 1331. Next, the linear predictive residual signal res(i) is multiplied by a Hamming window of a length Nw (=256) to produce a Hamming windowed linear predictive residual signal resw (i) (0≦i≦Nw−1), and an autocorrelation function ϕint(i) of the produced resw(i) is obtained over a range of Lmin−2≦i≦Lmax+2 (where Lmin is 16 in the shortest analysis segment of a long predictive coefficient and Lmax is 128 in the longest analysis segment of a long predictive coefficient). A polyphase filter coefficient Cppf (Table 5) of 28 words stored in a polyphase coefficients storage section 1309 is convoluted in the obtained autocorrelation function ϕint(i) to acquire an autocorrelation function ϕdq(i) at a fractional position shifted by −1/4 from an integer lag int, an autocorrelation function ϕaq(i) at a fractional position shifted by +1/4 from the integer lag int, and an autocorrelation function ϕah(i) at a fractional position shifted by +1/2 from the integer lag int.

TABLE 5

| Polyphase filter coefficients Cppf | |
|---|---|
| i | Cppf(i) |
| 0 | 0.100035 |
| 1 | −0.180063 |
| 2 | 0.900316 |
| 3 | 0.300105 |
| 4 | −0.128617 |
| 5 | 0.081847 |
| 6 | −0.060021 |
| 7 | 0.000000 |
| 8 | 0.000000 |
| 9 | 1.000000 |
| 10 | 0.000000 |
| 11 | 0.000000 |
| 12 | 0.000000 |
| 13 | 0.000000 |
| 14 | −0.128617 |
| 15 | 0.300105 |
| 16 | 0.900316 |
| 17 | −0.180063 |
| 18 | 0.100035 |
| 19 | −0.069255 |
| 20 | 0.052960 |
| 21 | −0.212207 |
| 22 | 0.636620 |
| 23 | 0.636620 |
| 24 | −0.212207 |
| 25 | 0.127324 |
| 26 | −0.090946 |
| 27 | 0.070736 |

Further, for each argument i in a range of Lmin−2≦i≦Lmax+2, a process of an equation 7 of substituting the largest one of ϕ(int(i), ϕdq(i), ϕaq(i) and ϕah(i) in ϕmax(i) to acquire (Lmax−Lmin+1) pieces of ϕmax(i).

$$\phi max(i)=MAX(\phi int(i),\phi dq(i),\phi aq(i),\phi ah(i))$$

$$\phi max(i)\text{: maximum value of } \phi int(i),\phi dq(i),\phi aq(i),\phi ah(i) \quad (7)$$

where

ϕmax(i): the maximum value among ϕint(i), ϕdq(i), ϕaq (i), ϕah(i)

I: analysis segment of a long predictive coefficient (Lmin≦i≦Lmax)

Lmin: shortest analysis segment (=16) of the long predictive coefficient

Lmax: longest analysis segment (=128) of the long predictive coefficient

ϕint(i): autocorrelation function of an integer lag (int) of a predictive residual signal ϕdq(i): autocorrelation function of a fractional lag (int−4) of the predictive residual signal ϕaq(i): autocorrelation function of a fractional lag (int+1/4) of the predictive residual signal ϕah(i): autocorrelation function of a fractional lag (int+1/2) of the predictive residual signal.

Larger top six are selected from the acquire (Lmax−Lmin+1) pieces of ϕmax(i) and are saved as pitch candidates psel(i) (0≦i≦5), and the linear predictive residual signal res(i) and the first pitch candidate psel(0) are sent to a pitch weighting filter calculator 1310 and psel(i) (0≦i≦5) to an adaptive code vector generator 1319.

The polyphase coefficients storage section 1309 is holding polyphase filter coefficients to be referred to when the pitch pre-selector 1308 acquires the autocorrelation of the linear predictive residual signal to a fractional lag precision and when the adaptive code vector generator 1319 produces adaptive code vectors to a fractional precision.

The pitch weighting filter calculator 1310 acquires pitch predictive coefficients cov(i) (0i≦2) of a third order from the linear predictive residuals res(i) and the first pitch candidate psel(0) obtained by the pitch pre-selector 1308. The impulse response of a pitch weighting filter Q(z) is obtained from an equation which uses the acquired pitch predictive coefficients cov(i) (0≦i≦2), and is sent to the spectral weighting filter coefficients calculator 1312 and a perceptual weighting filter coefficients calculator 1313.

$$Q(z) = 1 + \sum_{i=0}^{2} cov(i) \times \lambda pi \times z - psel(0) + i - 1 \tag{8}$$

where

Q(z): transfer function of the pitch weighting filter cov(i): pitch predictive coefficients (0≦i≦2)

λpi: pitch weighting constant (=0.4)

psel(0): first pitch candidate.

The LSP interpolation section 1311 first acquires a decoded interpolated LSP ωintp(n,i) (1≦i≦Np) subframe by subframe from an equation 9 which uses a decoded LSP ωq(i) for the current processing frame, obtained by the LSP quantizing/decoding section 1306, and a decoded LSP ωqp (i) for a previous processing frame which has been acquired and saved earlier.

$$\omega \text{int}p(n, i) = \begin{cases} 0.4 \times \omega q(i) + 0.6 \times \omega qp(i) & n = 1 \\ \omega q(i) & n = 2 \end{cases} \tag{9}$$

where

ωintp(n,j): interpolated LSP of the n-th subframe n: subframe number (=1,2)

ωq(i): decoded LSP of a processing frame

ωqp(i): decoded LSP of a previous processing frame.

A decoded interpolated LPC αq(n,i) (1≦i≦Np) is obtained by converting the acquired ωintp(n,i) to an LPC and the acquired, decoded interpolated LPC α q(n,i) (1≦i≦Np) is sent to the spectral weighting filter coefficients calculator 1312 and the perceptual weighted LPC synthesis filter coefficients calculator 1314.

The spectral weighting filter coefficients calculator 1312, which constitutes an MA type spectral weighting filter I(z) in an equation 10, sends its impulse response to the perceptual weighting filter coefficients calculator 1313.

$$I(z) = \sum_{i=1}^{Nfir} \alpha fir(i) \times z^{-i} \tag{10}$$

where

I(z): transfer function of the MA type spectral weighting filter

Nfir: filter order (=11) of I(z)

αfir(i): filter order (1≦i≦Nfir) of I(z).

Note that the impulse response αfir(i) (1≦i≦Nfir) in the equation 10 is an impulse response of an ARMA type spectral weighting filter G(z), given by an equation 11, cut after Nfir(=11).

$$G(z) = \frac{1 + \sum_{i=1}^{Np} \alpha(n, i) \times \lambda ma^i \times z^{-i}}{1 + \sum_{i=1}^{Np} \alpha(n, i) \times \lambda ar^i \times z^{-i}} \tag{11}$$

where

G(z): transfer function of the spectral weighting filter n: subframe number (=1,2)

Np: LPC analysis order (=10)

α(n,i): decoded interpolated LSP of the n-th subframe

λma: numerator constant (=0.9) of G(z)

λar: denominator constant (=0.4) of G(z).

The perceptual weighting filter coefficients calculator 1313 first constitutes a perceptual weighting filter W(z) which has as an impulse response the result of convolution of the impulse response of the spectral weighting filter I(z) received from the spectral weighting filter coefficients calculator 1312 and the impulse response of the pitch weighting filter Q(z) received from the pitch weighting filter calculator 1310, and sends the impulse response of the constituted perceptual weighting filter W(z) to the perceptual weighted LPC synthesis filter coefficients calculator 1314 and a perceptual weighting section 1315.

The perceptual weighted LPC synthesis filter coefficients calculator 1314 constitutes a perceptual weighted LPC synthesis filter H(z) from an equation 12 based on the decoded interpolated LPC αq(n,i) received from the LSP interpolation section 1311 and the perceptual weighting filter W(z) received from the perceptual weighting filter coefficients calculator 1313.

$$H(z) = \frac{1}{1 + \sum_{i=1}^{Np} \alpha q(n, i) \times z^{-i}} W(z) \tag{12}$$

where

H(z): transfer function of the perceptual weighted synthesis filter

Np: LPC analysis order

αq(n,i): decoded interpolated LPC of the n-th subframe n: subframe number (=1,2)

W(z): transfer function of the perceptual weighting filter (I(z) and Q(z) cascade-connected).

The coefficient of the constituted perceptual weighted LPC synthesis filter H(z) is sent to a target vector generator A 1316, a perceptual weighted LPC reverse synthesis filter A 1317, a perceptual weighted LPC synthesis filter A 1321, a perceptual weighted LPC reverse synthesis filter B 1326 and a perceptual weighted LPC synthesis filter B 1329.

The perceptual weighting section 1315 inputs a subframe signal read from the buffer 1301 to the perceptual weighted LPC synthesis filter H(z) in a zero state, and sends its outputs as perceptual weighted residuals spw(i) (0≦i≦Ns−1) to the target vector generator A 1316.

The target vector generator A 1316 subtracts a zero input response Zres(i) (0≦i≦Ns−1), which is an output when a zero sequence is input to the perceptual weighted LPC synthesis filter H(z) obtained by the perceptual weighted LPC synthesis filter coefficients calculator 1314, from the perceptual weighted residuals spw(i) (0≦i≦Ns−1) obtained by the perceptual weighting section 1315, and sends the subtraction result to the perceptual weighted LPC reverse synthesis filter A 1317 and a target vector generator B 1325 as a target vector r(i) (0≦i≦Ns−1) for selecting an excitation vector.

The perceptual weighted LPC reverse synthesis filter A 1317 sorts the target vectors r(i) (0≦i≦Ns−1) received from the target vector generator A 1316 in a time reverse order, inputs the acquired vectors to the perceptual weighted LPC synthesis filter H(z) with the initial state of zero, and sorts its outputs again in a time reverse order to obtain time reverse synthesis rh(k) (0≦i≦Ns−1) of the target vector, and sends the vector to a comparator A 1322.

Stored in an adaptive codebook 1318 are old excitation vectors which are referred to when the adaptive code vector generator 1319 generates adaptive code vectors. The adaptive code vector generator 1319 generates Nac pieces of adaptive code vectors Pacb(i,k) (0≦i≦Nac−1, 0≦k≦≦Ns−1, 6≦Nac≦24) based on six pitch candidates psel(j) (0≦j≦5) received from the pitch pre-selector 1308, and sends the vectors to an adaptive/fixed selector 1320. Specifically, as shown in Table 6, adaptive code vectors are generated for four kinds of fractional lag positions per a single integer lag position when 16≦psel(j)≦44, adaptive code vectors are generated for two kinds of fractional lag positions per a single integer lag position when 46≦psel(j)≦64, and adaptive code vectors are generated for integer lag positions when 65≦psel(j)≦128. From this, depending on the value of psel(j) (0≦j≦5), the number of adaptive code vector candidates Nac is 6 at a minimum and 24 at a maximum.

TABLE 6

| Total number of adaptive code vectors and fixed code vectors | |
|---|---|
| Total number of vectors | 1255 |
| Number of adaptive code vectors | 222 |
| 16 ≦ psel(i) ≦ 44 | 116 (29 × four kinds of fractional lags) |
| 45 ≦ psel(i) ≦ 64 | 42 (21 × two kinds of fractional lags) |
| 65 ≦ psel(i) ≦ 128 | 64 (64 × one kind of fractional lag) |
| Number of fixed code vectors | 32(16 × two kinds of codes) |

Adaptive code vectors to a fractional precision are generated through an interpolation which convolutes the coefficients of the polyphase filter stored in the polyphase coefficients storage section 1309.

Interpolation corresponding to the value of lagf(i) means interpolation corresponding to an integer lag position when lagf(i)=0, interpolation corresponding to a fractional lag position shifted by −1/2 from an integer lag position when lagf(i)=1, interpolation corresponding to a fractional lag position shifted by +1/4 from an integer lag position when lagf(i)=2, and interpolation corresponding to a fractional lag position shifted by −1/4 from an integer lag position when lagf(i)=3.

The adaptive/fixed selector 1320 first receives adaptive code vectors of the Nac (6 to 24) candidates generated by the adaptive code vector generator 1319 and sends the vectors to the perceptual weighted LPC synthesis filter A 1321 and the comparator A 1322.

To pre-select the adaptive code vectors Pacb(i,k) (0≦i≦Nac−1, 0≦k≦Ns−1, 6≦Nac≦24) generated by the adaptive code vector generator 1319 to Nacb (=4) candidates from Nac (6 to 24) candidates, the comparator A 1322 first acquires the inner products prac(i) of the time reverse synthesized vectors rh(k) (0≦i≦Ns−1) of the target vector, received from the perceptual weighted LPC reverse synthesis filter A 1317, and the adaptive code vectors Pacb(i,k) from an equation 13.

$$prac(i) = \sum_{k=0}^{Ns-1} Pacb(i, k) \times rh(k) \tag{13}$$

where

Prac(i): reference value for pre-selection of adaptive code vectors

Nac: the number of adaptive code vector candidates after pre-selection (=6to 24)

i: number of an adaptive code vector (0≦i≦Nac−1)

Pacb(i,k): adaptive code vector rh(k): time reverse synthesis of the target vector r(k).

By comparing the obtained inner products Prac(i), the top Nacp (=4) indices when the values of the products become large and inner products with the indices used as arguments are selected and are respectively saved as indices of adaptive code vectors after pre-selection apsel(j) (0≦j≦Nacb−1) and reference values after pre-selection of adaptive code vectors prac(apsel(j)), and the indices of adaptive code vectors after pre-selection apsel(j) (0≦j≦Nacb−1) are output to the adaptive/fixed selector 1320.

The perceptual weighted LPC synthesis filter A 1321 performs perceptual weighted LPC synthesis on adaptive code vectors after pre-selection Pacb(absel(j),k), which have been generated by the adaptive code vector generator 1319 and have passed the adaptive/fixed selector 1320, to generate synthesized adaptive code vectors SYNacb(apsel(j),k) which are in turn sent to the comparator A 1322. Then, the comparator A 1322 acquires reference values for final-selection of an adaptive code vector sacbr(j) from an equation 14 for final-selection on the Nacb (=4) adaptive code vectors after pre-selection Pacb(absel(j),k), pre-selected by the comparator A 1322 itself.

$$sacbr(j) = \frac{prac^2(apsel(j))}{\sum_{k=0}^{Ns-1} SYNacb^2(j, k)} \tag{14}$$

where sacbr(j): reference value for final-selection of an adaptive code vector prac(): reference values after pre-selection of adaptive code vectors apsel(j): indices of adaptive code vectors after pre-selection k: vector order (0≦j≦Ns−1)

j: number of the index of a pre-selected adaptive code vector (0≦j≦Nacb−1)

Ns: subframe length (=52)

Nacb: the number of pre-selected adaptive code vectors (=4)

SYNacb(J,K): synthesized adaptive code vectors.

The index when the value of the equation 14 becomes large and the value of the equation 14 with the index used as an argument are sent to the adaptive/fixed selector 1320 respectively as an index of adaptive code vector after final-selection ASEL and a reference value after final-selection of an adaptive code vector sacbr(ASEL).

A fixed codebook 1323 holds Nfc (=16) candidates of vectors to be read by a fixed code vector reading section 1324. To pre-select fixed code vectors Pfcb(i,k) ($0 \leqq i \leqq Nfc-1$, $0 \leqq k \leqq Ns-1$) read by the fixed code vector reading section 1324 to Nfcb (=2) candidates from Nfc (=16) candidates, the comparator A 1322 acquires the absolute values |prfc(i)| of the inner products of the time reverse synthesized vectors rh(k) ($0 \leqq i \leqq Ns-1$) of the target vector, received from the perceptual weighted LPC reverse synthesis filter A 1317, and the fixed code vectors Pfcb(i,k) from an equation 15.

$$|prfc(i)| = \sum_{k=0}^{Ns-1} Pfcb(i, k) \times rh(k) \tag{15}$$

where

|prfc(i)|: reference values for pre-selection of fixed code vectors k: element number of a vector ($0 \leqq k \leqq Ns-1$)

i: number of a fixed code vector ($0 \leqq i \leqq Nfc-1$)

Nfc: the number of fixed code vectors (=16)

Pfcb(i,k): fixed code vectors rh(k): time reverse synthesized vectors of the target vector rh(k).

By comparing the values |prfc(i)| of the equation the top Nfcb (=2) indices when the values become large and the absolute values of inner products with the indices used as arguments are selected and are respectively saved as indices of fixed code vectors after pre-selection fpsel(j) ($0 \leqq j \leqq Nfcb-1$) and reference values for fixed code vectors after pre-selection |prfc(fpsel(j)|, and indices of fixed code vectors after pre-selection fpsel(j) ($0 \leqq j \leqq Nfcb-1$) are output to the adaptive/fixed selector 1320.

The perceptual weighted LPC synthesis filter A 1321 performs perceptual weighted LPC synthesis on fixed code vectors after pre-selection Pfcb(fpsel(j),k) which have been read from the fixed code vector reading section 1324 and have passed the adaptive/fixed selector 1320, to generate synthesized fixed code vectors SYNfcb(fpsel(j),k) which are in turn sent to the comparator A 1322.

The comparator A 1322 further acquires a reference value for final-selection of a fixed code vector sfcbr(j) from an equation 16 to finally select an optimal fixed code vector from the Nfcb (=2) fixed code vectors after pre-selection Pfcb(fpsel(j),k), pre-selected by the comparator A 1322 itself.

$$sfcbr(j) = \frac{|prfc(fpsel(j))|^2}{\sum_{k=0}^{Ns-1} SYNfcb^2(j, k)} \tag{16}$$

where sfcbr(j): reference value for final-selection of a fixed code vector

|prfc( )|: reference values after pre-selection of fixed code vectors fpsel(j): indices of fixed code vectors after pre-selection ($0 \leqq j \leqq Nfcb-1$)

k: element number of a vector ($0 \leqq k \leqq Ns-1$)

j: number of a pre-selected fixed code vector ($0 \leqq j \leqq Nfcb-1$)

Ns: subframe length (=52)

Nfcb: the number of pre-selected fixed code vectors (=2)

SYNfcb(J,K): synthesized fixed code vectors.

The index when the value of the equation 16 becomes large and the value of the equation 16 with the index used as an argument are sent to the adaptive/fixed selector 1320 respectively as an index of fixed code vector after final-selection FSEL and a reference value after final-selection of a fixed code vector sacbr(FSEL).

The adaptive/fixed selector 1320 selects either the adaptive code vector after final-selection or the fixed code vector after final-selection as an adaptive/fixed code vector AF(k) ($0 \leqq k \leqq Ns-1$) in accordance with the size relation and the polarity relation among prac(ASEL), sacbr(ASEL), |prfc (FSEL)| and sfcbr(FSEL) (described in an equation 17) received from the comparator A 1322.

$$AF(k) = \begin{cases} Pacb(ASEL, k) & sacbr(ASEL) \ge sfcbr(FSEL),\ prac(ASEL) > 0 \\ 0 & sacbr(ASEL) \ge sfcbr(FSEL),\ prac(ASEL) \le 0 \\ Pfcb(FSEL, k) & sacbr(ASEL) < sfcbr(FSEL),\ prfc(FSEL) \ge 0 \\ -Pfcb(FSEL, k) & sacbr(ASEL) < sfcbr(FSEL),\ prfc(FSEL) < 0 \end{cases} \tag{17}$$

where

AF(k): adaptive/fixed code vector

ASEL: index of adaptive code vector after final-selection

FSEL: index of fixed code vector after final-selection k: element number of a vector Pacb(ASEL,k): adaptive code vector after final-selection Pfcb(FSEL,k): fixed code vector after final-selection Pfcb (FSEL,k)

sacbr(ASEL): reference value after final-selection of an adaptive code vector sfcbr(FSEL): reference value after final-selection of a fixed code vector prac(ASEL): reference values after pre-selection of adaptive code vectors prfc(FSEL): reference values after pre-selection of fixed code vectors prfc(FSEL).

The selected adaptive/fixed code vector AF(k) is sent to the perceptual weighted LPC synthesis filter A 1321 and an index representing the number that has generated the selected adaptive/fixed code vector AF(k) is sent as an adaptive/fixed index AFSEL to the parameter coding section 1331. As the total number of adaptive code vectors and fixed code vectors is designed to be 255 (see Table 6), the adaptive/fixed index AFSEL is a code of 8 bits.

The perceptual weighted LPC synthesis filter A 1321 performs perceptual weighted LPC synthesis on the adaptive/fixed code vector AF(k), selected by the adaptive/fixed selector 1320, to generate a synthesized adaptive/fixed code vector SYNaf(k) ($0 \leqq k \leqq Ns-1$) and sends it to the comparator A 1322.

The comparator A 1322 first obtains the power powp of the synthesized adaptive/fixed code vector SYNaf(k) ($0 \leqq k \leqq Ns-1$) received from the perceptual weighted LPC synthesis filter A 1321 using an equation 18.

$$powp = \sum_{k=0}^{Ns-1} SYNaf^2(k) \tag{18}$$

where powm: power of adaptive/fixed code vector (SYNaf(k))

k: element number of a vector ($0 \leqq k \leqq Ns-1$)

Ns: subframe length (=52)

SYNaf(k): adaptive/fixed code vector.

Then, the inner product pr of the target vector received from the target vector generator A 1316 and the synthesized adaptive/fixed code vector SYNaf(k) is acquired from an equation 19.

$$pr = \sum_{k=0}^{Ns-1} SYNaf(k) \times r(k) \tag{19}$$

where pr: inner product of SYNaf(k) and r(k)

Ns: subframe length (=52)

SYNaf(k): adaptive/fixed code vector r(k): target vector k: element number of a vector ($0 \leqq k \leqq Ns-1$).

Further, the adaptive/fixed code vector AF(k) received from the adaptive/fixed selector 1320 is sent to an adaptive codebook updating section 1333 to compute the power POWaf of AF(k), the synthesized adaptive/fixed code vector SYNaf(k) and POWaf are sent to the parameter coding section 1331, and powp, pr, r(k) and rh(k) are sent to a comparator B 1330.

The target vector generator B 1325 subtracts the synthesized adaptive/fixed code vector SYNaf(k), received from the comparator A 1322, from the target vector r(i) ($0 \leqq i \leqq Ns-1$) received from the comparator A 1322, to generate a new target vector, and sends the new target vector to the perceptual weighted LPC reverse synthesis filter B 1326.

The perceptual weighted LPC reverse synthesis filter B 1326 sorts the new target vectors, generated by the target vector generator B 1325, in a time reverse order, sends the sorted vectors to the perceptual weighted LPC synthesis filter in a zero state, the output vectors are sorted again in a time reverse order to generate time-reversed synthesized vectors ph(k) ($0 \leqq k \leqq Ns-1$) which are in turn sent to the comparator B 1330.

An excitation vector generator 1337 in use is the same as, for example, the excitation vector generator 70 which has been described in the section of the third mode. The excitation vector generator 70 generates a random code vector as the first seed is read from the seed storage section 71 and input to the non-linear digital filter 72. The random code vector generated by the excitation vector generator 70 is sent to the perceptual weighted LPC synthesis filter B 1329 and the comparator B 1330. Then, as the second seed is read from the seed storage section 71 and input to the non-linear digital filter 72, a random code vector is generated and output to the filter B 1329 and the comparator B 1330.

To pre-select random code vectors generated based on the first seed to Nstb (=6) candidates from Nst (=64) candidates, the comparator B 1330 acquires reference values cr(i1) ($0 \leqq i1 \leqq Nstb1-1$) for pre-selection of first random code vectors from an equation 20.

$$cr(i1) = \sum_{j=0}^{Ns-1} Pstb1(i1j) \times rh(j) - \frac{pr}{powp} \sum_{j=0}^{Ns-1} Pstb1(i1j) \times ph(j) \tag{20}$$

where cr(i1): reference values for pre-selection of first random code vectors Ns: subframe length (=52)

rh(j): time reverse synthesized vector of a target vector (r(j))

powp: power of an adaptive/fixed vector (SYNaf(k))

pr: inner product of SYNaf(k) and r(k)

Pstb1(i1,j): first random code vector ph(j): time reverse synthesized vector of SYNaf(k)

i1: number of the first random code vector ($0 \leqq i1 \leqq Nst-1$)

j: element number of a vector.

By comparing the obtained values cr(i1), the top Nstb (=6) indices when the values become large and inner products with the indices used as arguments are selected and are respectively saved as indices of first random code vectors after pre-selection s1psel(j1) ($0 \leqq j1 \leqq Nstb-1$) and first random code vectors after pre-selection Pstb1(s1psel(j1),k) ($0 \leqq j1 \leqq Nstb-1$, $0 \leqq k \leqq Ns-1$). Then, the same process as done for the first random code vectors is performed for second random code vectors and indices and inner products are respectively saved as indices of second random code vectors after pre-selection s1psel(j2) ($0 \leqq j2 \leqq Nstb-1$) and second random code vectors after pre-selection Pstb2(s2psel (j2),k) ($0 \leqq j2 \leqq Nstb-1$, $0 \leqq k \leqq Ns-1$).

The perceptual weighted LPC synthesis filter B 1329 performs perceptual weighted LPC synthesis on the first random code vectors after pre-selection Pstb1(s1psel(j1),k) to generate synthesized first random code vectors SYNstb1 (s1psel(j1),k) which are in turn sent to the comparator B 1330. Then, perceptual weighted LPC synthesis is performed on the second random code vectors after pre-selection Pstb2(s1psel(j2),k) to generate synthesized second random code vectors SYNstb2(s2psel(j2),k) which are in turn sent to the comparator B 1330.

To implement final-selection on the first random code vectors after pre-selection Pstb1(s1psel(j1),k) and the second random code vectors after pre-selection Pstb2(s1psel (j2),k), pre-selected by the comparator B 1330 itself, the comparator B 1330 carries out the computation of an equation 21 on the synthesized first random code vectors SYNstb1(s1psel(j1),k) computed in the perceptual weighted LPC synthesis filter B 1329.

$$SYNOstb1(s1psel(j1), k) = SYNstb1(s1psel(j1), k) - \frac{SYNaf(j1)}{powp} \sum_{k=0}^{Ns-1} Pstb1(s1psel(j1), k) \times ph(k) \tag{21}$$

where

SYNOstb1(s1psel(j1),k): orthogonally synthesized first random code vector SYNstb1(s1psel(j1),k): synthesized first random code vector Pstb1(s1psel(j1),k): first random code vector after pre-selection SYNaf(j): adaptive/fixed code vector powp: power of adaptive/fixed code vector (SYNaf(j))

Ns: subframe length (=52)

ph(k): time reverse synthesized vector of SYNaf(j)

j1: number of first random code vector after pre-selection k: element number of a vector ($0 \leqq k \leqq Ns-1$).

Orthogonally synthesized first random code vectors SYNOstb1(s1psel(j1),k) are obtained, and a similar computation is performed on the synthesized second random code vectors SYNstb2(s2psel(j2),k) to acquire orthogonally synthesized second random code vectors SYNOstb2(s2psel(j2), k), and reference values after final-selection of a first random code vector slcr and reference values after final-selection of a second random code vector s2cr are computed in a closed loop respectively using equation 22 and 23 for all the combinations (36 combinations) of (s1psel(j1), s2psel(j2)).

$$scr1 = \frac{cscr1^2}{\sum_{k=0}^{Ns-1}[SYNOstb1(s1psel(j1),k) + SYNOstb2(s2psel(j2),k)]^2} \quad (22)$$

where scr1: reference value after final-selection of a first random code vector cscr1: constant previously computed from an equation 24

SYNOstb1(s1psel(j1),k): orthogonally synthesized first random code vectors

SYNOstb2(s2psel(j2),k): orthogonally synthesized second random code vectors r(k): target vector s1psel(j1): index of first random code vector after pre-selection s2psel(j2): index of second random code vector after pre-selection Ns: subframe length (=52)

k: element number of a vector.

$$scr2 = \frac{cscr2^2}{\sum_{k=0}^{Ns-1}[SYNOstb1(s1psel(j1), k - SYNOstb2(s2psel(j2),k)]^2} \quad (23)$$

where scr2: reference value after final-selection of a second random code vector cscr2: constant previously computed from an equation 25

SYNOstb1(s1psel(j1),k): orthogonally synthesized first random code vectors

SYNOstb2(s2psel(j2),k): orthogonally synthesized second random code vectors r(k): target vector s1psel(j1): index of first random code vector after pre-selection s2psel(j2): index of second random code vector after pre-selection Ns: subframe length (=52)

k: element number of a vector.

Note that cs1cr in the equation 22 and cs2cr in the equation 23 are constants which have been calculated previously using the equations 24 and 25, respectively.

$$cscr1 = \sum_{k=0}^{Ns-1} SYNOstb1(s1psel(j1),k) \times r(k) + \sum_{K=0}^{Ns-1} SYNOstb2(s2psel(j2),k) \times r(k) \quad (24)$$

where cscr1: constant for an equation 29

SYNOstb1(s1psel(j1),k): orthogonally synthesized first random code vectors

SYNOstb2(s2psel(j2),k): orthogonally synthesized second random code vectors r(k): target vector s1psel(j1): index of first random code vector after pre-selection s2psel(j2): index of second random code vector after pre-selection Ns: subframe length (=52)

k: element number of a vector.

$$cscr1 = \sum_{k=0}^{Ns-1} SYNOstb1(s1psel(j1),k) \times r(k) - \sum_{K=0}^{Ns-1} SYNOstb2(s2psel(j2),k) \times r(k) \quad (25)$$

where cscr2: constant for the equation 23

SYNOstb1(s1psel(j1),k): orthogonally synthesized first random code vectors

SYNOstb2(s2psel(j2),k): orthogonally synthesized second random code vectors r(k): target vector s1psel(j1): index of first random code vector after pre-selection s2psel(j2): index of second random code vector after pre-selection Ns: subframe length (=52)

k: element number of a vector.

The comparator B 1330 substitutes the maximum value of Slcr in MAXslcr, substitutes the maximum value of S2cr in MAXs2cr, sets MAXs1cr or MAXs2cr, whichever is larger, as scr, and sends the value of s1psel(j1), which had been referred to when scr was obtained, to the parameter coding section 1331 as an index of a first random code vector after final-selection SSEL1. The random code vector that corresponds to SSEL1 is saved as a first random code vector after final-selection Pstb1(SSEL1,k), and is sent to the parameter coding section 1331 to acquire a first random code vector after final-selection SYNstb1(SSEL1,k) ($0 \leqq k \leqq Ns-1$) corresponding to Pstb1(SSEL1,k).

Likewise, the value of s2psel(j2), which had been referred to when scr was obtained, to the parameter coding section 1331 as an index of a second random code vector after final-selection SSEL2. The random code vector that corresponds to SSEL2 is saved as a second random code vector after final-selection Pstb2(SSEL2,k), and is sent to the parameter coding section 1331 to acquire a second random code vector after final-selection SYNstb2(SSEL2,k) ($0 \leqq k \leqq Ns-1$) corresponding to Pstb2(SSEL2,k).

The comparator B 1330 further acquires codes S1 and S2 by which Pstb1(SSEL1,k) and Pstb2(SSEL2,k) are respectively multiplied, from an equation 26, and sends polarity information Is1s2 of the obtained S1 and S2 to the parameter coding section 1331 as a gain polarity index Is1s2 (2-bit information).

$$(S1, S2) = \begin{cases} (+1,+1) & scr1 \geq scr2,\ cscr1 \geq 0 \\ (-1,-1) & scr1 \geq scr2,\ cscr1 < 0 \\ (+1,-1) & scr1 < scr2,\ cscr2 \geq 0 \\ (-1,+1) & scr1 < scr2,\ cscr2 < 0 \end{cases} \quad (26)$$

where

S1: code of the first random code vector after final-selection

S2: code of the second random code vector after final-selection scr1: output of the equation 29 scr2: output of the equation 23 cscr1: output of the equation 24 cscr2: output of the equation 25.

A random code vector ST(k) (0≦k≦Ns−1) is generated by an equation 27 and output to the adaptive codebook updating section 1333, and its power POWsf is acquired and output to the parameter coding section 1331.

$$ST(k)=S1\times Pstb1(SSEL1,k)+S2\times Pstb2(SSEL2,k) \quad (27)$$

where

ST(k): probable code vector

S1: code of the first random code vector after final-selection

S2: code of the second random code vector after final-selection

Pstb1(SSEL1,k): first-stage settled code vector after final-selection

Pstb1(SSEL2,k): second-stage settled code vector after final-selection

SSEL1: index of the first random code vector after final-selection

SSEL2: second random code vector after final-selection k: element number of a vector (0≦k≦Ns−1).

A synthesized random code vector SYNst(k) (0≦k≦Ns−1) is generated by an equation 28 and output to the parameter coding section 1331.

$$SYNst(k)=S1\times SYNstb1(SSEL1,k)+S2\times SYNstb2(SSEL2,k) \quad (28)$$

where

STNst(k): synthesized probable code vector

S1: code of the first random code vector after final-selection

S2: code of the second random code vector after final-selection

SYNstb1(SSEL1,k): synthesized first random code vector after final-selection SYNstb2(SSEL2,k): synthesized second random code vector after final-selection k: element number of a vector (0≦k≦Ns−1).

The parameter coding section 1331 first acquires a residual power estimation for each subframe rs is acquired from an equation 29 using the decoded frame power spow which has been obtained by the frame power quantizing/decoding section 1302 and the normalized predictive residual power resid, which has been obtained by the pitch pre-selector 1308.

$$rs=Ns\times spow\times resid \quad (29)$$

where rs: residual power estimation for each subframe

Ns: subframe length (=52)

spow: decoded frame power resid: normalized predictive residual power.

A reference value for quantization gain selection STDg is acquired from an equation 30 by using the acquired residual power estimation for each subframe rs, the power of the adaptive/fixed code vector POWaf computed in the comparator A 1322, the power of the random code vector POWst computed in the comparator B 1330, a gain quantization table (CGaf[i],CGst[i]) (0≦i≦127) of 256 words stored in a gain quantization table storage section 1332 and the like.

TABLE 7

| Gain quantization table | | |
|---|---|---|
| i | CGaf(i) | CGst(i) |
| 1 | 0.38590 | 0.23477 |
| 2 | 0.42380 | 0.50453 |
| 3 | 0.23416 | 0.24761 |
| 126 | 0.35382 | 1.68987 |
| 127 | 0.10689 | 1.02035 |
| 128 | 3.09711 | 1.75430 |

$$STDg = \sum_{k=0}^{Ns-1}\left(\sqrt{\frac{rs}{POWaf}}\cdot CGaf(Ig)\times SYNaf(k) + \sqrt{\frac{rs}{POWst}}\cdot CGst(Ig)\times SYNst(k) - r(k)\right)^2 \quad (30)$$

where

STDg: reference value for quantization gain selection rs: residual power estimation for each subframe POWaf: power of the adaptive/fixed code vector POWSst: power of the random code vector i: index of the gain quantization table (0≦i≦127)

CGaf(i): component on the adaptive/fixed code vector side in the gain quantization table CGst(i): component on the random code vector side in the gain quantization table SYNaf(k): synthesized adaptive/fixed code vector SYNst(k): synthesized random code vector r(k): target vector Ns: subframe length (=52)

k: element number of a vector (0≦k≦Ns−1).

One index when the acquired reference value for quantization gain selection STDg becomes minimum is selected as a gain quantization index Ig, a final gain on the adaptive/fixed code vector side Gaf to be actually applied to AF(k) and a final gain on the random code vector side Gst to be actually applied to ST(k) are obtained from an equation 31 using a gain after selection of the adaptive/fixed code vector CGaf(Ig), which is read from the gain quantization table based on the selected gain quantization index Ig, a gain after selection of the random code vector CGst(Ig), which is read from the gain quantization table based on the selected gain quantization index Ig and so forth, and are sent to the adaptive codebook updating section 1333.

$$(Gaf, Gst) = \left( \sqrt{\frac{rs}{POWaf}}\, CGaf(Ig), \sqrt{\frac{rs}{POWst}}\, CGst(IG) \right) \quad (31)$$

where

Gaf: final gain on the adaptive/fixed code vector side

Gst: final gain on the random code vector side Gst rs: residual power estimation for each subframe POWaf: power of the adaptive/fixed code vector POWst: power of the random code vector CGaf(Ig): power of a fixed/adaptive side code vector CGst(Ig): gain after selection of a random code vector side Ig: gain quantization index.

The parameter coding section 1331 converts the index of power Ipow, acquired by the frame power quantizing/decoding section 1302, the LSP code Ilsp, acquired by the LSP quantizing/decoding section 1306, the adaptive/fixed index AFSEL, acquired by the adaptive/fixed selector 1320, the index of the first random code vector after final-selection SSEL1, the second random code vector after final-selection SSEL2 and the polarity information Is1s2, acquired by the comparator B 1330, and the gain quantization index Ig, acquired by the parameter coding section 1331, into a speech code, which is in turn sent to a transmitter 1334.

The adaptive codebook updating section 1333 performs a process of an equation 32 for multiplying the adaptive/fixed code vector AF(k), acquired by the comparator A 1322, and the random code vector ST(k), acquired by the comparator B 1330, respectively by the final gain on the adaptive/fixed code vector side Gaf and the final gain on the random code vector side Gst, acquired by the parameter coding section 1331, and then adding the results to thereby generate an excitation vector ex(k) ($0 \leqq k \leqq Ns-1$), and sends the generated excitation vector ex(k) ($0 \leqq k \leqq Ns-1$) to the adaptive codebook 1318.

$$ex(k) = Gaf \times AF(k) + Gst \times ST(k) \quad (32)$$

where ex(k): excitation vector

AF(k): adaptive/fixed code vector

ST(k): random code vector k: element number of a vector ($0 \leqq k \leqq Ns-1$).

At this time, an old excitation vector in the adaptive codebook 1318 is discarded and is updated with a new excitation vector ex(k) received from the adaptive codebook updating section 1333.

(Eighth Mode)

A description will now be given of an eighth mode in which any excitation vector generator described in first to sixth modes is used in a speech decoder that is based on the PSI-CELP, the standard speech coding/decoding system for PDC digital portable telephones. This decoder makes a pair with the above-described seventh mode.

Figure 13B:
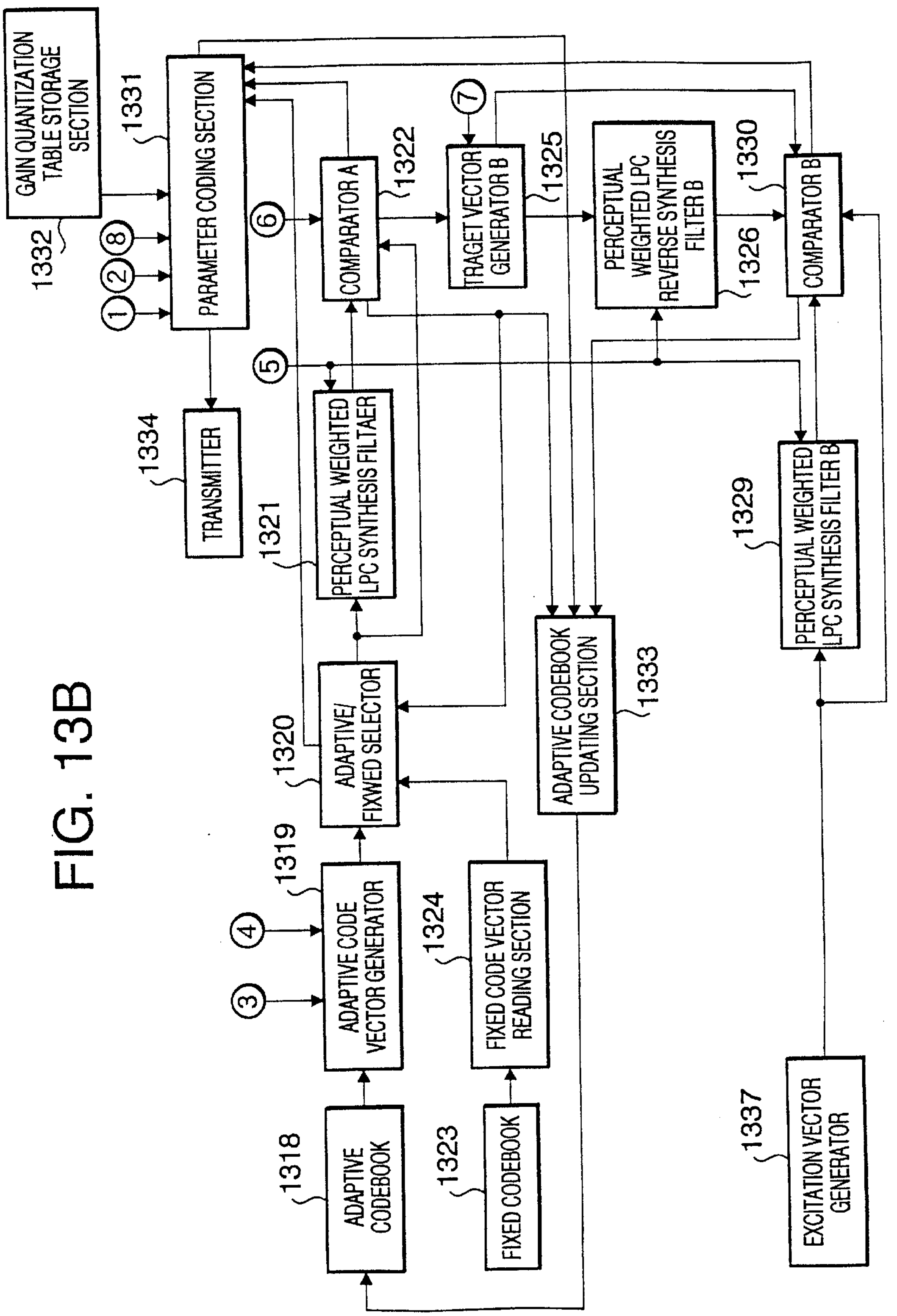
FIG. 13B is a block diagram of the essential portions of the speech coder according to the seventh mode.
Figure 14:
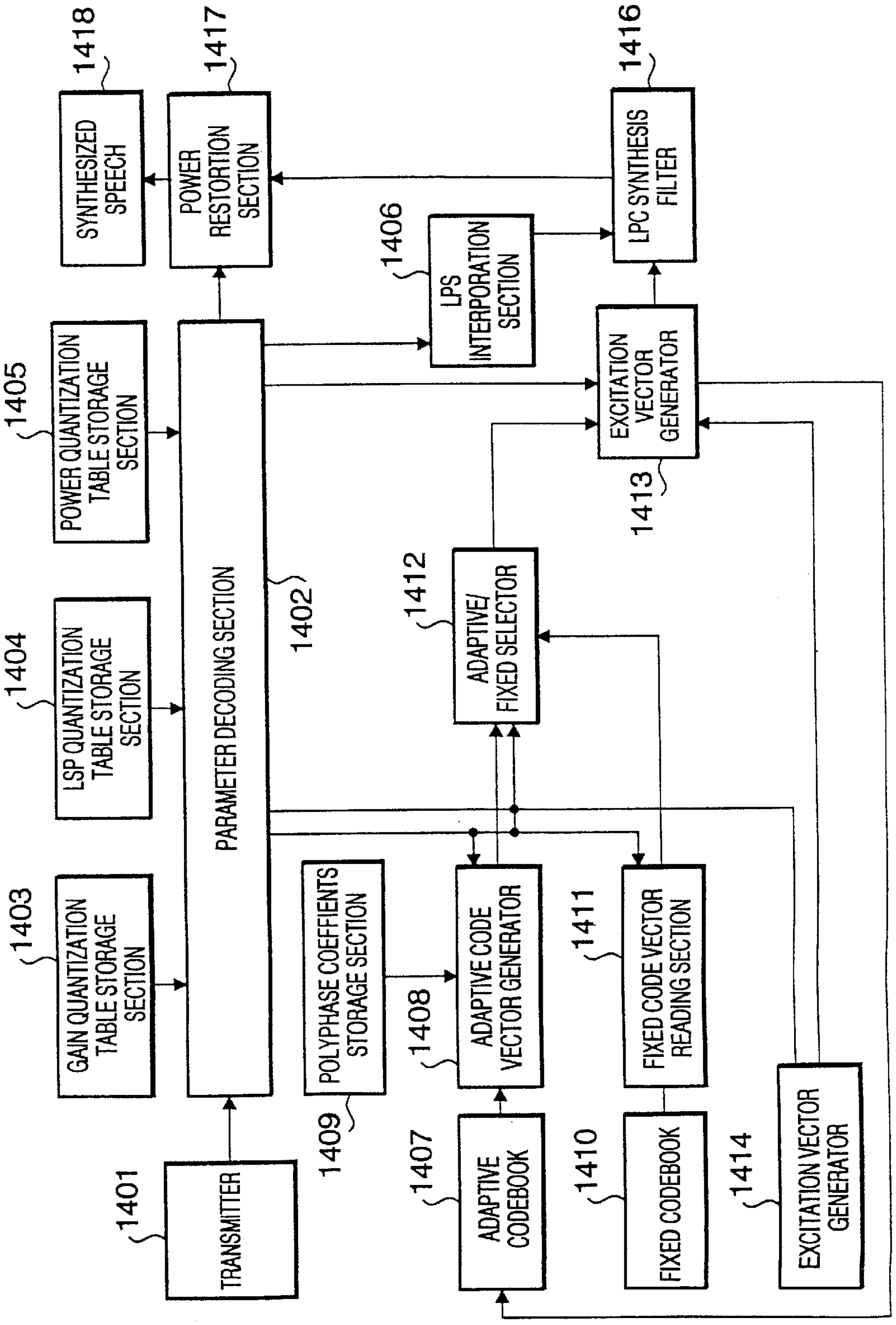
FIG. 14 is a block diagram of the essential portions of a speech decoder according to an eighth mode.

FIG. 14 presents a functional block diagram of a speech decoder according to the eighth mode. A parameter decoding section 1402 obtains the speech code (the index of power Ipow, LSP code I1sp, adaptive/fixed index AFSEL, index of the first random code vector after final-selection SSEL1, second random code vector after final-selection SSEL2, gain quantization index Ig and gain polarity index Is1s2), sent from the CELP type speech coder illustrated in FIG. 13, via a transmitter 1401.

Next, a scalar value indicated by the index of power Ipow is read from the power quantization table (see Table 3) stored in a power quantization table storage section 1405, is sent as decoded frame power spow to a power restoring section 1417, and a vector indicated by the LSP code I1sp is read from the LSP quantization table an LSP quantization table storage section 1404 and is sent as a decoded LSP to an LSP interpolation section 1406. The adaptive/fixed index AFSEL is sent to an adaptive code vector generator 1408, a fixed code vector reading section 1411 and an adaptive/fixed selector 1412, and the index of the first random code vector after final-selection SSEL1 and the second random code vector after final-selection SSEL2 are output to an excitation vector generator 1414. The vector (CAaf(Ig), CGst(Ig)) indicated by the gain quantization index Ig is read from the gain quantization table (see Table 7) stored in a gain quantization table storage section 1403, the final gain on the final gain on the adaptive/fixed code vector side Gaf to be actually applied to AF(k) and the final gain on the random code vector side Gst to be actually applied to ST(k) are acquired from the equation 31 as done on the coder side, and the acquired final gain on the adaptive/fixed code vector side Gaf and final gain on the random code vector side Gst are output together with the gain polarity index Is1s2 to an excitation vector generator 1413.

The LSP interpolation section 1406 obtains a decoded interpolated LSP ωintp(n,i) ($1 \leqq i \leqq Np$) subframe by subframe from the decoded LSP received from the parameter decoding section 1402, converts the obtained ωintp(n,i) to an LPC to acquire a decoded interpolated LPC, and sends the decoded interpolated LPC to an LPC synthesis filter 1416.

The adaptive code vector generator 1408 convolute some of polyphase coefficients stored in a polyphase coefficients storage section 1409 (see Table 5) on vectors read from an adaptive codebook 1407, based on the adaptive/fixed index AFSEL received from the parameter decoding section 1402, thereby generating adaptive code vectors to a fractional precision, and sends the adaptive code vectors to the adaptive/fixed selector 1412. The fixed code vector reading section 1411 reads fixed code vectors from a fixed codebook 1410 based on the adaptive/fixed index AFSEL received from the parameter decoding section 1402, and sends them to the adaptive/fixed selector 1412.

The adaptive/fixed selector 1412 selects either the adaptive code vector input from the adaptive code vector generator 1408 or the fixed code vector input from the fixed code vector reading section 1411, as the adaptive/fixed code vector AF(k), based on the adaptive/fixed index AFSEL received from the parameter decoding section 1402, and sends the selected adaptive/fixed code vector AF(k) to the excitation vector generator 1413. The excitation vector generator 1414 acquires the first seed and second seed from the seed storage section 71 based on the index of the first random code vector after final-selection SSEL1 and the second random code vector after final-selection SSEL2 received from the parameter decoding section 1402, and sends the seeds to the non-linear digital filter 72 to generate the first random code vector and the second random code vector, respectively. Those reproduced first random code vector and second random code vector are respectively multiplied by the first-stage information S1 and second-stage information S2 of the gain polarity index to generate an excitation vector ST(k), which is sent to the excitation vector generator 1413.

The excitation vector generator 1413 multiplies the adaptive/fixed code vector AF(k), received from the adaptive/fixed selector 1412, and the excitation vector ST(k), received from the excitation vector generator 1414, respectively by the final gain on the adaptive/fixed code vector side Gaf and the final gain on the random code vector side Gst, obtained by the parameter decoding section 1402, performs addition or subtraction based on the gain polarity index Is1s2, yielding the excitation vector ex(k), and sends the obtained excitation vector to the excitation vector generator 1413 and the adaptive codebook 1407. Here, an old excitation vector in the adaptive codebook 1407 is updated with a new excitation vector input from the excitation vector generator 1413.

The LPC synthesis filter 1416 performs LPC synthesis on the excitation vector, generated by the excitation vector generator 1413, using the synthesis filter which is constituted by the decoded interpolated LPC received from the LSP interpolation section 1406, and sends the filter output to the power restoring section 1417. The power restoring section 1417 first obtains the mean power of the synthesized vector of the excitation vector obtained by the LPC synthesis filter 1416, then divides the decoded frame power spow, received from the parameter decoding section 1402, by the acquired mean power, and multiplies the synthesized vector of the excitation vector by the division result to generate a synthesized speech 518.

(Ninth Mode)

Figure 15:
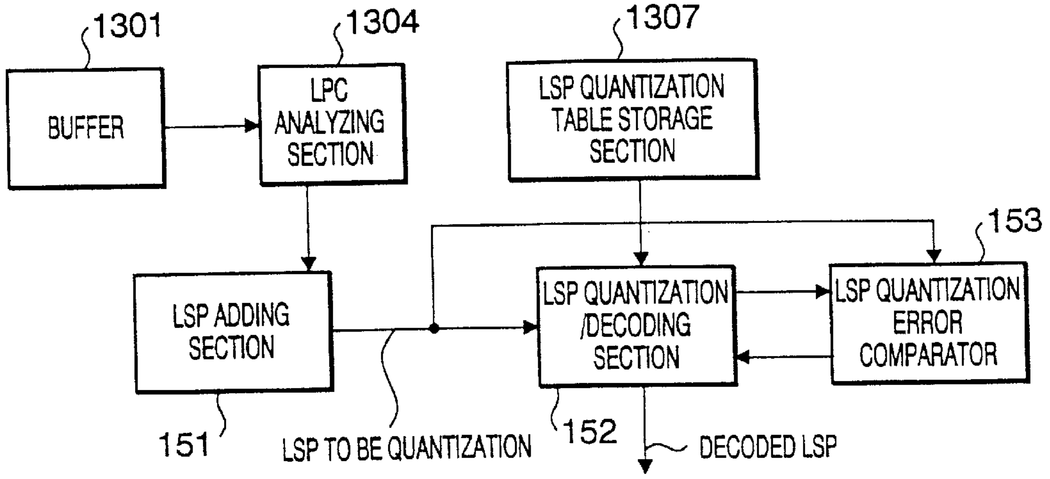
FIG. 15 is a block diagram of the essential portions of a speech coder according to a ninth mode.

FIG. 15 is a block diagram of the essential portions of a speech coder according to a ninth mode. This speech coder has a quantization target LSP adding section 151, an LSP quantizing/decoding section 152, a LSP quantization error comparator 153 added to the speech coder shown in FIGS. 13 or parts of its functions modified.

The LPC analyzing section 1304 acquires an LPC by performing linear predictive analysis on a processing frame in the buffer 1301, converts the acquired LPC to produce a quantization target LSP, and sends the produced quantization target LSP to the quantization target LSP adding section 151. The LPC analyzing section 1304 also has a particular function of performing linear predictive analysis on a pre-read area to acquire an LPC for the pre-read area, converting the obtained LPC to an LSP for the pre-read area, and sending the LSP to the quantization target LSP adding section 151.

The quantization target LSP adding section 151 produces a plurality of quantization target LSPs in addition to the quantization target LSPs directly obtained by converting LPCs in a processing frame in the LPC analyzing section 1304.

The LSP quantization table storage section 1307 stores the quantization table which is referred to by the LSP quantizing/decoding section 152, and the LSP quantizing/decoding section 152 quantizes/decodes the produced plurality of quantization target LSPs to generate decoded LSPs.

The LSP quantization error comparator 153 compares the produced decoded LSPs with one another to select, in a closed loop, one decoded LSP which minimizes an allophone, and newly uses the selected decoded LSP as a decoded LSP for the processing frame.

Figure 16:
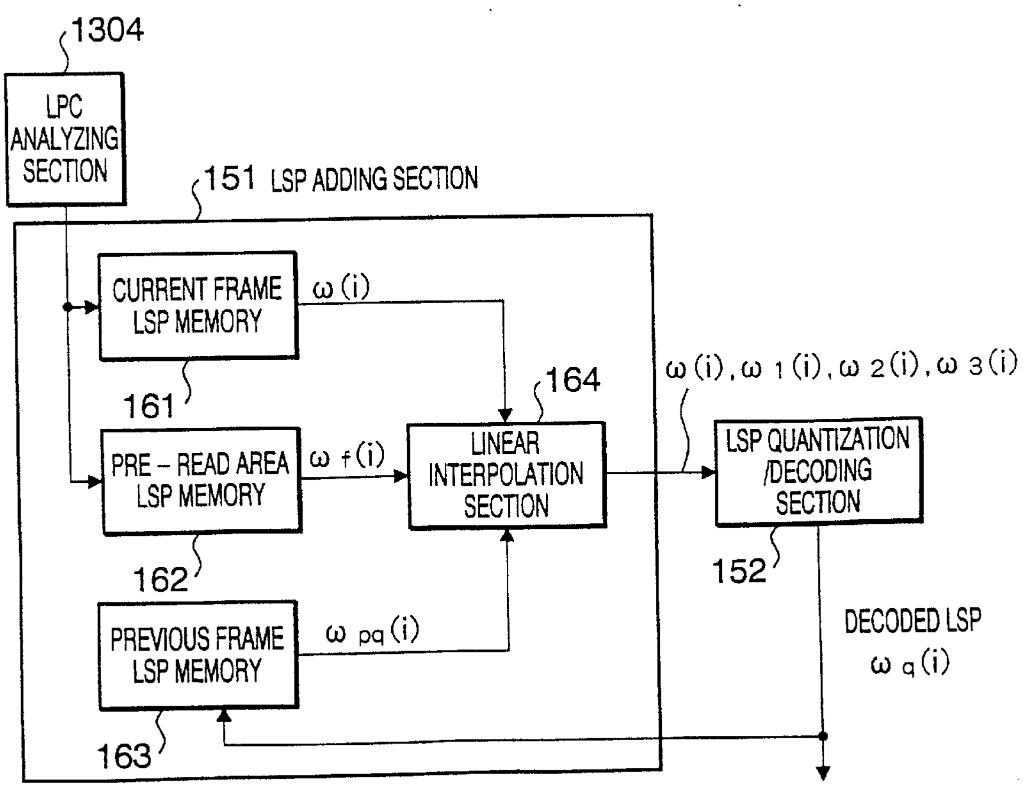
FIG. 16 is a block diagram of a quantization target LSP adding section equipped in the speech coder according to the ninth mode.

FIG. 16 presents a block diagram of the quantization target LSP adding section 151.

The quantization target LSP adding section 151 comprises a current frame LSP memory 161 for storing the quantization target LSP of the processing frame obtained by the LPC analyzing section 1304, a pre-read area LSP memory 162 for storing the LSP of the pre-read area obtained by the LPC analyzing section 1304, a previous frame LSP memory 163 for storing the decoded LSP of the previous processing frame, and a linear interpolation section 164 which performs linear interpolation on the LSPs read from those three memories to add a plurality of quantization target LSPs.

A plurality of quantization target LSPs are additionally produced by performing linear interpolation on the quantization target LSP of the processing frame and the LSP of the pre-read, and produced quantization target LSPs are all sent to the LSP quantizing/decoding section 152.

The quantization target LSP adding section 151 will now be explained more specifically. The LPC analyzing section 1304 performs linear predictive analysis on the processing frame in the buffer to acquire an LPC α(i) (1≦i≦Np) of a prediction order Np (=10), converts the obtained LPC to generate a quantization target LSP ω(i) (1≦i≦Np), and stores the generated quantization target LSP ω(i) (1≦i≦Np) in the current frame LSP memory 161 in the quantization target LSP adding section 151. Further, the LPC analyzing section 1304 performs linear predictive analysis on the pre-read area in the buffer to acquire an LPC for the pre-read area, converts the obtained LPC to generate a quantization target LSP ωf(i) (1≦i≦Np), and stores the generated quantization target LSP ω(i) (1≦i≦Np) for the pre-read area in the pre-read area LSP memory 162 in the quantization target LSP adding section 151.

Next, the linear interpolation section 164 reads the quantization target LSP ω(i) (1≦i≦Np) for the processing frame from the current frame LSP memory 161, the LSP ωf(i) (1≦i≦Np) for the pre-read area from the pre-read area LSP memory 162, and decoded LSP ωqp(i) (1≦i≦Np) for the previous processing frame from the previous frame LSP memory 163, and executes conversion shown by an equation 33 to respectively generate first additional quantization target LSP ω1(i) (1≦i≦Np), second additional quantization target LSP ω2(i) (1≦i≦Np), and third additional quantization target LSP ω1(i) (1≦i≦Np).

$$\begin{bmatrix} \omega 1(i) \\ \omega 2(i) \\ \omega 3(i) \end{bmatrix} = \begin{bmatrix} 0.8 & 0.2 & 0.0 \\ 0.5 & 0.3 & 0.2 \\ 0.8 & 0.3 & 0.5 \end{bmatrix} \begin{bmatrix} \omega q(i) \\ \omega qp(i) \\ \omega f(i) \end{bmatrix} \tag{33}$$

where

ω1(i): first additional quantization target LSP

ω2(i): second additional quantization target LSP

ω3(i): third additional quantization target LSP i: LPC order (1≦i≦Np) Np: LPC analysis order (=10)

ωq(i);decoded LSP for the processing frame

ωqp(i);decoded LSP for the previous processing frame

ωf(i): LSP for the pre-read area.

The generated ω1(i), ω2(i) and ω3(i) are sent to the LSP quantizing/decoding section 152. After performing vector quantization/decoding of all the four quantization target LSPs ω(i), ω1(i), ω2(i) and ω3(i), the LSP quantizing/decoding section 152 acquires power Epow(ω1) of an quantization error for ω(i), power Epow(ω1) of an quantization error for ω1(i), power Epow(ω2) of an quantization error for ω2(i), and power Epow(ω3) of an quantization error for ω3(i), carries out conversion of an equation 34 on the obtained quantization error powers to acquire reference values STD1sp(ω), STD1sp(ω1), STD1sp(ω2) and STD1sp (ω3) for selection of a decoded LSP.

$$\begin{bmatrix} STDlsp\ (\omega) \\ STDlsp\ (\omega 1) \\ STDlsp\ (\omega 2) \\ STDlsp\ (\omega 3) \end{bmatrix} = \begin{bmatrix} Epow\ (\omega) \\ Epow\ (\omega 1) \\ Epow\ (\omega 2) \\ Epow\ (\omega 3) \end{bmatrix} - \begin{bmatrix} 0.0010 \\ 0.0005 \\ 0.0002 \\ 0.0000 \end{bmatrix} \quad (34)$$

where

STD1sp(ω): reference value for selection of a decoded LSP for ω(i)

STD1sp(ω1): reference value for selection of a decoded LSP for ω1(i)

STD1sp(ω2): reference value for selection of a decoded LSP for ω2(i)

STD1sp(ω3): reference value for selection of a decoded LSP for ω3(i)

Epow(ω): quantization error power for ω(i)

Epow(ω1): quantization error power for ω(i)

Epow(ω2): quantization error power for ω2(i)

Epow(ω3): quantization error power for ω3(i).

The acquired reference values for selection of a decoded LSP are compared with one another to select and output the decoded LSP for the quantization target LSP that becomes minimum as a decoded LSPωq(i) (1≦i≦Np) for the processing frame, and the decoded LSP is stored in the previous frame LSP memory 163 so that it can be referred to at the time of performing vector quantization of the LSP of the next frame.

According to this mode, by effectively using the high interpolation characteristic of an LSP (which does not cause an allophone even synthesis is implemented by using interpolated LSPS), vector quantization of LSPs can be so conducted as not to produce an allophone even for an area like the top of a word where the spectrum varies significantly. It is possible to reduce an allophone in a synthesized speech which may occur when the quantization characteristic of an LSP becomes insufficient.

Figure 17:
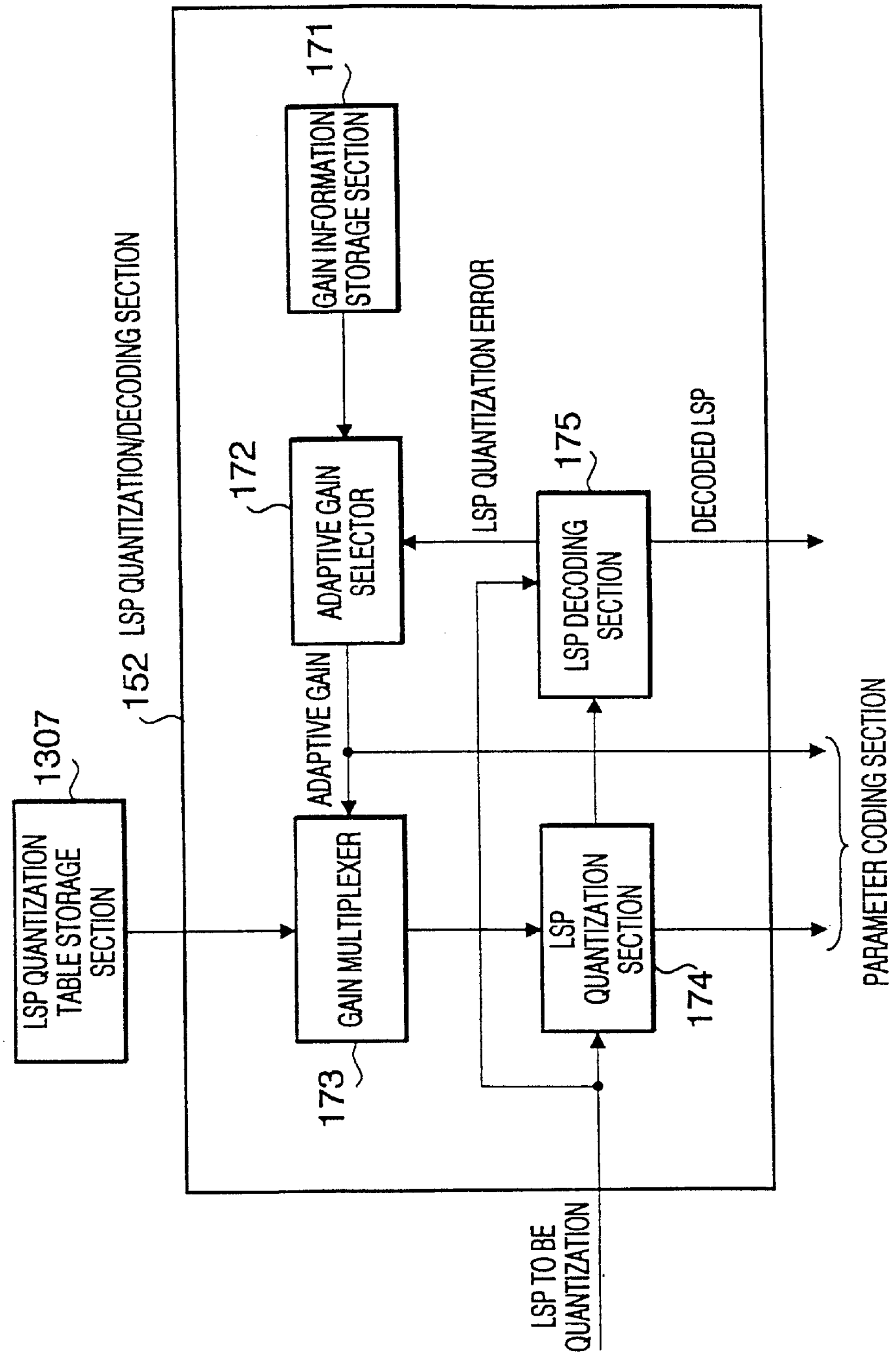
FIG. 17 is a block diagram of an LSP quantizing/decoding section equipped in the speech coder according to the ninth mode.

FIG. 17 presents a block diagram of the LSP quantizing/decoding section 152 according to this mode. The LSP quantizing/decoding section 152 has a gain information storage section 171, an adaptive gain selector 172, a gain multiplier 173, an LSP quantizing section 174 and an LSP decoding section 175.

The gain information storage section 171 stores a plurality of gain candidates to be referred to at the time the adaptive gain selector 172 selects the adaptive gain. The gain multiplier 173 multiplies a code vector, read from the LSP quantization table storage section 1307, by the adaptive gain selected by the adaptive gain selector 172. The LSP quantizing section 174 performs vector quantization of a quantization target LSP using the code vector multiplied by the adaptive gain. The LSP decoding section 175 has a function of decoding a vector-quantized LSP to generate a decoded LSP and outputting it, and a function of acquiring an LSP quantization error, which is a difference between the quantization target LSP and the decoded LSP, and sending it to the adaptive gain selector 172. The adaptive gain selector 172 acquires the adaptive gain by which a code vector is multiplied at the time of vector-quantizing the quantization target LSP of the processing frame by adaptively adjusting the adaptive gain based on gain generation information stored in the gain information storage section 171, on the basis of, as references, the level of the adaptive gain by which a code vector is multiplied at the time the quantization target LSP of the previous processing frame was vector-quantized and the LSP quantization error for the previous frame, and sends the obtained adaptive gain to the gain multiplier 173.

The LSP quantizing/decoding section 152 performs vector-quantizes and decodes a quantization target LSP while adaptively adjusting the adaptive gain by which a code vector is multiplied in the above manner.

The LSP quantizing/decoding section 152 will now be discussed more specifically. The gain information storage section 171 is storing four gain candidates (0.9, 1.0, 1.1 and 1.2) to which the adaptive gain selector 172 refers. The adaptive gain selector 172 acquires a reference value for selecting an adaptive gain, Slsp, from an equation 35 for dividing power ERpow, generated at the time of quantizing the quantization target LSP of the previous frame, by the square of an adaptive gain Gqlsp selected at the time of vector-quantizing the quantization target LSP of the previous processing frame.

$$Slsp = \frac{ERpow}{Gqlsp^2} \quad (35)$$

where

Slsp: reference value for selecting an adaptive gain

ERpow: quantization error power generated when quantizing the LSP of the previous frame Gqlsp: adaptive gain selected when vector-quantizing the LSP of the previous frame.

One gain is selected from the four gain candidates (0.9, 1.0, 1.1 and 1.2), read from the gain information storage section 171, from an equation 36 using the acquired reference value Slsp for selecting the adaptive gain. Then, the value of the selected adaptive gain Gqlsp is sent to the gain multiplier 173, and information (2-bit information) for specifying type of the selected adaptive gain from the four types is sent to the parameter coding section.

$$Glsp = \begin{cases} 1.2 & Slsp > 0.0025 \\ 1.1 & Slsp > 0.0015 \\ 1.0 & Slsp > 0.0008 \\ 0.9 & Slsp \le 0.0008 \end{cases} \quad (36)$$

where

Glsp: adaptive gain by which a code vector for LS quantization is multiplied

Slsp: reference value for selecting an adaptive gain.

The selected adaptive gain Glsp and the error which has been produced in quantization are saved in the variable Gqlsp and ERpow until the quantization target LSP of the next frame is subjected to vector quantization.

The gain multiplier 173 multiplies a code vector, read from the LSP quantization table storage section 1307, by the adaptive gain selected by the adaptive gain selector 172, and sends the result to the LSP quantizing section 174. The LSP quantizing section 174 performs vector quantization on the quantization target LSP by using the code vector multiplied by the adaptive gain, and sends its index to the parameter coding section. The LSP decoding section 175 decodes the LSP, quantized by the LSP quantizing section 174, acquiring a decoded LSP, outputs this decoded LSP, subtracts the obtained decoded LSP from the quantization target LSP to obtain an LSP quantization error, computes the power ERpow of the obtained LSP quantization error, and sends the power to the adaptive gain selector 172.

This mode can suppress an allophone in a synthesized speech which may be produced when the quantization characteristic of an LSP becomes insufficient.

(Tenth Mode)

Figure 18:
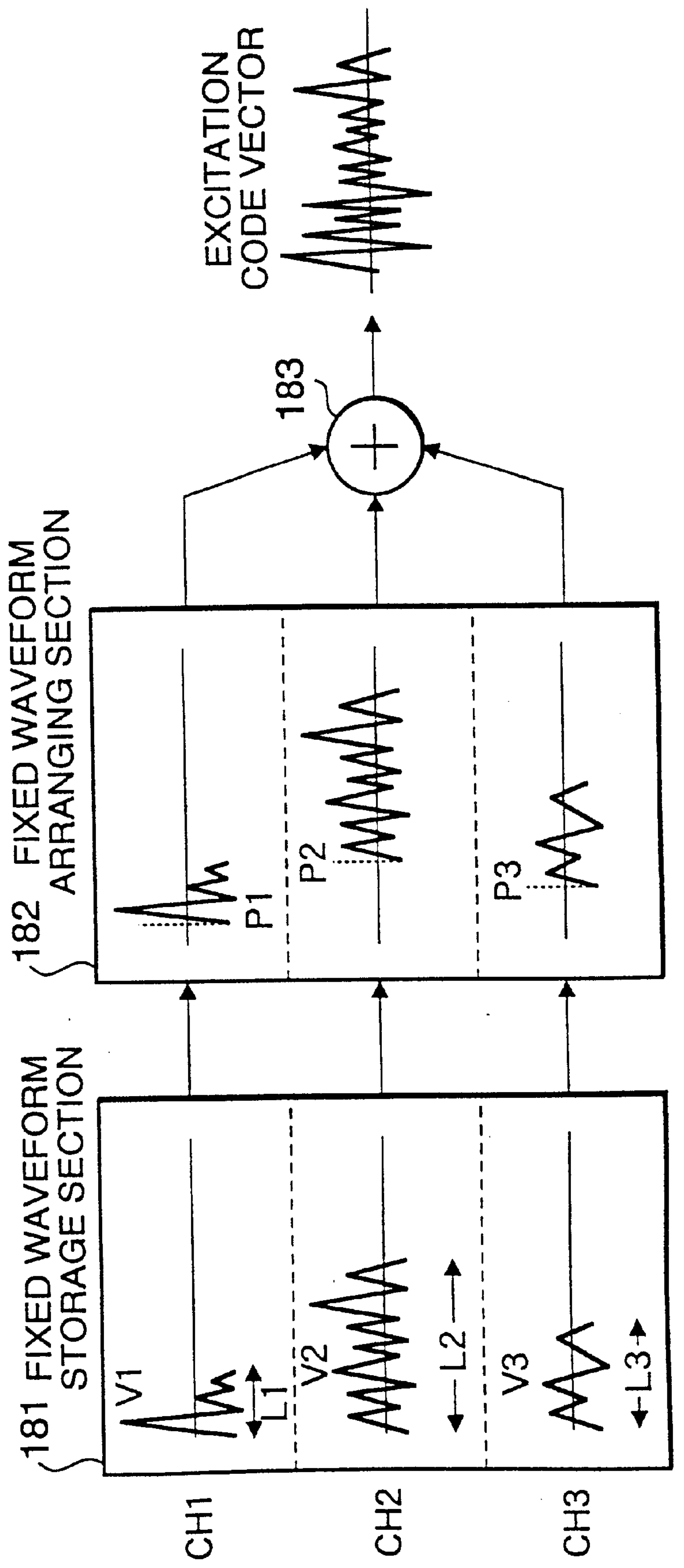
FIG. 18 is a block diagram of the essential portions of a speech coder according to a tenth mode.

FIG. 18 presents the structural blocks of an excitation vector generator according to this mode. This excitation vector generator has a fixed waveform storage section 181 for storing three fixed waveforms (v1 (length: L1), v2 (length: L2) and v3(length: L3)) of channels CH1, CH2 and CH3, a fixed waveform arranging section 182 for arranging the fixed waveforms (v1, v2, v3), read from the fixed waveform storage section 181, respectively at positions P1, P2 and P3, and an adding section 183 for adding the fixed waveforms arranged by the fixed waveform arranging section 182, generating an excitation vector.

The operation of the thus constituted excitation vector generator will be discussed.

Three fixed waveforms v1, v2 and v3 are stored in advance in the fixed waveform storage section 181. The fixed waveform arranging section 182 arranges (shifts) the fixed waveform v1, read from the fixed waveform storage section 181, at the position P1 selected from start position candidates for CH1, based on start position candidate information for fixed waveforms it has as shown in Table 8, and likewise arranges the fixed waveforms v2 and v3 at the respective positions P2 and P3 selected from start position candidates for CH2 and CH3.

TABLE 8

| Channel number | Sign | start position candidate information for fixed waveform |
|---|---|---|
| CH1 | ±1 | P1 (0, 10, 20, 30, . . . , 60, 70) |
| CH2 | ±1 | P2 (2, 12, 22, 32, . . . , 62, 72<br>(6, 16, 26, 36, . . . , 66, 76) |
| CH3 | ±1 | P3 (4, 14, 24, 34, . . . , 64, 74<br>8, 18, 28, 38, . . . , 68, 78) |

The adding section 183 adds the fixed waveforms, arranged by the fixed waveform arranging section 182, to generate an excitation vector.

It is to be noted that code numbers corresponding, one to one, to combination information of selectable start position candidates of the individual fixed waveforms (information representing which positions were selected as P1, P2 and P3, respectively) should be assigned to the start position candidate information of the fixed waveforms the fixed waveform arranging section 182 has.

According to the excitation vector generator with the above structure, excitation information can be transmitted by transmitting code numbers correlating to the start position candidate information of fixed waveforms the fixed waveform arranging section 182 has, and the code numbers exist by the number of products of the individual start position candidates, so that an excitation vector close to an actual speech can be generated.

Since excitation information can be transmitted by transmitting code numbers, this excitation vector generator can be used as a random codebook in a speech coder/decoder.

While the description of this mode has been given with reference to a case of using three fixed waveforms as shown in FIG. 18, similar functions and advantages can be provided if the number of fixed waveforms (which coincides with the number of channels in FIG. 18 and Table 8) is changed to other values.

Although the fixed waveform arranging section 182 in this mode has been described as having the start position candidate information of fixed waveforms given in Table 8, similar functions and advantages can be provided for other start position candidate information of fixed waveforms than those in Table 8.

(Eleventh Mode)

Figure 19A:
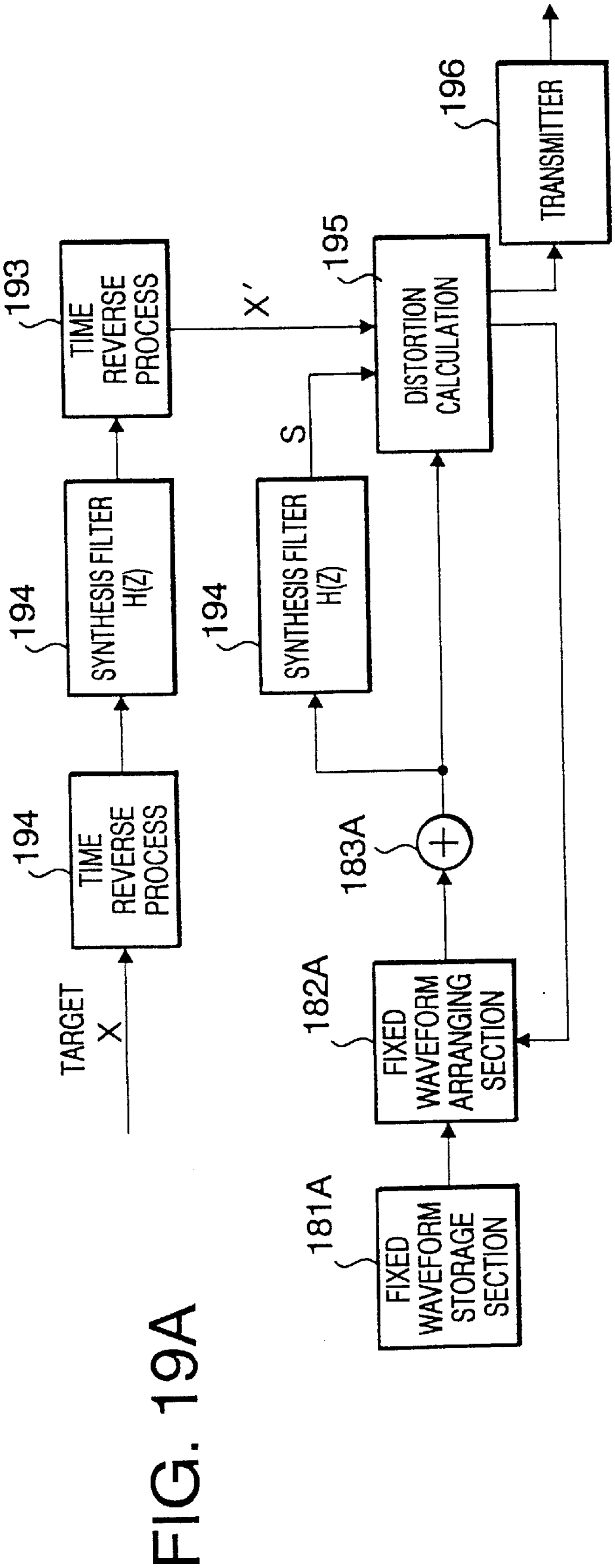
FIG. 19A is a block diagram of the essential portions of a speech coder according to an eleventh mode.
Figure 19B:
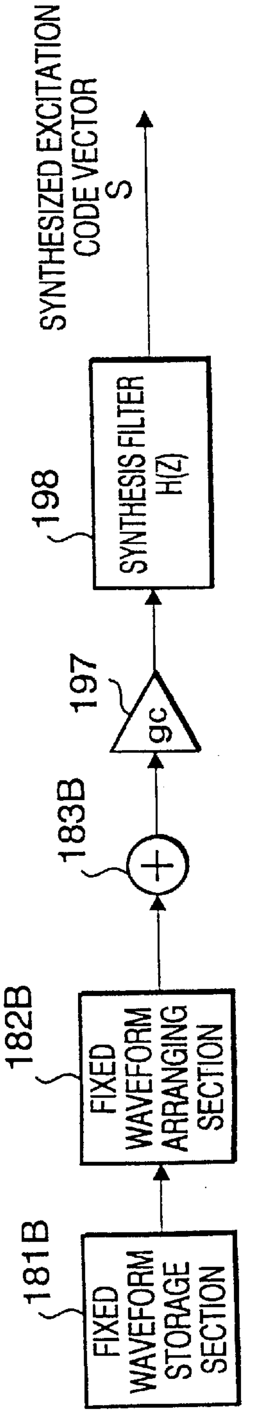
FIG. 19B is a block diagram of the essential portions of a speech decoder according to the eleventh mode.

FIG. 19A is a structural block diagram of a CELP type speech coder according to this mode, and FIG. 19B is a structural block diagram of a CELP type speech decoder which is paired with the CELP type speech coder.

The CELP type speech coder according to this mode has an excitation vector generator which comprises a fixed waveform storage section 181A, a fixed waveform arranging section 182A and an adding section 183A. The fixed waveform storage section 181A stores a plurality of fixed waveforms. The fixed waveform arranging section 182A arranges (shifts) fixed waveforms, read from the fixed waveform storage section 181A, respectively at the selected positions, based on start position candidate information for fixed waveforms it has. The adding section 183A adds the fixed waveforms, arranged by the fixed waveform arranging section 182A, to generate an excitation vector c.

This CELP type speech coder has a time reversing section 191 for time-reversing a random codebook searching target x to be input, a synthesis filter 192 for synthesizing the output of the time reversing section 191, a time reversing section 193 for time-reversing the output of the synthesis filter 192 again to yield a time-reversed synthesized target x', a synthesis filter 194 for synthesizing the excitation vector c multiplied by a random code vector gain gc, yielding a synthesized excitation vector s, a distortion calculator 205 for receiving x', c and s and computing distortion, and a transmitter 196.

According to this mode, the fixed waveform storage section 181A, the fixed waveform arranging section 182A and the adding section 183A correspond to the fixed waveform storage section 181, the fixed waveform arranging section 182 and the adding section 183 shown in FIG. 18, the start position candidates of fixed waveforms in the individual channels correspond to those in Table 8, and channel numbers, fixed waveform numbers and symbols indicating the lengths and positions in use are those shown in FIG. 18 and Table 8.

The CELP type speech decoder in FIG. 19B comprises a fixed waveform storage section 181B for storing a plurality of fixed waveforms, a fixed waveform arranging section 182B for arranging (shifting) fixed waveforms, read from the fixed waveform storage section 181B, respectively at the selected positions, based on start position candidate information for fixed waveforms it has, an adding section 183B for adding the fixed waveforms, arranged by the fixed waveform arranging section 182B, to yield an excitation vector c, a gain multiplier 197 for multiplying a random code vector gain gc, and a synthesis filter 198 for synthesizing the excitation vector c to yield a synthesized excitation vector s.

The fixed waveform storage section 181B and the fixed waveform arranging section 182B in the speech decoder have the same structures as the fixed waveform storage section 181A and the fixed waveform arranging section 182A in the speech coder, and the fixed waveforms stored in the fixed waveform storage sections 181A and 181B have such characteristics as to statistically minimize the cost function in the equation 3, which is the coding distortion computation of the equation 3 using a random codebook searching target by cost-function based learning.

The operation of the thus constituted speech coder will be discussed.

The random codebook searching target x is time-reversed by the time reversing section 191, then synthesized by the synthesis filter 192 and then time-reversed again by the time reversing section 193, and the result is sent as a time-reversed synthesized target x' to the distortion calculator 205.

The fixed waveform arranging section 182A arranges (shifts) the fixed waveform v1, read from the fixed waveform storage section 181A, at the position P1 selected from start position candidates for CH1, based on start position candidate information for fixed waveforms it has as shown in Table 8, and likewise arranges the fixed waveforms v2 and v3 at the respective positions P2 and P3 selected from start position candidates for CH2 and CH3. The arranged fixed waveforms are sent to the adding section 183A and added to become an excitation vector C, which is input to the synthesis filter 194. The synthesis filter 194 synthesizes the excitation vector c to produce a synthesized excitation vector s and sends it to the distortion calculator 205.

The distortion calculator 205 receives the time-reversed synthesized target x', the excitation vector c and the synthesized excitation vector s and computes coding distortion in the equation 4.

The distortion calculator 205 sends a signal to the fixed waveform arranging section 182A after computing the distortion. The process from the selection of start position candidates corresponding to the three channels by the fixed waveform arranging section 182A to the distortion computation by the distortion calculator 205 is repeated for every combination of the start position candidates selectable by the fixed waveform arranging section 182A.

Thereafter, the combination of the start position candidates that minimizes the coding distortion is selected, and the code number which corresponds, one to one, to that combination of the start position candidates and the then optimal random code vector gain gc are transmitted as codes of the random codebook to the transmitter 196.

The fixed waveform arranging section 182B selects the positions of the fixed waveforms in the individual channels from start position candidate information for fixed waveforms it has, based on information sent from the transmitter 196, arranges (shifts) the fixed waveform v1, read from the fixed waveform storage section 181B, at the position P1 selected from start position candidates for CH1, and likewise arranges the fixed waveforms v2 and v3 at the respective positions P2 and P3 selected from start position candidates for CH2 and CH3. The arranged fixed waveforms are sent to the adding section 183B and added to become an excitation vector c. This excitation vector c is multiplied by the random code vector gain gc selected based on the information from the transmitter 196, and the result is sent to the synthesis filter 198. The synthesis filter 198 synthesizes the gc-multiplied excitation vector c to yield a synthesized excitation vector s and sends it out.

According to the speech coder/decoder with the above structures, as an excitation vector is generated by the excitation vector generator which comprises the fixed waveform storage section, fixed waveform arranging section and the adding section, a synthesized excitation vector obtained by synthesizing this excitation vector in the synthesis filter has such a characteristic statistically close to that of an actual target as to be able to yield a high-quality synthesized speech, in addition to the advantages of the tenth mode.

Although the foregoing description of this mode has been given with reference to a case where fixed waveforms obtained by learning are stored in the fixed waveform storage sections 181A and 181B, high-quality synthesized speeches can also obtained even when fixed waveforms prepared based on the result of statistical analysis of the random codebook searching target x are used or when knowledge-based fixed waveforms are used.

While the description of this mode has been given with reference to a case of using three fixed waveforms, similar functions and advantages can be provided if the number of fixed waveforms is changed to other values.

Although the fixed waveform arranging section in this mode has been described as having the start position candidate information of fixed waveforms given in Table 8, similar functions and advantages can be provided for other start position candidate information of fixed waveforms than those in Table 8.

(Twelfth Mode)

Figure 20:
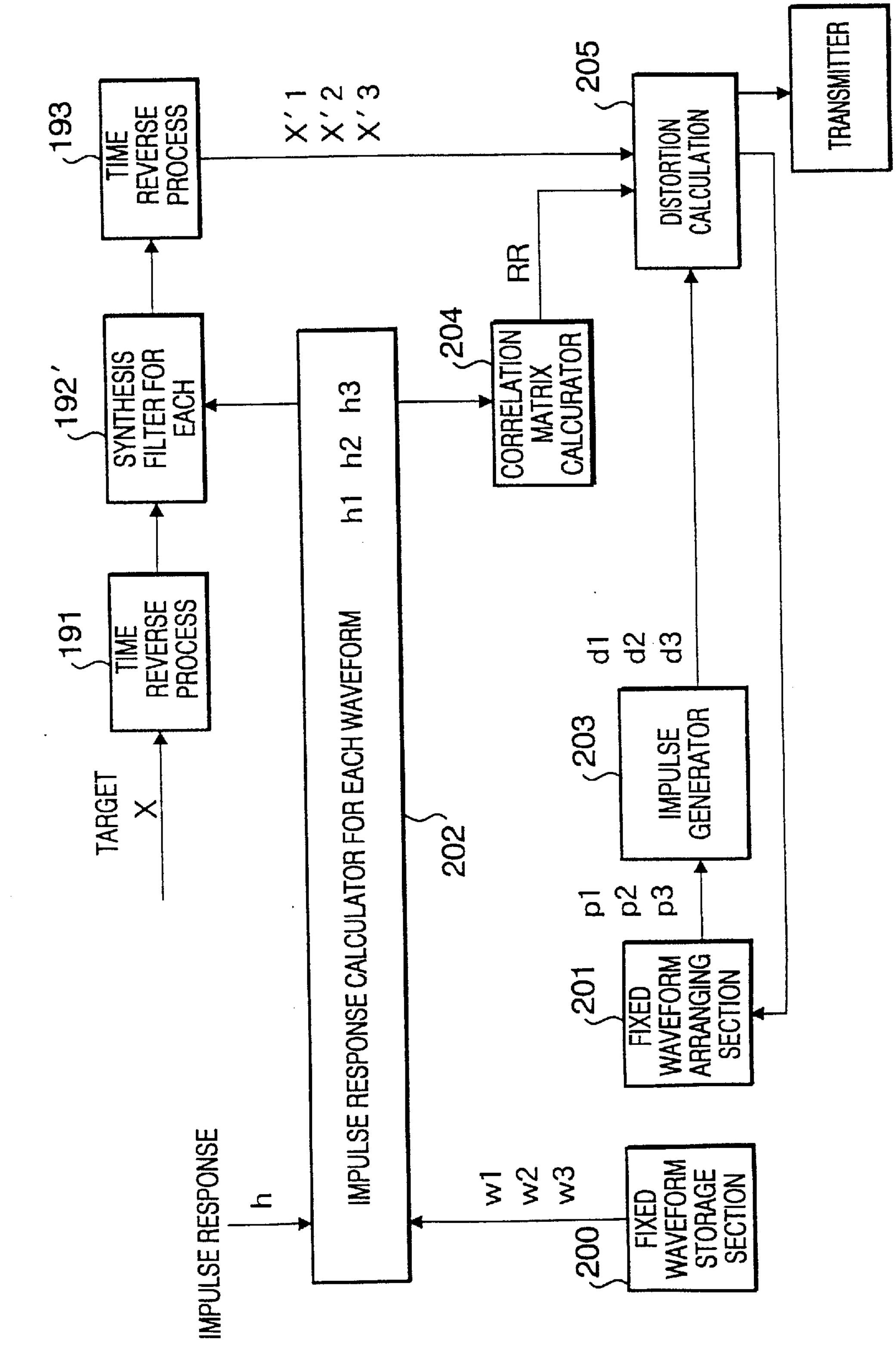
FIG. 20 is a block diagram of the essential portions of a speech coder according to a twelfth mode.

FIG. 20 presents a structural block diagram of a CELP type speech coder according to this mode.

This CELP type speech coder includes a fixed waveform storage section 200 for storing a plurality of fixed waveforms (three in this mode: CH1:w1, CH2:w2 and CH3:w3), and a fixed waveform arranging section 201 which has start position candidate information of fixed waveforms for generating start positions of the fixed waveforms, stored in the fixed waveform storage section 200, according to algebraic rules. This CELP type speech coder further has a fixed waveform an impulse response calculator 202 for each waveform, an impulse generator 203, a correlation matrix calculator 204, a time reversing section 191, a synthesis filter 192' for each waveform, a time reversing section 193 and a distortion calculator 205.

The impulse response calculator 202 has a function of convoluting three fixed waveforms from the fixed waveform storage section 200 and the impulse response h (length L=subframe length) of the synthesis filter to compute three kinds of impulse responses for the individual fixed waveforms (CH1:h1, CH2:h2 and CH3:h3, length L=subframe length).

The synthesis filter 192' has a function of convoluting the output of the time reversing section 191, which is the result of the time-reversing the random codebook searching target x to be input, and the impulse responses for the individual waveforms, h1, h2 and h3, from the impulse response calculator 202.

The impulse generator 203 sets a pulse of an amplitude 1 (a polarity present) only at the start position candidates P1, P2 and P3, selected by the fixed waveform arranging section 201, generating impulses for the individual channels (CH1:d1, CH2:d2 and CH3:d3).

The correlation matrix calculator 204 computes autocorrelation of each of the impulse responses h1, h2 and h3 for the individual waveforms from the impulse response calculator 202, and correlations between h1 and h2, h1 and h3, and h2 and h3, and develops the obtained correlation values in a correlation matrix RR.

The distortion calculator 205 specifies the random code vector that minimizes the coding distortion, from an equation 37, a modification of the equation 4, by using three time-reversed synthesis targets (x'1, x'2 and x'3),the correlation matrix RR and the three impulses (d1, d2 and d3) for the individual channels.

$$\frac{\left(\sum_{i=1}^{3} x_i'^t d_i\right)^2}{\sum_{i=1}^{3}\sum_{j=1}^{3} d_i'^t H_i^t H_j d_j} \tag{37}$$

where di: impulse (vector) for each channel di=±1x δ(k−$p_i$),k=0 to L−1,$p_i$: n start position candidates of the i-th channel $H_i$: impulse response convolution matrix for each waveform ($H_i$=H$W_i$)

$W_i$: fixed waveform convolution matrix $$W_i = \begin{bmatrix} w_i(0) & 0 & \cdots & \cdots & 0 & 0 & 0 & 0 \\ w_i(1) & w_i(0) & 0 & \cdots & 0 & 0 & 0 & 0 \\ w_i(2) & w_i(1) & w_i(0) & 0 & 0 & 0 & 0 & 0 \\ \vdots & \vdots & \vdots & \ddots & 0 & 0 & 0 & 0 \\ w_i(L_i-1) & w_i(L_i-2) & \ddots & \ddots & \ddots & 0 & 0 & 0 \\ 0 & w_i(L_i-1) & w_i(L_i-2) & \ddots & \ddots & 0 & \cdots & 0 \\ \vdots & 0 & w_i(L_i-1) & \ddots & \ddots & 0 & 0 & 0 \\ \vdots & \vdots & 0 & \ddots & \ddots & \ddots & 0 & 0 \\ \vdots & \vdots & \vdots & \ddots & \ddots & \ddots & \ddots & 0 \\ 0 & 0 & 0 & 0 & w_i(L_i-1) & \cdots & w_i(1) & w_i(0) \end{bmatrix}$$

where $w_i$ is the fixed waveform (length: $L_i$) of the i-th channel $x'_i$: vector obtained by time reverse synthesis of x using $H_i(x'^t_i = x^t H_i)$.

Here, transformation from the equation 4 to the equation 37 is shown for each of the denominator term (equation 38) and the numerator term (equation 39).

$$\begin{aligned} ((x^t Hc)^2 &= (x^t H(W_1 d_1 + W_2 d_2 + W_3 d_3)))^2 \\ &= (x^t(H_1 d_1 + H_2 d_2 + H_3 d_3))^2 \\ &= ((x^t H_1)d_1 + (x^t H_2)d_2 + (x^t H_3)d_3)^2 \\ &= (x_1''^t d_1 + x_2''^t d_2 + x_3''^t d_3)^2 \\ &= \left(\sum_{i=1}^{3} x_1''^t d_i\right)^2 \end{aligned} \tag{38}$$

where x: random codebook searching target (vector)

$x^t$: transposed vector of x

H: impulse response convolution matrix of the synthesis filter c: random code vector ($c=W_1d_1+W_2d_2+W_3d_3$)

$W_i$: fixed waveform convolution matrix di: impulse (vector) for each channel $H_i$: impulse response convolution matrix for each waveform ($H_i=HW_i$)

$x'_i$: vector obtained by time reverse synthesis of x using $H_i(x'^t_i = x^t H_i)$.

$$\begin{aligned} \|Hc\|^2 &= \|H(W_1 d_1 + W_2 d_2 + W_3 d_3)\|^2 \\ &= \|H_1 d_1 + H_2 d_2 + H_3 d_3\|^2 \\ &= (H_1 d_1 + H_2 d_2 + H_3 d_3)^t (H_1 d_1 + H_2 d_2 + H_3 d_3) \\ &= (d_1^t H_1^t + d_2^t H_2^t + d_3^t H_3^t)(H_1 d_1 + H_2 d_2 + H_3 d_3) \\ &= \sum_{i=1}^{3} \sum_{j=1}^{3} d_i^t H_i^t d_j H_j \end{aligned} \tag{39}$$

where

H: impulse response convolution matrix of the synthesis filter c: random code vector (c=W1d1+W2d2+W3d3)

$W_i$: fixed waveform convolution matrix di: impulse (vector) for each channel $H_i$: impulse response convolution matrix for each waveform ($H_i=HW_i$)

The operation of the thus constituted CELP type speech coder will be described.

To begin with, the impulse response calculator 202 convolutes three fixed waveforms stored and the impulse response h to compute three kinds of impulse responses h1, h2 and h3 for the individual fixed waveforms, and sends them to the synthesis filter 192' and the correlation matrix calculator 204.

Next, the synthesis filter 192' convolutes the random codebook searching target x, time-reversed by the time reversing section 191, and the input three kinds of impulse responses h1, h2 and h3 for the individual waveforms. The time reversing section 193 time-reverses the three kinds of output vectors from the synthesis filter 192' again to yield three time-reversed synthesis targets x'1, x'2 and x'3, and sends them to the distortion calculator 205.

Then, the correlation matrix calculator 204 computes autocorrelations of each of the input three kinds of impulse responses h1, h2 and h3 for the individual waveforms and correlations between h1 and h2, h1 and h3, and h2 and h3, and sends the obtained autocorrelations and correlations value to the distortion calculator 205 after developing them in the correlation matrix RR.

The above process having been executed as a pre-process, the fixed waveform arranging section 201 selects one start position candidate of a fixed waveform for each channel, and sends the positional information to the impulse generator 203.

The impulse generator 203 sets a pulse of an amplitude 1 (a polarity present) at each of the start position candidates, obtained from the fixed waveform arranging section 201, generating impulses d1, d2 and d3 for the individual channels and sends them to the distortion calculator 205.

Then, the distortion calculator 205 computes a reference value for minimizing the coding distortion in the equation 37, by using three time-reversed synthesis targets x'1, x'2 and x'3 for the individual waveforms, the correlation matrix RR and the three impulses d1, d2 and d3 for the individual channels.

The process from the selection of start position candidates corresponding to the three channels by the fixed waveform arranging section 201 to the distortion computation by the distortion calculator 205 is repeated for every combination of the start position candidates selectable by the fixed waveform arranging section 201. Then, code number which corresponds to the combination of the start position candidates that minimizes the reference value for searching the coding distortion in the equation 37 and the then optimal gain are specified with the random code vector gain gc used as a code of the random codebook, and are transmitted to the transmitter.

The speech decoder of this mode has a similar structure to that of the tenth mode in FIG. 19B, and the fixed waveform storage section and the fixed waveform arranging section in the speech coder have the same structures as the fixed waveform storage section and the fixed waveform arranging section in the speech decoder. The fixed waveforms stored in the fixed waveform storage section is a fixed waveform having such characteristics as to statistically minimize the cost function in the equation 3 by the training using the coding distortion equation (equation 3) with a random codebook searching target as a cost-function.

According to the thus constructed speech coder/decoder, when the start position candidates of fixed waveforms in the fixed waveform arranging section can be computed algebraically, the numerator in the equation 37 can be computed by adding the three terms of the time-reversed synthesis target for each waveform, obtained in the previous processing stage, and then obtaining the square of the result. Further, the numerator in the equation 37 can be computed by adding the nine terms in the correlation matrix of the impulse responses of the individual waveforms obtained in the previous processing stage. This can ensure searching with about the same amount of computation as needed in a case where the conventional algebraic structural excitation vector (an excitation vector is constituted by several pulses of an amplitude 1) is used for the random codebook.

Furthermore, a synthesized excitation vector in the synthesis filter has such a characteristic statistically close to that of an actual target as to be able to yield a high-quality synthesized speech.

Although the foregoing description of this mode has been given with reference to a case where fixed waveforms obtained through training are stored in the fixed waveform storage section, high-quality synthesized speeches can also obtained even when fixed waveforms prepared based on the result of statistical analysis of the random codebook searching target x are used or when knowledge-based fixed waveforms are used.

While the description of this mode has been given with reference to a case of using three fixed waveforms, similar functions and advantages can be provided if the number of fixed waveforms is changed to other values.

Although the fixed waveform arranging section in this mode has been described as having the start position candidate information of fixed waveforms given in Table 8, similar functions and advantages can be provided for other start position candidate information of fixed waveforms than those in Table 8.

(Thirteenth Mode)

Figure 21:
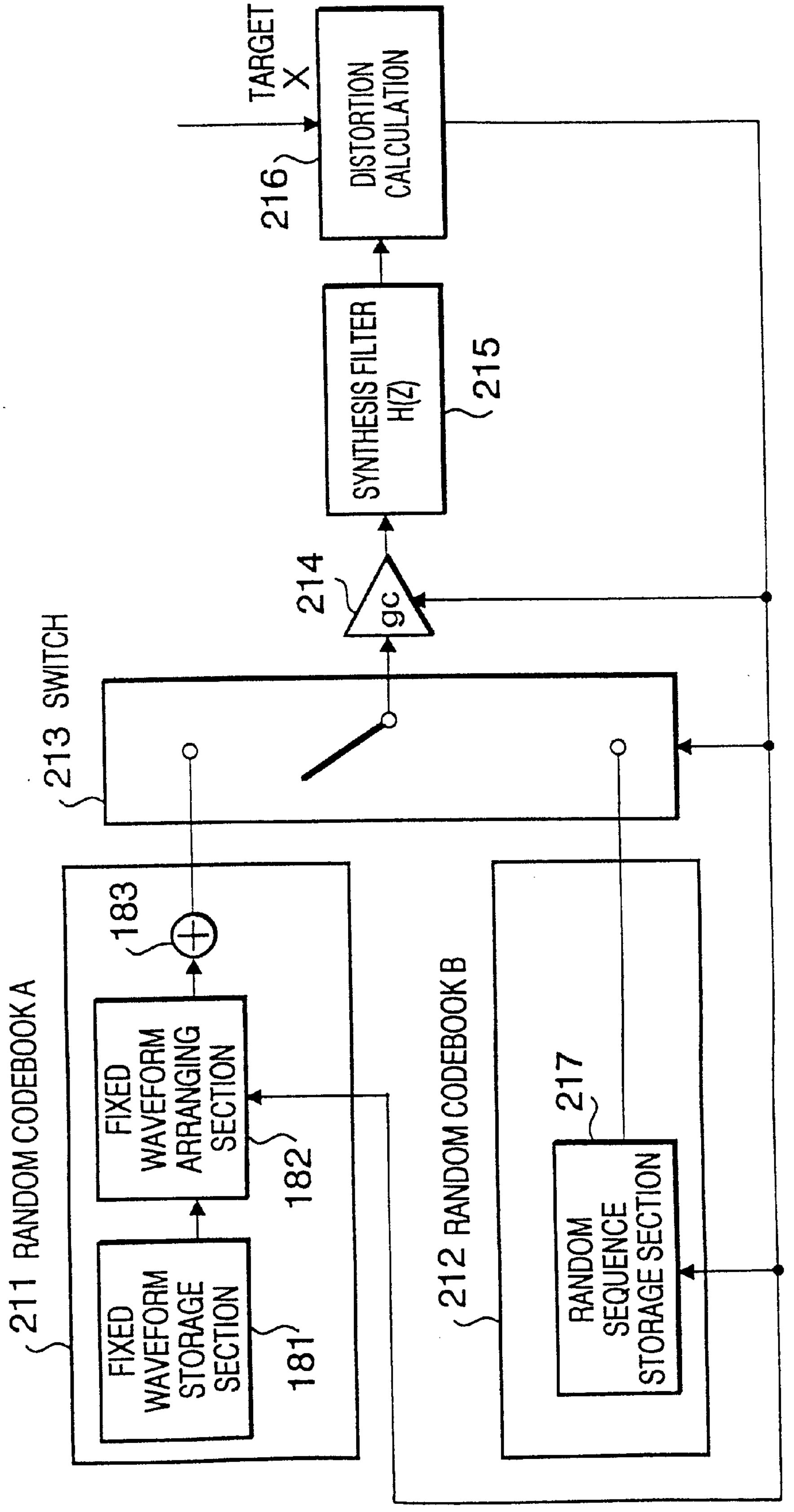
FIG. 21 is a block diagram of the essential portions of a speech coder according to a thirteenth mode.

FIG. 21 presents a structural block diagram of a CELP type speech coder according to this mode. The speech coder according to this mode has two kinds of random codebooks A 211 and B 212, a switch 213 for switching the two kinds of random codebooks from one to the other, a multiplier 214 for multiplying a random code vector by a gain, a synthesis filter 215 for synthesizing a random code vector output from the random codebook that is connected by means of the switch 213, and a distortion calculator 216 for computing coding distortion in the equation 2.

The random codebook A 211 has the structure of the excitation vector generator of the tenth mode, while the other random codebook B 212 is constituted by a random sequence storage section 217 storing a plurality of random code vectors generated from a random sequence. Switching between the random codebooks is carried out in a closed loop. The x is a random codebook searching target.

The operation of the thus constituted CELP type speech coder will be discussed.

First, the switch 213 is connected to the random codebook A 211, and the fixed waveform arranging section 182 arranges (shifts) the fixed waveforms, read from the fixed waveform storage section 181, at the positions selected from start position candidates of fixed waveforms respectively, based on start position candidate information for fixed waveforms it has as shown in Table 8. The arranged fixed waveforms are added together in the adding section 183 to become a random code vector, which is sent to the synthesis filter 215 after being multiplied by the random code vector gain. The synthesis filter 215 synthesizes the input random code vector and sends the result to the distortion calculator 216.

The distortion calculator 216 performs minimization of the coding distortion in the equation 2 by using the random codebook searching target x and the synthesized code vector obtained from the synthesis filter 215.

After computing the distortion, the distortion calculator 216 sends a signal to the fixed waveform arranging section 182. The process from the selection of start position candidates corresponding to the three channels by the fixed waveform arranging section 182 to the distortion computation by the distortion calculator 216 is repeated for every combination of the start position candidates selectable by the fixed waveform arranging section 182.

Thereafter, the combination of the start position candidates that minimizes the coding distortion is selected, and the code number which corresponds, one to one, to that combination of the start position candidates, the then optimal random code vector gain gc and the minimum coding distortion value are memorized.

Then, the switch 213 is connected to the random codebook B 212, causing a random sequence read from the random sequence storage section 217 to become a random code vector. This random code vector, after being multiplied by the random code vector gain, is input to the synthesis filter 215. The synthesis filter 215 synthesizes the input random code vector and sends the result to the distortion calculator 216.

The distortion calculator 216 computes the coding distortion in the equation 2 by using the random codebook searching target x and the synthesized code vector obtained from the synthesis filter 215.

After computing the distortion, the distortion calculator 216 sends a signal to the random sequence storage section 217. The process from the selection of the random code vector by the random sequence storage section 217 to the distortion computation by the distortion calculator 216 is repeated for every random code vector selectable by the random sequence storage section 217.

Thereafter, the random code vector that minimizes the coding distortion is selected, and the code number of that random code vector, the then optimal random code vector gain gc and the minimum coding distortion value are memorized.

Then, the distortion calculator 216 compares the minimum coding distortion value obtained when the switch 213 is connected to the random codebook A 211 with the minimum coding distortion value obtained when the switch 213 is connected to the random codebook B 212, determines switch connection information when smaller coding distortion was obtained, the then code number and the random code vector gain are determined as speech codes, and are sent to an unillustrated transmitter.

The speech decoder according to this mode which is paired with the speech coder of this mode has the random codebook A, the random codebook B, the switch, the random code vector gain and the synthesis filter having the same structures and arranged in the same way as those in FIG. 21, a random codebook to be used, a random code vector and a random code vector gain are determined based on a speech code input from the transmitter, and a synthesized excitation vector is obtained as the output of the synthesis filter.

According to the speech coder/decoder with the above structures, one of the random code vectors to be generated from the random codebook A and the random code vectors to be generated from the random codebook B, which minimizes the coding distortion in the equation 2, can be selected in a closed loop, making it possible to generate an excitation vector closer to an actual speech and a high-quality synthesized speech.

Figure 1:
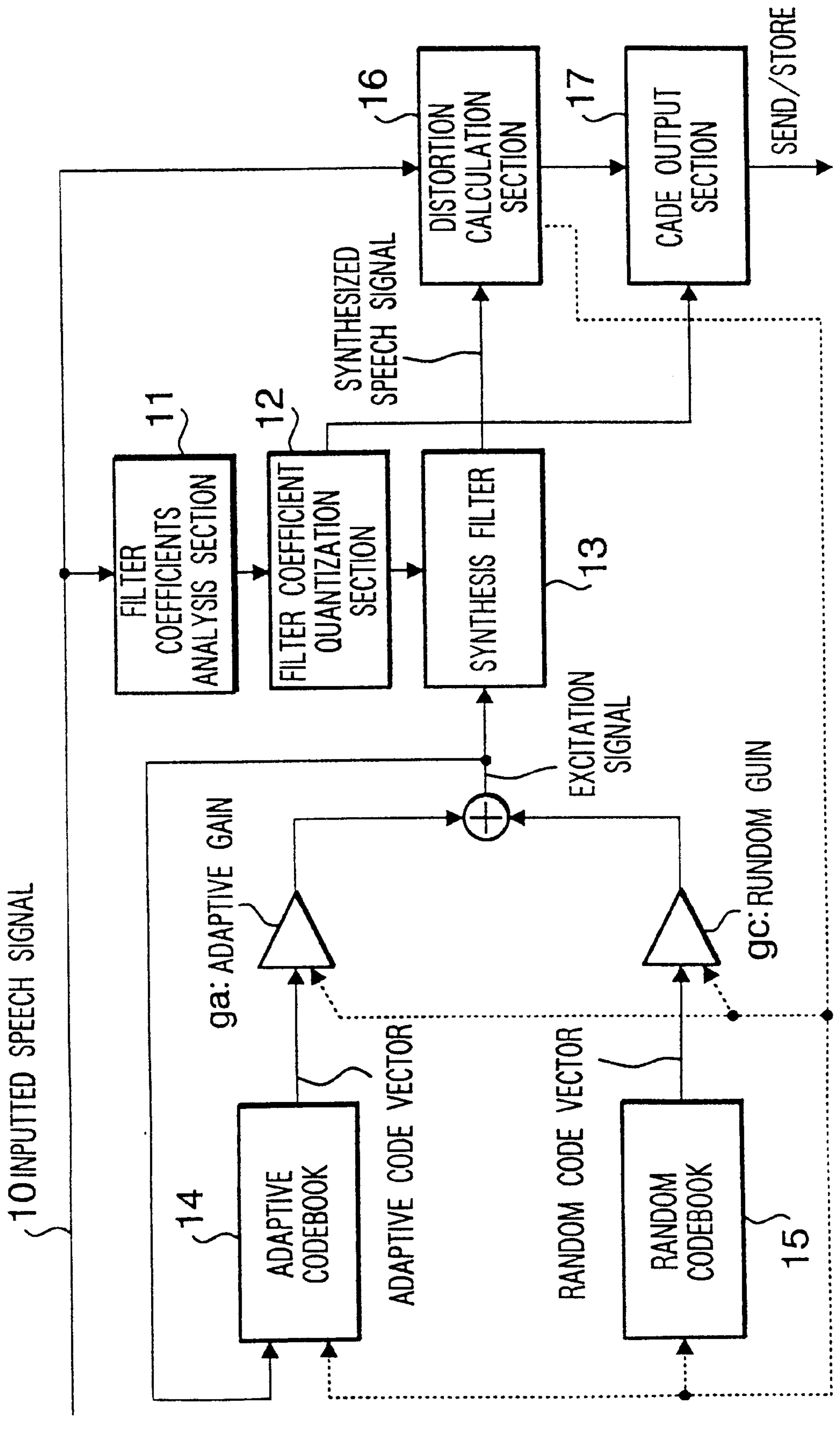
FIG. 1 is a schematic diagram of a conventional CELP type speech coder.
Figure 2A:
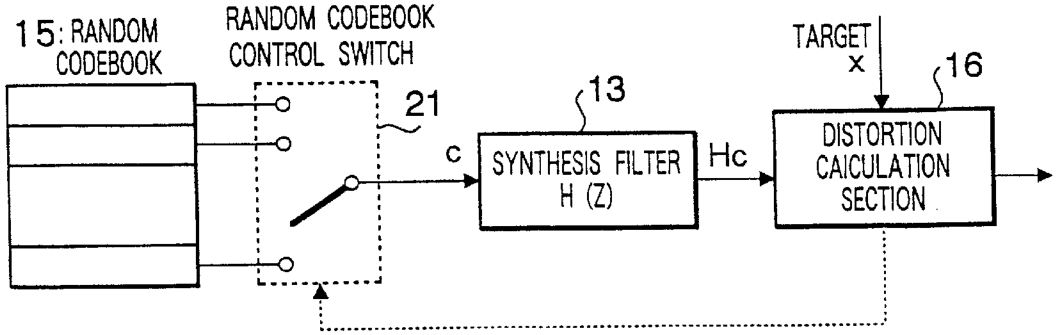
FIG. 2A is a block diagram of an excitation vector generating section in the speech coder in FIG.
Figure 2B:
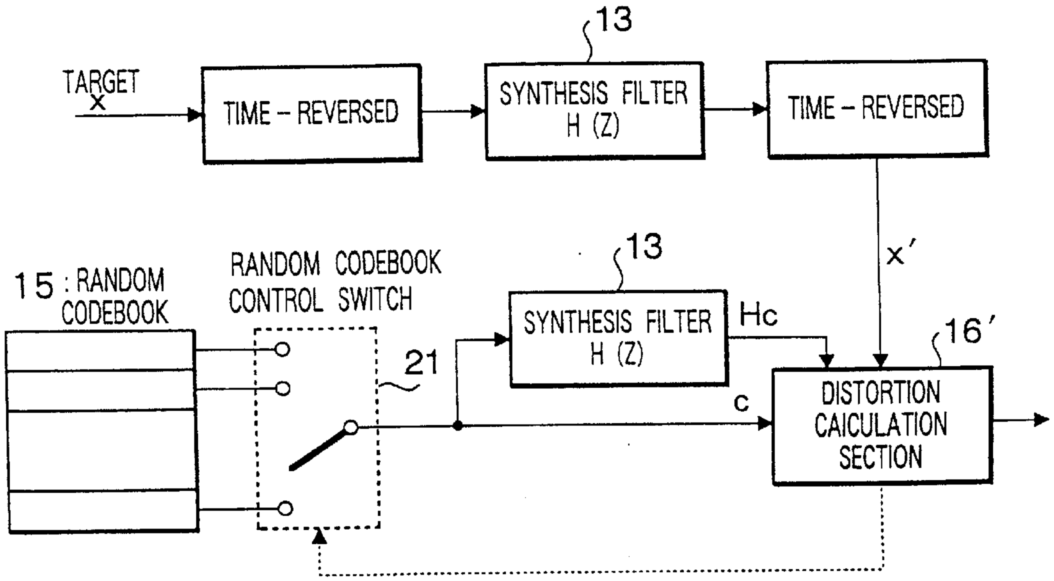
FIG. 2B is a block diagram of a modification of the excitation vector generating section which is designed to reduce the computation cost.
Figure 2C:
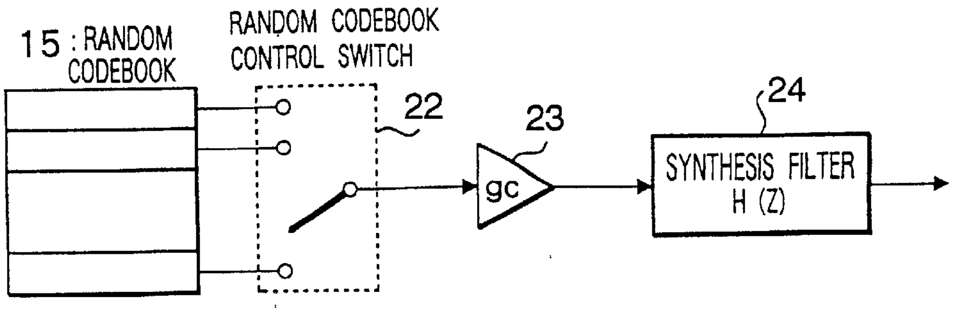
FIG. 2C is a block diagram of an excitation vector generating section in a speech decoder which is used as a pair with the speech coder in FIG. 1.

Although this mode has been illustrated as a speech coder/decoder based on the structure in FIG. 2 of the conventional CELP type speech coder, similar functions and advantages can be provided even if this mode is adapted to a CELP type speech coder/decoder based on the structure in FIGS. 19A and 19B or FIG. 20.

Although the random codebook A 211 in this mode has the same structure as shown in FIG. 18, similar functions and advantages can be provided even if the fixed waveform storage section 181 takes another structure (e.g., in a case where it has four fixed waveforms).

While the description of this mode has been given with reference to a case where the fixed waveform arranging section 182 of the random codebook A 211 has the start position candidate information of fixed waveforms as shown in Table 8, similar functions and advantages can be provided even for a case where the section 182 has other start position candidate information of fixed waveforms.

Although this mode has been described with reference to a case where the random codebook B 212 is constituted by the random sequence storage section 217 for directly storing a plurality of random sequences in the memory, similar functions and advantages can be provided even for a case where the random codebook B 212 takes other excitation vector structures (e.g., when it is constituted by excitation vector generation information with an algebraic structure).

Although this mode has been described as a CELP type speech coder/decoder having two kinds of random codebooks, similar functions and advantages can be provided even in a case of using a CELP type speech coder/decoder having three or more kinds of random codebooks.

(Fourteenth Mode)

Figure 22:
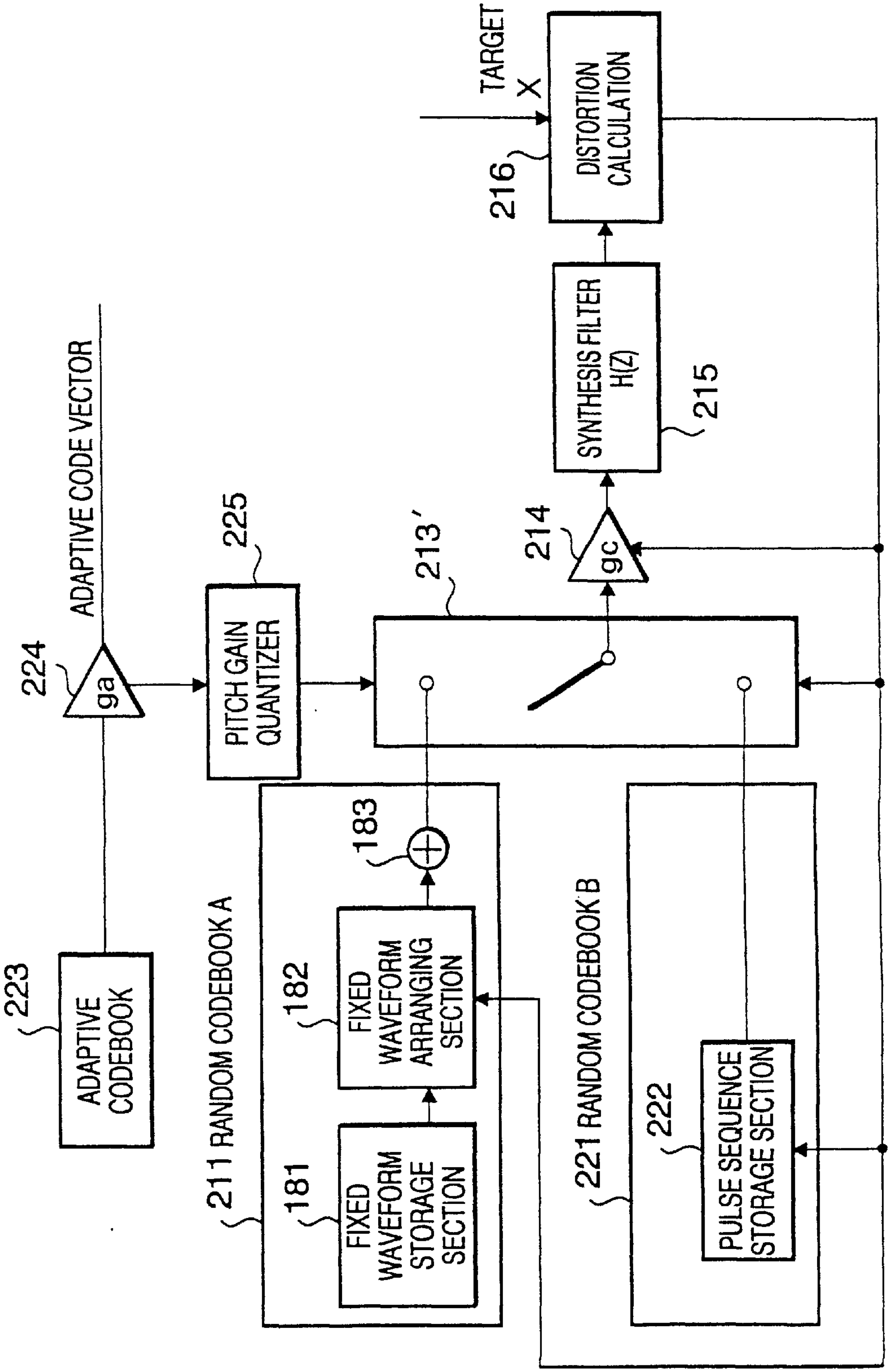
FIG. 22 is a block diagram of the essential portions of a speech coder according to a fourteenth mode.

FIG. 22 presents a structural block diagram of a CELP type speech coder according to this mode. The speech coder according to this mode has two kinds of random codebooks. One random codebook has the structure of the excitation vector generator shown in FIG. 18, and the other one is constituted of a pulse sequences storage section which retains a plurality of pulse sequences. The random codebooks are adaptively switched from one to the other by using a quantized pitch gain already acquired before random codebook search.

The random codebook A 211, which comprises the fixed waveform storage section 181, fixed waveform arranging section 182 and adding section 183, corresponds to the excitation vector generator in FIG. 18. A random codebook B 221 is comprised of a pulse sequences storage section 222 where a plurality of pulse sequences are stored. The random codebooks A 211 and B 221 are switched from one to the other by means of a switch 213'. A multiplier 224 outputs an adaptive code vector which is the output of an adaptive codebook 223 multiplied by the pitch gain that has already been acquired at the time of random codebook search. The output of a pitch gain quantizer 225 is given to the switch 213'.

The operation of the thus constituted CELP type speech coder will be described.

According to the conventional CELP type speech coder, the adaptive codebook 223 is searched first, and the random codebook search is carried out based on the result. This adaptive codebook search is a process of selecting an optimal adaptive code vector from a plurality of adaptive code vectors stored in the adaptive codebook 223 (vectors each obtained by multiplying an adaptive code vector and a random code vector by their respective gains and then adding them together). As a result of the process, the code number and pitch gain of an adaptive code vector are generated.

According to the CELP type speech coder of this mode, the pitch gain quantizer 225 quantizes this pitch gain, generating a quantized pitch gain, after which random codebook search will be performed. The quantized pitch gain obtained by the pitch gain quantizer 225 is sent to the switch 213' for switching between the random codebooks.

The switch 213' connects to the random codebook A 211 when the value of the quantized pitch gain is small, by which it is considered that the input speech is unvoiced, and connects to the random codebook B 221 when the value of the quantized pitch gain is large, by which it is considered that the input speech is voiced.

When the switch 213' is connected to the random codebook A 211, the fixed waveform arranging section 182 arranges (shifts) the fixed waveforms, read from the fixed waveform storage section 181, at the positions selected from start position candidates of fixed waveforms respectively, based on start position candidate information for fixed waveforms it has as shown in Table 8. The arranged fixed waveforms are sent to the adding section 183 and added together to become a random code vector. The random code vector is sent to the synthesis filter 215 after being multiplied by the random code vector gain. The synthesis filter 215 synthesizes the input random code vector and sends the result to the distortion calculator 216.

The distortion calculator 216 computes coding distortion in the equation 2 by using the target x for random codebook search and the synthesized code vector obtained from the synthesis filter 215.

After computing the distortion, the distortion calculator 216 sends a signal to the fixed waveform arranging section 182. The process from the selection of start position candidates corresponding to the three channels by the fixed waveform arranging section 182 to the distortion computation by the distortion calculator 216 is repeated for every combination of the start position candidates selectable by the fixed waveform arranging section 182.

Thereafter, the combination of the start position candidates that minimizes the coding distortion is selected, and the code number which corresponds, one to one, to that combination of the start position candidates, the then optimal random code vector gain gc and the quantized pitch gain are transferred to a transmitter as a speech code. In this mode, the property of unvoiced sound should be reflected on fixed waveform patterns to be stored in the fixed waveform storage section 181, before speech coding takes places.

When the switch 213' is connected to the random codebook B 212, a pulse sequence read from the pulse sequences storage section 222 becomes a random code vector. This random code vector is input to the synthesis filter 215 through the switch 213' and multiplication of the random code vector gain. The synthesis filter 215 synthesizes the input random code vector and sends the result to the distortion calculator 216.

The distortion calculator 216 computes the coding distortion in the equation 2 by using the target x for random codebook search X and the synthesized code vector obtained from the synthesis filter 215.

After computing the distortion, the distortion calculator 216 sends a signal to the pulse sequences storage section 222. The process from the selection of the random code vector by the pulse sequences storage section 222 to the distortion computation by the distortion calculator 216 is repeated for every random code vector selectable by the pulse sequences storage section 222.

Thereafter, the random code vector that minimizes the coding distortion is selected, and the code number of that random code vector, the then optimal random code vector gain gc and the quantized pitch gain are transferred to the transmitter as a speech code.

The speech decoder according to this mode which is paired with the speech coder of this mode has the random codebook A, the random codebook B, the switch, the random code vector gain and the synthesis filter having the same structures and arranged in the same way as those in FIG. 22. First, upon reception of the transmitted quantized pitch gain, the coder side determines from its level whether the switch 213' has been connected to the random codebook A 211 or to the random codebook B 221. Next, based on the code number and the sign of the random code vector, a synthesized excitation vector is obtained as the output of the synthesis filter.

According to the speech coder/decoder with the above structures, two kinds of random codebooks can be switched adaptively in accordance with the characteristic of an input speech (the level of the quantized pitch gain is used to determine the transmitted quantized pitch gain in this mode), so that when the input speech is voiced, a pulse sequence can be selected as a random code vector whereas for a strong voiceless property, a random code vector which reflects the property of voiceless sounds can be selected. This can ensure generation of excitation vectors closer to the actual sound property and improvement of synthesized sounds. Because switching is performed in a closed loop in this mode as mentioned above, the functional effects can be improved by increasing the amount of information to be transmitted.

Although this mode has been illustrated as a speech coder/decoder based on the structure in FIG. 2 of the conventional CELP type speech coder, similar functions and advantages can be provided even if this mode is adapted to a CELP type speech coder/decoder based on the structure in FIGS. 19A and 19B or FIG. 20.

In this mode, a quantized pitch gain acquired by quantizing the pitch gain of an adaptive code vector in the pitch gain quantizer 225 is used as a parameter for switching the switch 213'. A pitch period calculator may be provided so that a pitch period computed from an adaptive code vector can be used instead.

Although the random codebook A 211 in this mode has the same structure as shown in FIG. 18, similar functions and advantages can be provided even if the fixed waveform storage section 181 takes another structure (e.g., in a case where it has four fixed waveforms).

While the description of this mode has been given with reference to the case where the fixed waveform arranging section 182 of the random codebook A 211 has the start position candidate information of fixed waveforms as shown in Table 8, similar functions and advantages can be provided even for a case where the section 182 has other start position candidate information of fixed waveforms.

Although this mode has been described with reference to the case where the random codebook B 212 is constituted by the pulse sequences storage section 222 for directly storing a pulse sequence in the memory, similar functions and advantages can be provided even for a case where the random codebook B 212 takes other excitation vector structures (e.g., when it is constituted by excitation vector generation information with an algebraic structure).

Although this mode has been described as a CELP type speech coder/decoder having two kinds of random codebooks, similar functions and advantages can be provided even in a case of using a CELP type speech coder/decoder having three or more kinds of random codebooks.

(Fifteenth Mode)

Figure 23:
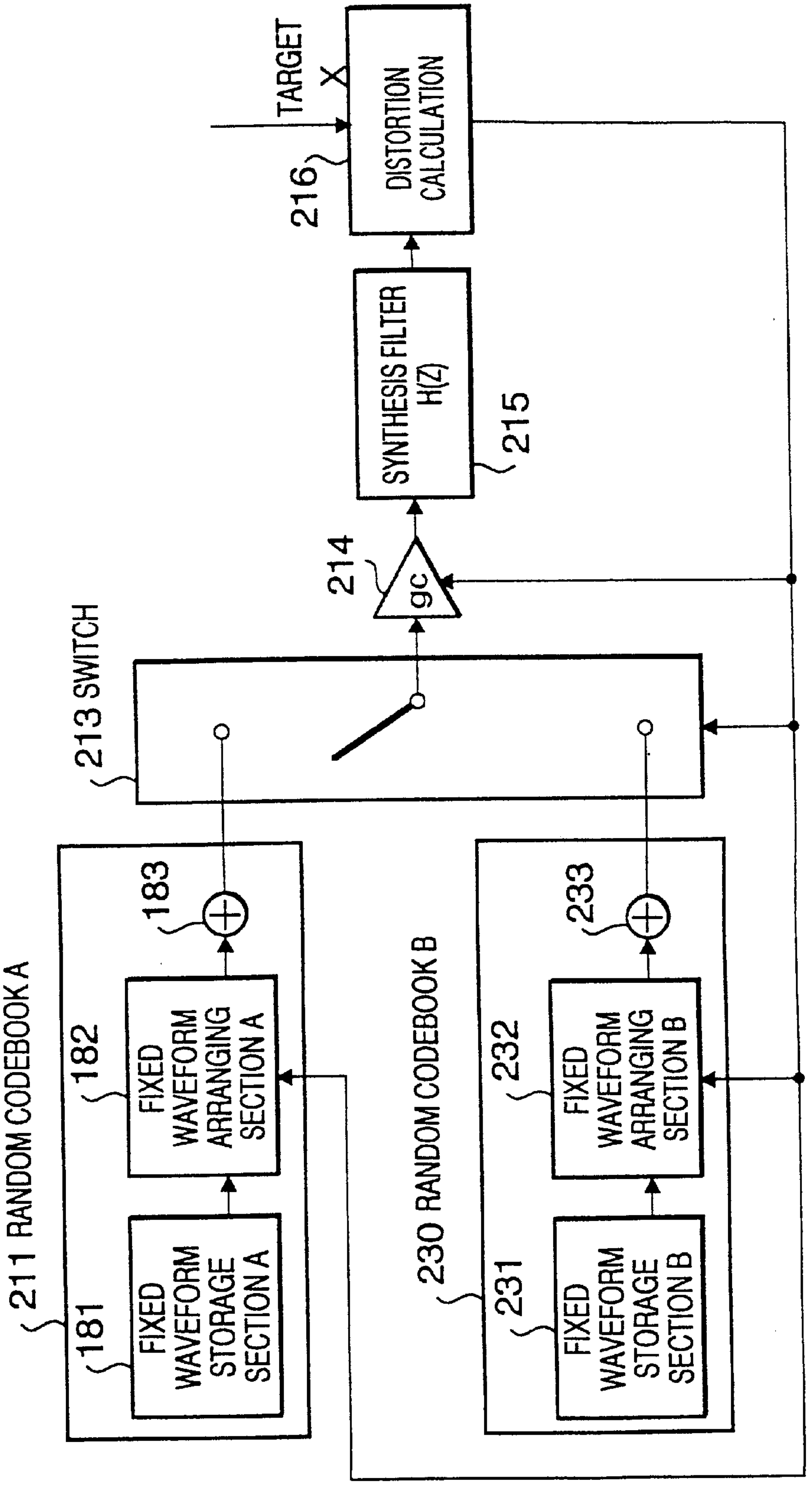
FIG. 23 is a block diagram of the essential portions of a speech coder according to a fifteenth mode.

FIG. 23 presents a structural block diagram of a CELP type speech coder according to this mode. The speech coder according to this mode has two kinds of random codebooks. One random codebook takes the structure of the excitation vector generator shown in FIG. 18 and has three fixed waveforms stored in the fixed waveform storage section, and the other one likewise takes the structure of the excitation vector generator shown in FIG. 18 but has two fixed waveforms stored in the fixed waveform storage section. Those two kinds of random codebooks are switched in a closed loop.

The random codebook A 211, which comprises a fixed waveform storage section A 181 having three fixed waveforms stored therein, fixed waveform arranging section A 182 and adding section 183, corresponds to the structure of the excitation vector generator in FIG. 18 which however has three fixed waveforms stored in the fixed waveform storage section.

A random codebook B 230 comprises a fixed waveform storage section B 231 having two fixed waveforms stored therein, fixed waveform arranging section B 232 having start position candidate information of fixed waveforms as shown in Table 9 and adding section 233, which adds two fixed waveforms, arranged by the fixed waveform arranging section B 232, thereby generating a random code vector. The random codebook B 230 corresponds to the structure of the excitation vector generator in FIG. 18 which however has two fixed waveforms stored in the fixed waveform storage section.

TABLE 9

| Channel number | Sign | Channel number Sign Start position candidates fixed waveforms |
|---|---|---|
| CH1 | ±1 | P1 (0, 4, 8, 12, 16, . . . , 72, 76<br>2, 6, 10, 14, 18, . . . , 74, 78) |
| CH2 | ±1 | P2 (1, 5, 9, 13, 17, . . . , 73, 77<br>3, 7, 11, 15, 19, . . . , 75, 79) |

The other structure is the same as that of the above-described thirteenth mode.

The operation of the CELP type speech coder constructed in the above way will be described.

First, the switch 213 is connected to the random codebook A 211, and the fixed waveform arranging section A 182 arranges (shifts) three fixed waveforms, read from the fixed waveform storage section A 181, at the positions selected from start position candidates of fixed waveforms respectively, based on start position candidate information for fixed waveforms it has as shown in Table 8. The arranged three fixed waveforms are output to the adding section 183 and added together to become a random code vector. This random code vector is sent to the synthesis filter 215 through the switch 213 and the multiplier 214 for multiplying it by the random code vector gain. The synthesis filter 215 synthesizes the input random code vector and sends the result to the distortion calculator 216.

The distortion calculator 216 computes coding distortion in the equation 2 by using the random codebook search target X and the synthesized code vector obtained from the synthesis filter 215.

After computing the distortion, the distortion calculator 216 sends a signal to the fixed waveform arranging section A 182. The process from the selection of start position candidates corresponding to the three channels by the fixed waveform arranging section A 182 to the distortion computation by the distortion calculator 216 is repeated for every combination of the start position candidates selectable by the fixed waveform arranging section A 182.

Thereafter, the combination of the start position candidates that minimizes the coding distortion is selected, and the code number which corresponds, one to one, to that combination of the start position candidates, the then optimal random code vector gain gc and the minimum coding distortion value are memorized.

In this mode, the fixed waveform patterns to be stored in the fixed waveform storage section A 181 before speech coding are what have been acquired through training in such a way as to minimize distortion under the condition of three fixed waveforms in use.

Next, the switch 213 is connected to the random codebook B 230, and the fixed waveform arranging section B 232 arranges (shifts) two fixed waveforms, read from the fixed waveform storage section B 231, at the positions selected from start position candidates of fixed waveforms respectively, based on start position candidate information for fixed waveforms it has as shown in Table 9. The arranged two fixed waveforms are output to the adding section 233 and added together to become a random code vector. This random code vector is sent to the synthesis filter 215 through the switch 213 and the multiplier 214 for multiplying it by the random code vector gain. The synthesis filter 215 synthesizes the input random code vector and sends the result to the distortion calculator 216.

The distortion calculator 216 computes coding distortion in the equation 2 by using the target x for random codebook search X and the synthesized code vector obtained from the synthesis filter 215.

After computing the distortion, the distortion calculator 216 sends a signal to the fixed waveform arranging section B 232. The process from the selection of start position candidates corresponding to the three. channels by the fixed waveform arranging section B 232 to the distortion computation by the distortion calculator 216 is repeated for every combination of the start position candidates selectable by the fixed waveform arranging section B 232.

Thereafter, the combination of the start position candidates that minimizes the coding distortion is selected, and the code number which corresponds, one to one, to that combination of the start position candidates, the then optimal random code vector gain gc and the minimum coding distortion value are memorized. In this mode, the fixed waveform patterns to be stored in the fixed waveform storage section B 231 before speech coding are what have been acquired through training in such a way as to minimize distortion under the condition of two fixed waveforms in use.

Then, the distortion calculator 216 compares the minimum coding distortion value obtained when the switch 213 is connected to the random codebook B 230 with the minimum coding distortion value obtained when the switch 213 is connected to the random codebook B 212, determines switch connection information when smaller coding distortion was obtained, the then code number and the random code vector gain are determined as speech codes, and are sent to the transmitter.

The speech decoder according to this mode has the random codebook A, the random codebook B, the switch, the random code vector gain and the synthesis filter having the same structures and arranged in the same way as those in FIG. 23, a random codebook to be used, a random code vector and a random code vector gain are determined based on a speech code input from the transmitter, and a synthesized excitation vector is obtained as the output of the synthesis filter.

According to the speech coder/decoder with the above structures, one of the random code vectors to be generated from the random codebook A and the random code vectors to be generated from the random codebook B, which minimizes the coding distortion in the equation 2, can be selected in a closed loop, making it possible to generate an excitation vector closer to an actual speech and a high-quality synthesized speech.

Although this mode has been illustrated as a speech coder/decoder based on the structure in FIG. 2 of the conventional CELP type speech coder, similar functions and advantages can be provided even if this mode is adapted to a CELP type speech coder/decoder based on the structure in FIGS. 19A and 19B or FIG. 20.

Although this mode has been described with reference to the case where the fixed waveform storage section A 181 of the random codebook A 211 stores three fixed waveforms, similar functions and advantages can be provided even if the fixed waveform storage section A 181 stores a different number of fixed waveforms (e.g., in a case where it has four fixed waveforms). The same is true of the random codebook B 230.

While the description of this mode has been given with reference to the case where the fixed waveform arranging section A 182 of the random codebook A 211 has the start position candidate information of fixed waveforms as shown in Table 8, similar functions and advantages can be provided even for a case where the section 182 has other start position candidate information of fixed waveforms. The same is applied to the random codebook B 230.

Although this mode has been described as a CELP type speech coder/decoder having two kinds of random codebooks, similar functions and advantages can be provided even in a case of using a CELP type speech coder/decoder having three or more kinds of random codebooks.

(Sixteenth Mode)

Figure 24:
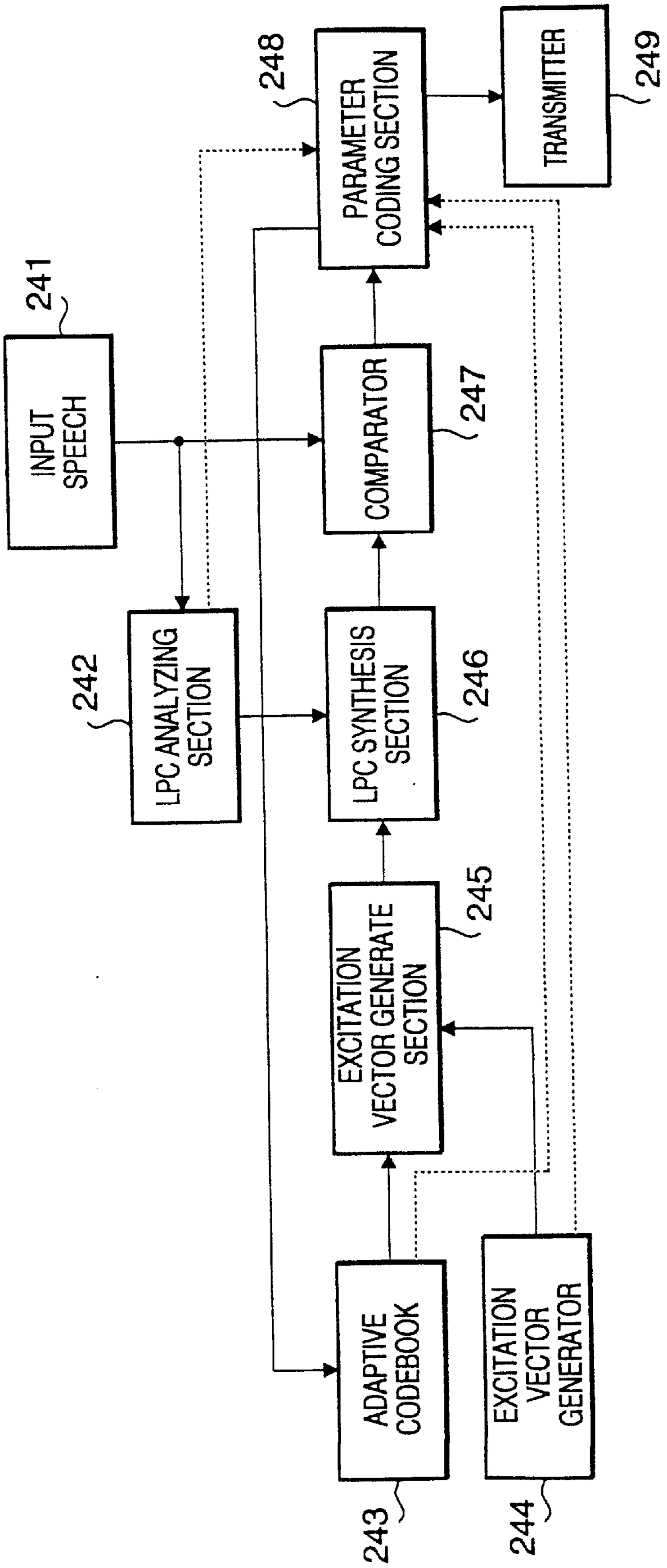
FIG. 24 is a block diagram of the essential portions of a speech coder according to a sixteenth mode.

FIG. 24 presents a structural block diagram of a CELP type speech coder according to this mode. The speech coder acquires LPC coefficients by performing autocorrelation analysis and LPC analysis on input speech data 241 in an LPC analyzing section 242, encodes the obtained LPC coefficients to acquire LPC codes, and encodes the obtained LPC codes to yield decoded LPC coefficients.

Next, an excitation vector generator 245 acquires an adaptive code vector and a random code vector from an adaptive codebook 243 and an excitation vector generator 244, and sends them to an LPC synthesis filter 246. One of the excitation vector generators of the above-described first to fourth and tenth modes is used for the excitation vector generator 244. Further, the LPC synthesis filter 246 filters two excitation vectors, obtained by the excitation vector generator 245, with the decoded LPC coefficients obtained by the LPC analyzing section 242, thereby yielding two synthesized speeches.

A comparator 247 analyzes a relationship between the two synthesized speeches, obtained by the LPC synthesis filter 246, and the input speech, yielding optimal values (optimal gains) of the two synthesized speeches, adds the synthesized speeches whose powers have been adjusted with the optimal gains, acquiring a total synthesized speech, and then computes a distance between the total synthesized speech and the input speech.

Distance computation is also carried out on the input speech and multiple synthesized speeches, which are obtained by causing the excitation vector generator 245 and the LPC synthesis filter 246 to function with respect to all the excitation vector samples those are generated by the random codebook 243 and the excitation vector generator 244. Then, the index of the excitation vector sample which provides the minimum one of the distances obtained from the computation. The obtained optimal gains, the obtained index of the excitation vector sample and two excitation vectors corresponding to that index are sent to a parameter coding section 248.

The parameter coding section 248 encodes the optimal gains to obtain gain codes, and the LPC codes and the index of the excitation vector sample are all sent to a transmitter 249. An actual excitation signal is produced from the gain codes and the two excitation vectors corresponding to the index, and an old excitation vector sample is discarded at the same time the excitation signal is stored in the adaptive codebook 243.

Figure 25:
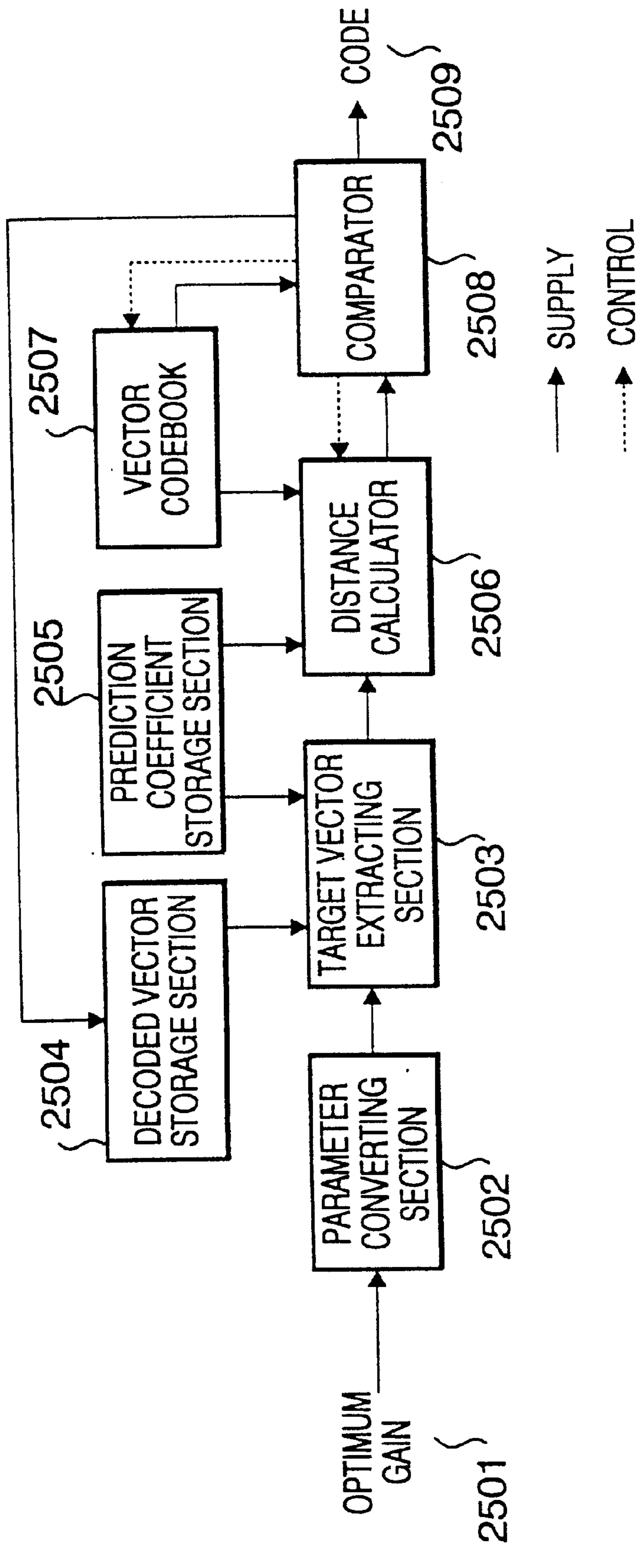
FIG. 25 is a block diagram of a vector quantizing section in the sixteenth mode.

FIG. 25 shows functional blocks of a section in the parameter coding section 248, which is associated with vector quantization of the gain.

The parameter coding section 248 has a parameter converting section 2502 for converting input optimal gains 2501 to a sum of elements and a ratio with respect to the sum to acquire quantization target vectors, a target vector extracting section 2503 for obtaining a target vector by using old decoded code vectors, stored in a decoded vector storage section, and predictive coefficients stored in a predictive coefficients storage section, a decoded vector storage section 2504 where old decoded code vectors are stored, a predictive coefficients storage section 2505, a distance calculator 2506 for computing distances between a plurality of code vectors stored in a vector codebook and a target vector obtained by the target vector extracting section by using predictive coefficients stored in the predictive coefficients storage section, a vector codebook 2507 where a plurality of code vectors are stored, and a comparator 2508, which controls the vector codebook and the distance calculator for comparison of the distances obtained from the distance calculator to acquire the number of the most appropriate code vector, acquires a code vector from the vector storage section based on the obtained number, and updates the content of the decoded vector storage section using that code vector.

A detailed description will now be given of the operation of the thus constituted parameter coding section 248. The vector codebook 2507 where a plurality of general samples (code vectors) of a quantization target vector are stored should be prepared in advance. This is generally prepared by an LBG algorithm (IEEE TRANSACTIONS ON COMMUNICATIONS, VOL. COM-28, NO. 1, PP 84–95, JANUARY 1980) based on multiple vectors which are obtained by analyzing multiple speech data.

Coefficients for predictive coding should be stored in the predictive coefficients storage section 2505. The predictive coefficients will now be discussed after describing the algorithm. A value indicating a unvoiced stateshould be stored as an initial value in the decoded vector storage section 2504. One example would be a code vector with the lowest power.

First, the input optimal gains 2501 (the gain of an adaptive excitation vector and the gain of a random excitation vector) are converted to element vectors (inputs) of a sum and a ratio in the parameter converting section 2502. The conversion method is illustrated in an equation 40.

$$P=\log(Ga+Gs)$$

$$R=Ga/(Ga+Gs) \qquad (40)$$

where (Ga, Gs): optical gain

Ga: gain of an adaptive excitation vector

Gs: gain of stochastic excitation vector (P, R): input vectors

P: sum

R: ratio.

It is to be noted that Ga above should not necessarily be a positive value. Thus, R may take a negative value. When Ga+Gs becomes negative, a fixed value prepared in advance is substituted.

Next, based on the vectors obtained by the parameter converting section 2502, the target vector extracting section 2503 acquires a target vector by using old decoded code vectors, stored in the decoded vector storage section 2504, and predictive coefficients stored in the predictive coefficients storage section 2504. An equation for computing the target vector is given by an equation 41.

$$Tp=P-\left(\sum_{i=1}^{l} Upi\times pi+\sum_{i-1}^{l} Vpi\times ri\right) \qquad (41)$$

$$Tr=R-\left(\sum_{i=1}^{l} Uri\times pi+\sum_{i=1}^{l} Vri\times ri\right)$$

where (Tp, Tr): target vector (P, R): input vector (pi, ri): old decoded vector

Upi, Vpi, Uri, Vri: predictive coefficients (fixed values)

i: index indicating how old the decoded vector is

1: prediction order.

Then, the distance calculator 2506 computes a distance between a target vector obtained by the target vector extracting section 2503 and a code vector stored in the vector codebook 2507 by using the predictive coefficients stored in the predictive coefficients storage section 2505. An equation for computing the distance is given by an equation 42.

$$Dn=Wp\times(Tp-UpO\times Cpn-VpO\times Crn)^2+Wr\times(Tr-UpO\times Cpn-VrO\times Crn)^2 \qquad (42)$$

where

Dn: distance between a target vector and a code vector (Tp, Tr): target vector

UpO, VpO, UrO, VrO: predictive coefficients (fixed values)

(Cpn, Crn): code vector n: the number of the code vector

Wp, Wr: weighting coefficient (fixed) for adjusting the sensitivity against distortion.

Then, the comparator 2508 controls the vector codebook 2507 and the distance calculator 2506 to acquire the number of the code vector which has the shortest distance computed by the distance calculator 2506 from among a plurality of code vectors stored in the vector codebook 2507, and sets the number as a gain code 2509. Based on the obtained gain code 2509, the comparator 2508 acquires a decoded vector and updates the content of the decoded vector storage section 2504 using that vector. An equation 43 shows how to acquire a decoded vector.

$$p=\left(\sum_{i=1}^{l} Upi\times pi+\sum_{i=1}^{l} Vpi\times ri\right)+UpO\times Cpn+VpO\times Crn \quad (43)$$

$$R=\left(\sum_{i=1}^{l} Uri\times pi+\sum_{i=1}^{l} Vri\times ri\right)+UrO\times Cpn+VrO\times Crn$$

where (Cpn, Crn): code vector (P, r): decoded vector (pi, ri): old decoded vector Upi, Vpi, Uri, Vri: predictive coefficients (fixed values)

i: index indicating how old the decoded vector is l: prediction order.

n: the number of the code vector.

An equation 44 shows an updating scheme.

Processing order $$pO=CpN$$

$$rO=CrN$$

$$pi=pi-1(i=1\sim 1)$$

$$ri=ri-1(i=1\sim 1) \quad (44)$$

N: code of the gain.

Meanwhile, the decoder, which should previously be provided with a vector codebook, a predictive coefficients storage section and a coded vector storage section similar to those of the coder, performs decoding through the functions of the comparator of the coder of generating a decoded vector and updating the decoded vector storage section, based on the gain code transmitted from the coder.

A scheme of setting predictive coefficients to be stored in the predictive coefficients storage section 2505 will now be described.

Predictive coefficients are obtained by quantizing a lot of training speech data first, collecting input vectors obtained from their optimal gains and decoded vectors at the time of quantization, forming a population, then minimizing total distortion indicated by the following equation 45 for that population. Specifically, the values of Upi and Uri are acquired by solving simultaneous equations which are derived by partial differential of the equation of the total distortion with respect to Upi and Uri.

$$Total=\sum_{t=0}^{T}\left\{Wp\times\left(Pt-\sum_{i=0}^{l} Upi\times pt,i\right)^2+Wr\times\left(Rt-\sum_{i=0}^{l} Uri\times rt,i\right)^2\right\} \quad (45)$$

$$pt,O=Cpn_{(t)}$$

$$rt,O=Crn_{(t)}$$

where

Total: total distortion t: time (frame number)

T: the number of pieces of data in the population (Pt, Rt): optimal gain at time t (pti, rti): decoded vector at time t Upi, Vpi, Uri, Vri: predictive coefficients (fixed values)

i: index indicating how old the decoded vector is l: prediction order.

($Cpn_{(t)}$, $Crn_{(t)}$): code vector at time t n: the number of the code vector Wp, Wr: weighting coefficient (fixed) for adjusting the sensitivity against distortion.

According to such a vector quantization scheme, the optimal gain can be vector-quantized as it is, the feature of the parameter converting section can permit the use of the correlation between the relative levels of the power and each gain, and the features of the decoded vector storage section, the predictive coefficients storage section, the target vector extracting section and the distance calculator can ensure predictive coding of gains using the correlation between the mutual relations between the power and two gains. Those features can allow the correlation among parameters to be utilized sufficiently.

(Seventeenth Mode)

Figure 26:
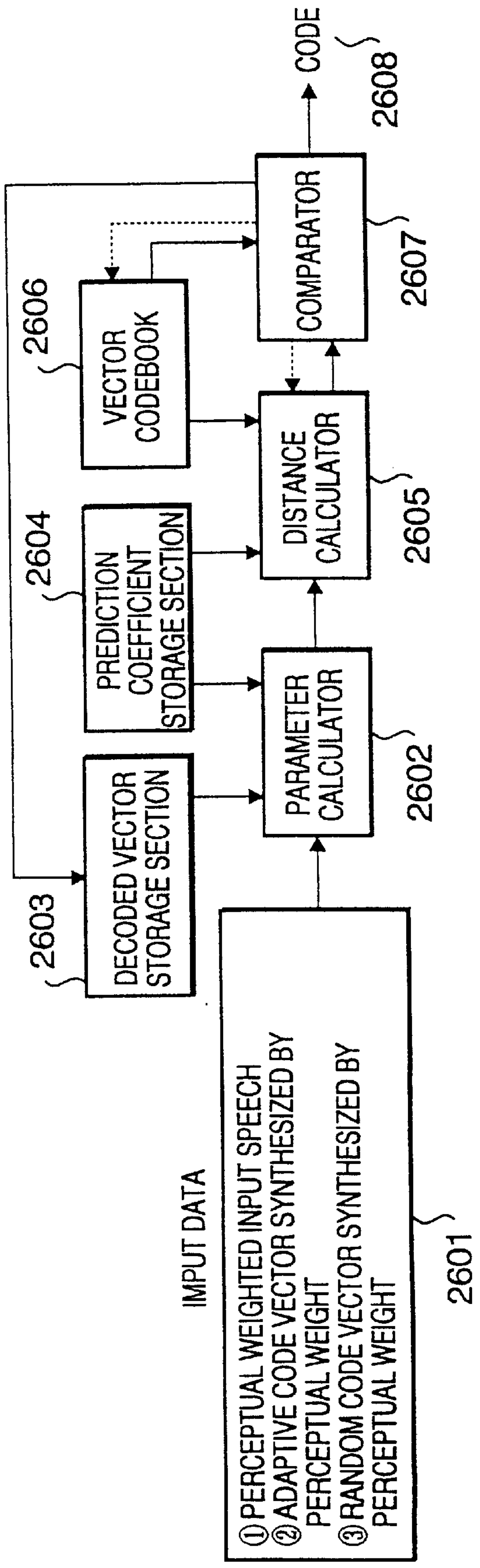
FIG. 26 is a block diagram of a parameter coding section of a speech coder according to a seventeenth mode.

FIG. 26 presents a structural block diagram of a parameter coding section of a speech coder according to this mode. According to this mode, vector quantization is performed while evaluating gain-quantization originated distortion from two synthesized speeches corresponding to the index of an excitation vector and a perpetual weighted input speech.

As shown in FIG. 26, the parameter coding section has a parameter calculator 2602, which computes parameters necessary for distance computation from input data or a perpetual weighted input speech, a perpetual weighted LPC synthesis of adaptive code vector and a perpetual weighted LPC synthesis of random code vecror 2601 to be input, a decoded vector stored in a decoding vector storage section, and predictive coefficients stored in a predictive coefficients storage section, a decoded vector storage section 2603 where old decoded code vectors are stored, a predictive coefficients storage section 2604 where predictive coefficients are stored, a distance calculator 2605 for computing coding distortion of the time when decoding is implemented with a plurality of code vectors stored in a vector codebook by using the predictive coefficients stored in the predictive coefficients storage section, a vector codebook 2606 where a plurality of code vectors are stored, and a comparator 2607, which controls the vector codebook and the distance calculator for comparison of the coding distortions obtained from the distance calculator to acquire the number of the most appropriate code vector, acquires a code vector from the vector storage section based on the obtained number, and updates the content of the decoded vector storage section using that code vector.

A description will now be given of the vector quantizing operation of the thus constituted parameter coding section. The vector codebook 2606 where a plurality of general samples (code vectors) of a quantization target vector are stored should be prepared in advance. This is generally prepared by an LBG algorithm (IEEE TRANSACTIONS ON COMMUNICATIONS, VOL. COM-28, NO. 1, PP 84–95, JANUARY 1980) or the like based on multiple vectors which are obtained by analyzing multiple speech data. Coefficients for predictive coding should be stored in the predictive coefficients storage section 2604. Those coefficients in use are the same predictive coefficients as stored in the predictive coefficients storage section 2505 which has been discussed in (Sixteenth Mode). A value indicating a unvoiced stateshould be stored as an initial value in the decoded vector storage section 2603.

First, the parameter calculator 2602 computes parameters necessary for distance computation from the input perpetual weighted input speech, perpetual weighted LPC synthesis of adaptive code vector and perpetual weighted LPC synthesis of random code vector, and further from the decoded vector stored in the decoded vector storage section 2603 and the predictive coefficients stored in the predictive coefficients storage section 2604. The distances in the distance calculator are based on the following equation 46.

$$En = \sum_{i=0}^{I} (Xi - Gan \times Ai - Gsn \times Si)^2 \tag{46}$$

$$Gan = Orn \times e \times p(Opn)$$

$$Gsn = (1 - Orn) \times e \times p(Opn)$$

$$Opn = Yp + UpO \times Cpn + VpO \times Crn$$

$$Yp = \sum_{j=1}^{J} Upj \times pj + \sum_{j=1}^{J} Vpj \times rj$$

$$Yr = \sum_{j=1}^{J} Urj \times pj + \sum_{j=1}^{J} Vrj \times rj$$

Gan, Gsn: decoded gain (Opn, Orn): decoded vector (Yp, Yr): predictive vector

En: coding distortion when the n-th gain code vector is used

Xi: perpetual weighted input speech

Ai: perpetual weighted LPC synthesis of adaptive code vector

Si: perpetual weighted LPC synthesis of stochastic code vector n: code of the code vector i: index of excitation data I: subframe length (coding unit of the input speech)

(Cpn, Crn): code vector (pj, rj): old decoded vector

Upj, Vpj, Urj, Vrj: predictive coefficients (fixed values)

j: index indicating how old the decoded vector is

J: prediction order.

Therefore, the parameter calculator 2602 computes those portions which do not depend on the number of a code vector. What is to be computed are the predictive vector, and the correlation among three synthesized speeches or the power. An equation for the computation is given by an equation 47.

$$Yp = \sum_{j=1}^{J} Upj \times pj + \sum_{j=1}^{J} Vpj \times rj \tag{47}$$

$$Yr = \sum_{j=1}^{J} Urj \times pj + \sum_{j=1}^{J} Vrj \times rj$$

$$Dxx = \sum_{i=0}^{I} Xi \times Xi$$

$$Dxa = \sum_{i=0}^{I} Xi \times Ai \times 2$$

$$Dxs = \sum_{i=0}^{I} Xi \times Si \times 2$$

-continued $$Daa = \sum_{i=0}^{I} Ai \times Ai$$

$$Das = \sum_{i=0}^{I} Ai \times Si \times 2$$

$$Dss = \sum_{i=0}^{I} Si \times Si$$

where (Yp, Yr): predictive vector

Dxx, Dxa, Dxs, Daa, Das, Dss: value of correction among synthesized speeches or the power Xi: perpetual weighted input speech Ai: perpetual weighted LPC synthesis of adaptive code vector Si: perpetual weighted LPC synthesis of stochastic code vector i: index of excitation data I: subframe length (coding unit of the input speech)

(pj, rj): old decoded vector

Upi, Vpj, Urj, Vrj: predictive coefficients (fixed values)

j: index indicating how old the decoded vector is

J: prediction order.

Then, the distance calculator 2506 computes a distance between a target vector obtained by the target vector extracting section 2503 and a code vector stored in the vector codebook 2507 by using the predictive coefficients stored in the predictive coefficients storage section 2505. An equation for computing the distance is given by an equation 42.

$$En = Dxx + (Gan)^2 \times Daa + (Gsn)^2 \times Dss - Gan \times Dxa - Gsn \times Dxs + Gan \times Gsn \times Das$$

$$Gan = Orn \times exp(Opn)$$

$$Gsn = (1 - Orn) \times exp(Opn)$$

$$Opn = Yp + UpO \times Cpn + VpO \times Crn$$

$$Orn = Yr + UrO \times Cpn + VrO \times Crn \tag{48}$$

where

En: coding distortion when the n-th gain code vector is used

Dxx, Dxa, Dxs, Daa, Das, Dss: value of correction among synthesized speeches or the power Gan, Gsn: decoded gain (Opn, Orn): decoded vector (Yp, Yr): predictive vector UpO, VpO, UrO, VrO: predictive coefficients (fixed values)

(Cpn, Crn): code vector n: the number of the code vector.

Actually, Dxx does not depend on the number n of the code vector so that its addition can be omitted.

Then, the comparator 2607 controls the vector codebook 2606 and the distance calculator 2605 to acquire the number of the code vector which has the shortest distance computed by the distance calculator 2605 from among a plurality of code vectors stored in the vector codebook 2606, and sets the number as a gain code 2608. Based on the obtained gain code 2608, the comparator 2607 acquires a decoded vector and updates the content of the decoded vector storage section 2603 using that vector. A code vector is obtained from the equation 44.

Further, the updating scheme, the equation 44, is used.

Meanwhile, the speech decoder should previously be provided with a vector codebook, a predictive coefficients storage section and a coded vector storage section similar to those of the speech coder, and performs decoding through the functions of the comparator of the coder of generating a decoded vector and updating the decoded vector storage section, based on the gain code transmitted from the coder.

According to the thus constituted mode, vector quantization can be performed while evaluating gain-quantization originated distortion from two synthesized speeches corresponding to the index of the excitation vector and the input speech, the feature of the parameter converting section can permit the use of the correlation between the relative levels of the power and each gain, and the features of the decoded vector storage section, the predictive coefficients storage section, the target vector extracting section and the distance calculator can ensure predictive coding of gains using the correlation between the mutual relations between the power and two gains. This can allow the correlation among parameters to be utilized sufficiently.

(Eighteenth Mode)

Figure 27:
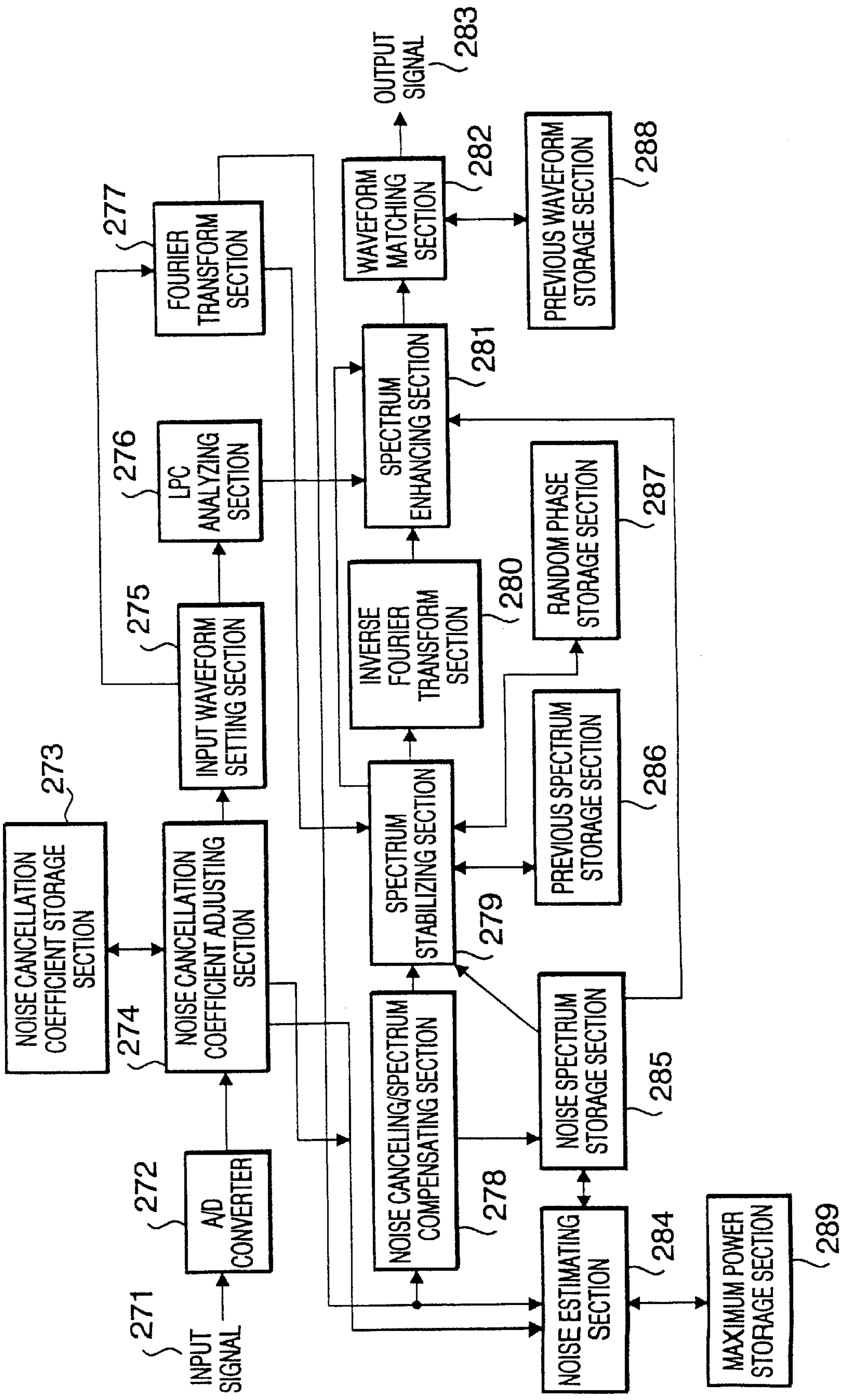
FIG. 27 is a block diagram of a noise canceler according to an eighteenth mode.

FIG. 27 presents a structural block diagram of the essential portions of a noise canceler according to this mode. This noise canceler is installed in the above-described speech coder. For example, it is placed at the preceding stage of the buffer 1301 in the speech coder shown in FIG. 13.

The noise canceler shown in FIG. 27 comprises an A/D converter 272, a noise cancellation coefficient storage section 273, a noise cancellation coefficient adjusting section 274, an input waveform setting section 275, an LPC analyzing section 276, a Fourier transform section 277, a noise canceling/spectrum compensating section 278, a spectrum stabilizing section 279, an inverse Fourier transform section 280, a spectrum enhancing section 281, a waveform matching section 282, a noise estimating section 284, a noise spectrum storage section 285, a previous spectrum storage section 286, a random phase storage section 287, a previous waveform storage section 288, and a maximum power storage section 289.

To begin with, initial settings will be discussed. Table 10 shows the names of fixed parameters and setting examples.

TABLE 10

| Fixed Parameters | Setting Examples |
|---|---|
| frame length | 160 (20 msec for 8-kHz sampling data) |
| pre-read data length | 80 (10 msec for the above data) |
| FET order | 256 |
| LPC prediction order | 10 |
| sustaining number of noise spectrum reference | 30 |
| designated minimum power | 20.0 |
| AR enhancement coefficient 0 | 0.5 |
| MA enhancement coefficient 0 | 0.8 |
| high-frequency enhancement coefficient 0 | 0.4 |
| AR enhancement coefficient 1-0 | 0.66 |
| MA enhancement coefficient 1-0 | 0.64 |
| AR enhancement coefficient 1-1 | 0.7 |
| MA enhancement coefficient 1-1 | 0.6 |
| high-frequency enhancement coefficient 1 | 0.3 |
| power enhancement coefficient | 1.2 |

TABLE 10-continued

| Fixed Parameters | Setting Examples |
|---|---|
| noise reference power | 20000.0 |
| unvoiced segment power reduction coefficient | 0.3 |
| compensation power increase coefficient | 2.0 |
| number of consecutive noise references | 5 |
| noise cancellation coefficient training coefficient | 0.8 |
| unvoiced segment detection coefficient | 0.05 |
| designated noise cancellation coefficient | 1.5 |

Phase data for adjusting the phase should have been stored in the random phase storage section 287. Those are used to rotate the phase in the spectrum stabilizing section 279. Table 11 shows a case where there are eight kinds of phase data.

TABLE 11

| Phase Data |
|---|
| (−0.51, 0.86), (0.98, −0.17) |
| (0.30, 0.95), (−0.53, −0.84) |
| (−0.94, −0.34), (0.70, 0.71) |
| (−0.22, 0.97), (0.38, −0.92) |

Further, a counter (random phase counter) for using the phase data should have been stored in the random phase storage section 287 too. This value should have been initialized to 0 before storage.

Next, the static RAM area is set. Specifically, the noise cancellation coefficient storage section 273, the noise spectrum storage section 285, the previous spectrum storage section 286, the previous waveform storage section 288 and the maximum power storage section 289 are cleared. The following will discuss the individual storage sections and a setting example.

The noise cancellation coefficient storage section 273 is an area for storing a noise cancellation coefficient whose initial value stored is 20.0. The noise spectrum storage section 285 is an area for storing, for each frequency, mean noise power, a mean noise spectrum, a compensation noise spectrum for the first candidate, a compensation noise spectrum for the second candidate, and a frame number (sustaining number) indicating how many frames earlier the spectrum value of each frequency has changed; a sufficiently large value for the mean noise power, designated minimum power for the mean noise spectrum, and sufficiently large values for the compensation noise spectra and the sustaining number should be stored as initial values.

The previous spectrum storage section 286 is an area for storing compensation noise power, power (full range, intermediate range) of a previous frame (previous frame power), smoothing power (full range, intermediate range) of a previous frame (previous smoothing power), and a noise sequence number; a sufficiently large value for the compensation noise power, 0.0 for both the previous frame power and full frame smoothing power and a noise reference sequence number as the noise sequence number should be stored.

The previous waveform storage section 288 is an area for storing data of the output signal of the previous frame by the length of the last pre-read data for matching of the output signal, and all 0 should be stored as an initial value. The spectrum enhancing section 281, which executes ARMA and high-frequency enhancement filtering, should have the statuses of the respective filters cleared to 0 for that purpose. The maximum power storage section 289 is an area for storing the maximum power of the input signal, and should have 0 stored as the maximum power.

Then, the noise cancellation algorithm will be explained block by block with reference to FIG. 27.

First, an analog input signal 271 including a speech is subjected to A/D conversion in the A/D converter 272, and is input by one frame length+pre-read data length (160+80=240 points in the above setting example). The noise cancellation coefficient adjusting section 274 computes a noise cancellation coefficient and a compensation coefficient from an equation 49 based on the noise cancellation coefficient stored in the noise cancellation coefficient storage section 273, a designated noise cancellation coefficient, a learning coefficient for the noise cancellation coefficient, and a compensation power increase coefficient. The obtained noise cancellation coefficient is stored in the noise cancellation coefficient storage section 273, the input signal obtained by the A/D converter 272 is sent to the input waveform setting section 275, and the compensation coefficient and noise cancellation coefficient are sent to the noise estimating section 284 and the noise canceling/spectrum compensating section 278.

$$q = q \times C + Q \times (1 - C)$$

$$r = Q / q \times D \quad (49)$$

where q: noise cancellation coefficient

Q: designated noise cancellation coefficient

C: learning coefficient for the noise cancellation coefficient r: compensation coefficient D: compensation power increase coefficient.

The noise cancellation coefficient is a coefficient indicating a rate of decreasing noise, the designated noise cancellation coefficient is a fixed coefficient previously designated, the learning coefficient for the noise cancellation coefficient is a coefficient indicating a rate by which the noise cancellation coefficient approaches the designated noise cancellation coefficient, the compensation coefficient is a coefficient for adjusting the compensation power in the spectrum compensation, and the compensation power increase coefficient is a coefficient for adjusting the compensation coefficient.

In the input waveform setting section 275, the input signal from the A/D converter 272 is written in a memory arrangement having a length of 2 to an exponential power from the end in such a way that FFT (Fast Fourier Transform) can be carried out. 0 should be filled in the front portion. In the above setting example, 0 is written in 0 to 15 in the arrangement with a length of 256, and the input signal is written in 16 to 255. This arrangement is used as a real number portion in FFT of the eighth order. An arrangement having the same length as the real number portion is prepared for an imaginary number portion, and all 0 should be written there.

In the LPC analyzing section 276, a hamming window is put on the real number area set in the input waveform setting section 275, autocorrelation analysis is performed on the Hamming-windowed waveform to acquire an autocorrelation value, and autocorrelation-based LPC analysis is performed to acquire linear predictive coefficients. Further, the obtained linear predictive coefficients are sent to the spectrum enhancing section 281.

The Fourier transform section 277 conducts discrete Fourier transform by FFT using the memory arrangement of the real number portion and the imaginary number portion, obtained by the input waveform setting section 275. The sum of the absolute values of the real number portion and the imaginary number portion of the obtained complex spectrum is computed to acquire the pseudo amplitude spectrum (input spectrum hereinafter) of the input signal. Further, the total sum of the input spectrum value of each frequency (input power hereinafter) is obtained and sent to the noise estimating section 284. The complex spectrum itself is sent to the spectrum stabilizing section 279.

A process in the noise estimating section 284 will now be discussed.

The noise estimating section 284 compares the input power obtained by the Fourier transform section 277 with the maximum power value stored in the maximum power storage section 289, and stores the maximum power value as the input power value in the maximum power storage section 289 when the maximum power is smaller. If at least one of the following cases is satisfied, noise estimation is performed, and if none of them are met, noise estimation is not carried out.

(1) The input power is smaller than the maximum power multiplied by an unvoiced segment detection coefficient.

(2) The noise cancellation coefficient is larger than the designated noise cancellation coefficient plus 0.2.

(3) The input power is smaller than a value obtained by multiplying the mean noise power, obtained from the noise spectrum storage section 285, by 1.6.

The noise estimating algorithm in the noise estimating section 284 will now be discussed.

First, the sustaining numbers of all the frequencies for the first and second candidates stored in the noise spectrum storage section 285 are updated (incremented by 1). Then, the sustaining number of each frequency for the first candidate is checked, and when it is larger than a previously set sustaining number of noise spectrum reference, the compensation spectrum and sustaining number for the second candidate are set as those for the first candidate, and the compensation spectrum of the second candidate is set as that of the third candidate and the sustaining number is set to 0. Note that in replacement of the compensation spectrum of the second candidate, the memory can be saved by not storing the third candidate and substituting a value slightly larger than the second candidate. In this mode, a spectrum which is 1.4 times greater than the compensation spectrum of the second candidate is substituted.

After renewing the sustaining number, the compensation noise spectrum is compared with the input spectrum for each frequency. First, the input spectrum of each frequency is compared with the compensation nose spectrum of the first candidate, and when the input spectrum is smaller, the compensation noise spectrum and sustaining number for the first candidate are set as those for the second candidate, and the input spectrum is set as the compensation spectrum of the first candidate with the sustaining number set to 0. In other cases than the mentioned condition, the input spectrum is compared with the compensation nose spectrum of the second candidate, and when the input spectrum is smaller, the input spectrum is set as the compensation spectrum of the second candidate with the sustaining number set to 0. Then, the obtained compensation spectra and sustaining numbers of the first and second candidates are stored in the noise spectrum storage section 285. At the same time, the mean noise spectrum is updated according to the following equation 50.

$$Si = Si \times g + Si \times (1-g) \quad (50)$$

where s: means noise spectrum

S: input spectrum g: 0.9 (when the input power is larger than a half the mean noise power)

0.5 (when the input power is equal to or smaller than a half the mean noise power)

i: number of the frequency.

The mean noise spectrum is pseudo mean noise spectrum, and the coefficient g in the equation 50 is for adjusting the speed of learning the mean noise spectrum. That is, the coefficient has such an effect that when the input power is smaller than the noise power, it is likely to be a noise-only segment so that the learning speed will be increased, and otherwise, it is likely to be in a speech segment so that the learning speed will be reduced.

Then, the total of the values of the individual frequencies of the mean noise spectrum is obtained to be the mean noise power. The compensation noise spectrum, mean noise spectrum and mean noise power are stored in the noise spectrum storage section 285.

In the above noise estimating process, the capacity of the RAM constituting the noise spectrum storage section 285 can be saved by making a noise spectrum of one frequency correspond to the input spectra of a plurality of frequencies. As one example is illustrated the RAM capacity of the noise spectrum storage section 285 at the time of estimating a noise spectrum of one frequency from the input spectra of four frequencies with FFT of 256 points in this mode used. In consideration of the (pseudo) amplitude spectrum being horizontally symmetrical with respect to the frequency axis, to make estimation for all the frequencies, spectra of 128 frequencies and 128 sustaining numbers are stored, thus requiring the RAM capacity of a total of 768 W or 128 (frequencies)×2 (spectrum and sustaining number)×3 (first and second candidates for compensation and mean).

When a noise spectrum of one frequency is made to correspond to input spectra of four frequencies, by contrast, the required RAM capacity is a total of 192 W or 32 (frequencies)×2 (spectrum and sustaining number)×3 (first and second candidates for compensation and mean). In this case, it has been confirmed through experiments that for the above 1×4 case, the performance is hardly deteriorated while the frequency resolution of the noise spectrum decreases. Because this means is not for estimation of a noise spectrum from a spectrum of one frequency, it has an effect of preventing the spectrum from being erroneous estimated as a noise spectrum when a normal sound (sine wave, vowel or the like) continues for a long period of time.

A description will now be given of a process in the noise canceling/spectrum compensating section 278.

A result of multiplying the mean noise spectrum, stored in the noise spectrum storage section 285, by the noise cancellation coefficient obtained by the noise cancellation coefficient adjusting section 274 is subtracted from the input spectrum (spectrum difference hereinafter). When the RAM capacity of the noise spectrum storage section 285 is saved as described in the explanation of the noise estimating section 284, a result of multiplying a mean noise spectrum of a frequency corresponding to the input spectrum by the noise cancellation coefficient is subtracted. When the spectrum difference becomes negative, compensation is carried out by setting a value obtained by multiplying the first candidate of the compensation noise spectrum stored in the noise spectrum storage section 285 by the compensation coefficient obtained by the noise cancellation coefficient adjusting section 274. This is performed for every frequency. Further, flag data is prepared for each frequency so that the frequency by which the spectrum difference has been compensated can be grasped. For example, there is one area for each frequency, and 0 is set in case of no compensation, and 1 is set when compensation has been carried out. This flag data is sent together with the spectrum difference to the spectrum stabilizing section 279. Furthermore, the total number of the compensated (compensation number) is acquired by checking the values of the flag data, and it is sent to the spectrum stabilizing section 279 too.

A process in the spectrum stabilizing section 279 will be discussed below. This process serves to reduce allophone feeling mainly of a segment which does not contain speeches.

First, the sum of the spectrum differences of the individual frequencies obtained from the noise canceling/spectrum compensating section 278 is computed to obtain two kinds of current frame powers, one for the full range and the other for the intermediate range. For the full range, the current frame power is obtained for all the frequencies (called the full range; 0 to 128 in this mode). For the intermediate range, the current frame power is obtained for an perpetually important, intermediate band (called the intermediate range; 16 to 79 in this mode).

Likewise, the sum of the compensation noise spectra for the first candidate, stored in the noise spectrum storage section 285, is acquired as current frame noise power (full range, intermediate range). When the values of the compensation numbers obtained from the noise canceling/spectrum compensating section 278 are checked and are sufficiently large, and when at least one of the following three conditions is met, the current frame is determined as a noise-only segment and a spectrum stabilizing process is performed.

(1) The input power is smaller than the maximum power multiplied by an unvoiced segment detection coefficient.

(2) The current frame power (intermediate range) is smaller than the current frame noise power (intermediate range) multiplied by 5.0.

(3) The input power is smaller than noise reference power.

In a case where no stabilizing process is not conducted, the consecutive noise number stored in the previous spectrum storage section 286 is decremented by 1 when it is positive, and the current frame noise power (full range, intermediate range) is set as the previous frame power (full range, intermediate range) and they are stored in the previous spectrum storage section 286 before proceeding to the phase diffusion process.

The spectrum stabilizing process will now be discussed. The purpose for this process is to stabilize the spectrum in an unvoiced segment (speech-less and noise-only segment) and reduce the power. There are two kinds of processes, and a process 1 is performed when the consecutive noise number is smaller than the number of consecutive noise references while a process 2 is performed otherwise. The two processes will be described as follow.

(Process 1)

The consecutive noise number stored in the previous spectrum storage section 286 is incremented by 1, and the current frame noise power (full range, intermediate range) is set as the previous frame power (full range, intermediate range) and they are stored in the previous spectrum storage section 286 before proceeding to the phase adjusting process.

(Process 2)

The previous frame power, the previous frame smoothing power and the unvoiced segment power reduction coefficient, stored in the previous spectrum storage section 286, are referred to and are changed according to an equation 51.

$$Dd80=Dd80\times0.8+A80\times0.2\times P$$

$$D80=D80\times0.5+Dd80\times0.5$$

$$Dd129=Dd129\times0.8+A129 0.2\times P$$

$$D129=D129\times0.5+Dd129\times0.5 \quad (51)$$

where

Dd80: previous frame smoothing power (intermediate range)

D80: previous frame power (intermediate range)

Dd129: previous frame smoothing power (full range)

D129: previous frame power (full range)

A80: current frame noise power (intermediate range)

A129: current frame noise power (full range).

Then, those powers are reflected oh the spectrum differences. Therefore, two coefficients, one to be multiplied in the intermediate range (coefficient 1 hereinafter) and the other to be multiplied in the full range (coefficient 2 hereinafter), are computed. First, the coefficient 1 is computed from an equation 52.

$$r1=D80/A80 \text{ (when } A80>0) \ 1.0 \text{ (when } A80\leqq0) \quad (52)$$

where r1: coefficient 1

D80: previous frame power (intermediate range)

A80: current frame noise power (intermediate range).

As the coefficient 2 is influenced by the coefficient 1, acquisition means becomes slightly complicated. The procedures will be illustrated below.

(1) When the previous frame smoothing power (full range.) is smaller than the previous frame power (intermediate range) or when the current frame noise power (full range) is smaller than the current frame noise power (intermediate range), the flow goes to (2), but goes to (3) otherwise.

(2) The coefficient 2 is set to 0.0, and the previous frame power (full range) is set as the previous frame power (intermediate range), then the flow goes to (6).

(3) When the current frame noise power (full range) is equal to the current frame noise power (intermediate range), the flow goes to (4), but goes to (5) otherwise.

(4) The coefficient 2 is set to 1.0, and then the flow goes to (6).

(5) The coefficient 2 is acquired from the following equation 53, and then the flow goes to (6).

$$r2=(D129-D80)/(A129-A80) \quad (53)$$

where r2: coefficient 2

D129: previous frame power (full range)

D80: previous frame power (intermediate range)

A129: current frame noise power (full range)

A80: current frame noise power (intermediate range).

(6) The computation of the coefficient 2 is terminated.

The coefficients 1 and 2 obtained in the above algorithm always have their upper limits clipped to 1.0 and lower limits to the unvoiced segment power reduction coefficient. A value obtained by multiplying the spectrum difference of the intermediate frequency (16 to 79 in this example) by the coefficient 1 is set as a spectrum difference, and a value obtained by multiplying the spectrum difference of the frequency excluding the intermediate range from the full range of that spectrum difference (0 to 15 and 80 to 128 in this example) by the coefficient 2 is set as a spectrum difference. Accordingly, the previous frame power (full range, intermediate range) is converted by the following equation 54.

$$D80=A80\times r1$$

$$D129=D80+(A129-A80)\times r2 \quad (54)$$

where r1: coefficient 1 r2: coefficient 2

D80: previous frame power (intermediate range)

A80: current frame noise power (intermediate range)

D129: previous frame power (full range)

A129: current frame noise power (full range).

Various sorts of power data, etc. obtained in this manner are all stored in the previous spectrum storage section 286 and the process 2 is then terminated.

The spectrum stabilization by the spectrum stabilizing section 279 is carried out in the above manner.

Next, the phase adjusting process will be explained. While the phase is not changed in principle in the conventional spectrum subtraction, a process of altering the phase at random is executed when the spectrum of that frequency is compensated at the time of cancellation. This process enhances the randomness of the remaining noise, yielding such an effect of making is difficult to give a perpetually adverse impression.

First, the random phase counter stored in the random phase storage section 287 is obtained. Then, the flag data (indicating the presence/absence of compensation) of all the frequencies are referred to, and the phase of the complex spectrum obtained by the Fourier transform section 277 is rotated using the following equation 55 when compensation has been performed.

$$Bs=Si\times Rc-Ti\times Rc+1$$

$$Bt=Si\times Rc+1+Ti\times Rc$$

$$Si=Bs$$

$$Ti=Bt \quad (55)$$

where Si,

Ti: complex spectrum i: index indicating the frequency

R: random phase data c: random phase counter

Bs, Bt: register for computation.

In the equation 55, two random phase data are used in pair. Every time the process is performed once, the random phase counter is incremented by 2, and is set to 0 when it reaches the upper limit (16 in this mode). The random phase counter is stored in the random phase storage section 287 and the acquired complex spectrum is sent to the inverse Fourier transform section 280. Further, the total of the spectrum differences (spectrum difference power hereinafter) and it is sent to the spectrum enhancing section 281.

The inverse Fourier transform section 280 constructs a new complex spectrum based on the amplitude of the spectrum difference and the phase of the complex spectrum, obtained by the spectrum stabilizing section 279, and carries out inverse Fourier transform using FFT. (The yielded signal is called a first order output signal.) The obtained first order output signal is sent to the spectrum enhancing section 281.

Next, a process in the spectrum enhancing section 281 will be discussed.

First, the mean noise power stored in the noise spectrum storage section 285, the spectrum difference power obtained by the spectrum stabilizing section 279 and the noise reference power, which is constant, are referred to select an MA enhancement coefficient and AR enhancement coefficient. The selection is implemented by evaluating the following two conditions.

(Condition 1)

The spectrum difference power is greater than a value obtained by multiplying the mean noise power, stored in the noise spectrum storage section 285, by 0.6, and the mean noise power is greater than the noise reference power.

(Condition 2)

The spectrum difference power is greater than the mean noise power.

When the condition 1 is met, this segment is a "voiced segment," the MA enhancement coefficient is set to an MA enhancement coefficient 1-1, the AR enhancement coefficient is set to an AR enhancement coefficient 1-1, and a high-frequency enhancement coefficient is set to a high-frequency enhancement coefficient 1. When the condition 1 is not satisfied but the condition 2 is met, this segment is an "unvoiced segment," the MA enhancement coefficient is set to an MA enhancement coefficient 1-0, the AR enhancement coefficient is set to an AR enhancement coefficient 1-0, and the high-frequency enhancement coefficient is set to 0. When the condition 1 is satisfied but the condition 2 is not, this segment is an "unvoiced, noise-only segment," the MA enhancement coefficient is set to an MA enhancement coefficient 0, the AR enhancement coefficient is set to an AR enhancement coefficient 0, and the high-frequency enhancement coefficient is set to a high-frequency enhancement coefficient 0.

Using the linear predictive coefficients obtained from the LPC analyzing section 276, the MA enhancement coefficient and the AR enhancement coefficient, an MA coefficient AR coefficient of an extreme enhancement filter are computed based on the following equation 56.

$$\alpha(ma)i=\alpha i\times\beta^{i}$$

$$\alpha(ar)i=\alpha i\times\gamma^{i}$$

where

α(ma)i: MA coefficient

α(ar)i: AR coefficient

αi: linear predictive coefficient

β: MA enhancement coefficient

γ: AR enhancement coefficient i: number.

Then, the first order output signal acquired by the inverse Fourier transform section 280 is put through the extreme enhancement filter using the MA coefficient and AR coefficient. The transfer function of this filter is given by the following equation 57.

$$\frac{1+\alpha(ma)_1\times Z^{-1}+\alpha(ma)_2\times Z^{-2}+\cdots+\alpha(ma)_j\times Z^{-j}}{1+\alpha(ar)_1\times Z^{-1}+\alpha(ar)_2\times Z^{-2}+\cdots+\alpha(ar)_j\times Z^{-j}} \quad (57)$$

where $\alpha L\,(ma)_1$: MA coefficient $\alpha(ar)_1$: AR coefficient j: order.

Further, to enhance the high frequency component, high-frequency enhancement filtering is performed by using the high-frequency enhancement coefficient. The transfer function of this filter is given by the following equation 58.

$$1-\delta Z^{1} \quad (58)$$

where

δ: high-frequency enhancement coefficient.

A signal obtained through the above process is called a second order output signal. The filter status is saved in the spectrum enhancing section 281.

Finally, the waveform matching section 282 makes the second order output signal, obtained by the spectrum enhancing section 281, and the signal stored in the previous waveform storage section 288, overlap one on the other with a triangular window. Further, data of this output signal by the length of the last pre-read data is stored in the previous waveform storage section 288. A matching scheme at this time is shown by the following equation 59.

$$O_j=(j\times D_j+(L-j)\times Z_j)/L(j=0\sim L-1)$$

$$O_j=D_j(j=L\sim L+M-1)$$

$$Z_j=O_{m+j}(j=0\sim L-1) \quad (59)$$

where $O_j$: output signal $D_j$: second order output signal $Z_j$: output signal L: pre-read data length M: frame length.

It is to be noted that while data of the pre-read data length+frame length is output as the output signal, that of the output signal which can be handled as a signal is only a segment of the frame length from the beginning of the data. This is because, later data of the pre-read data length will be rewritten when the next output signal is output. Because continuity is compensated in the entire segments of the output signal, however, the data can be used in frequency analysis, such as LPC analysis or filter analysis.

According to this mode, noise spectrum estimation can be conducted for a segment outside a voiced segment as well as in a voiced segment, so that a noise spectrum can be estimated even when it is not clear at which timing a speech is present in data.

It is possible to enhance the characteristic of the input spectrum envelope with the linear predictive coefficients, and to possible to prevent degradation of the sound quality even when the noise level is high.

Further, using the mean spectrum of noise can cancel the noise spectrum more significantly. Further, separate estimation of the compensation spectrum can ensure more accurate compensation.

It is possible to smooth a spectrum in a noise-only segment where no speech is contained, and the spectrum in this segment can prevent allophone feeling from being caused by an extreme spectrum variation which is originated from noise cancellation.

The phase of the compensated frequency component can be given a random property, so that noise remaining uncanceled can be converted to noise which gives less perpetual allophone feeling.

The proper weighting can perpetually be given in a voiced segment, and perpetual-weighting originating allophone feeling can be suppressed in an unvoiced segment or an unvoiced syllable segment.

Industrial Applicability

As apparent from the above, an excitation vector generator, a speech coder and speech decoder according to this invention are effective in searching for excitation vectors and are suitable for improving the speech quality.

What is claimed is:

1. A generator used with a speech codec to improve a speech quality when a random code vector is decoded with an input vector, comprising:

a providing system that provides an input vector having at least one pulse, said at least one pulse having a predetermined position and a predetermined polarity;

a storage system that stores three different fixed waveforms, each fixed waveform of said three different fixed waveforms having a different amount of energy spreading; and a generating system to which both of said input vector and at least one of said three different fixed waveforms are input to produce a non-periodic component utilized to generate an excitation vector.

2. The generator of claim 1, wherein said input vector comprises a sparse vector.

3. The generator of claim 1, wherein said input vector is provided from an algebraic codebook.

4. The generator of claim 1, wherein said input vector comprises a vector having a plurality of non-zero samples.

5. The generator of claim 1, wherein said generating system spreads an energy distribution of said input vector over a subframe.

6. A generator that produces a component of an excitation vector, said generator being used with a speech codec to improve a speech quality when a random code vector is decoded with an input vector, said input vector and at least one of pre-stored three different fixed waveforms, each waveform of said three different waveforms having a different amount of energy spreading being input to said generator to produce a non-periodic component utilized to generate an excitation vector.

7. The generator of claim 6, wherein said input vector comprises a sparse vector.

8. The generator of claim 6, wherein said input vector is provided from an algebraic codebook.

9. The generator of claim 6, wherein said input vector comprises a vector having a plurality of non-zero samples.

10. The generator of claim 6, wherein said generator spreads an energy distribution of said input vector over a subframe.

11. A generator used with a speech codec to improve a speech quality when a random code vector is decoded with an input vector, comprising:

means for providing an input vector having at least one pulse, each pulse of said at least one pulse having a predetermined position and a predetermined polarity;

means for storing three different fixed waveforms, each waveform of said three different waveforms having a different amount of energy spreading; and means for processing said input vector with said at least one of said three different fixed waveforms to generate a non-periodic component utilized to produce an excitation vector having a transformed waveform.

12. The generator of claim 11, wherein said input vector comprises a sparse vector.

13. The generator of claim 11, wherein said input vector is provided from an algebraic codebook.

14. The generator of claim 11, wherein said input vector comprises a vector having a plurality of non-zero samples.

15. The generator of claim 11, wherein said processing means spreads an energy distribution of said input vector over a subframe.

16. A method for generating a component of an excitation vector used with a speech codec to improve a speech quality when a random code vector is decoded with an input vector, comprising:

providing an input vector having at least one pulse, each pulse of the at least one pulse having a predetermined position and a predetermined polarity;

storing three different fixed waveforms, each waveform of the three different waveforms having a different amount of energy spreading; and inputting both the input vector and at least one of the three different fixed waveforms to a generating device to produce a non-periodic component utilized to generate an excitation vector.

17. A method for generating an excitation vector used in a speech codec to improve a speech quality in a case that a random code vector is decoded with an input vector, comprising:

providing an input vector having one or more pulses each with a predetermined position and a predetermined polarity; and storing three different fixed waveforms, each waveform of the three different waveforms having a different amount of energy spreading; and inputting the input vector and at least one of the three different fixed waveforms to a processing system to generate a non-periodic component utilized to produce an excitation vector having a transformed waveform.

* * * * *

UNITED STATES PATENT AND TRADEMARK OFFICE

CERTIFICATE OF CORRECTION

PATENT NO. : 6,453,288 B1
DATED : September 17, 2002
INVENTOR(S) : K. Yasunaga et al.

It is certified that error appears in the above-identified patent and that said Letters Patent is hereby corrected as shown below:

Title page,
Item [75], Inventors, delete "Taisuke Watanabe".

Signed and Sealed this

Eleventh Day of March, 2003

JAMES E. ROGAN
*Director of the United States Patent and Trademark Office*